(12) United States Patent
Kwon et al.

(10) Patent No.: US 9,805,623 B1
(45) Date of Patent: Oct. 31, 2017

(54) CPR TRAINING SYSTEM AND METHOD

(71) Applicant: I.M.LAB Inc., Daejeon (KR)

(72) Inventors: Ye Ram Kwon, Daejeon (KR); Shin Hoo Park, Daejeon (KR); Sung Won Lee, Daejeon (KR); Hyeong Mook Lee, Daejeon (KR)

(73) Assignee: I.M.LAB Inc., Daejeon (KR)

( * ) Notice: Subject to any disclaimer, the term of this patent is extended or adjusted under 35 U.S.C. 154(b) by 0 days.

(21) Appl. No.: 15/094,921

(22) Filed: Apr. 8, 2016

(51) Int. Cl.
*G09B 23/32* (2006.01)
*G09B 23/28* (2006.01)
*G01L 5/00* (2006.01)
*G01P 15/08* (2006.01)

(52) U.S. Cl.
CPC .............. *G09B 23/288* (2013.01); *G01L 5/00* (2013.01); *G01P 15/08* (2013.01); *G09B 23/32* (2013.01)

(58) Field of Classification Search
CPC ......... G09B 23/288; G01L 5/00; G01P 23/32; G01P 15/08
USPC ....................................................... 434/265
See application file for complete search history.

(56) References Cited

U.S. PATENT DOCUMENTS

| | | |
|---|---|---|
| 3,760,794 A | 9/1973 | Basham |
| 3,898,981 A | 8/1975 | Basham |
| 3,996,922 A | 12/1976 | Basham |
| 4,001,950 A | 1/1977 | Blumensaadt |
| 5,542,676 A | 8/1996 | Howe, Jr. et al. |
| 5,952,585 A | 9/1999 | Trantzas et al. |
| 6,306,107 B1 | 10/2001 | Myklebust et al. |
| 6,390,996 B1 | 5/2002 | Halperin et al. |
| 7,108,665 B2 | 9/2006 | Halperin et al. |
| 7,220,235 B2 | 5/2007 | Geheb et al. |
| 7,429,250 B2 | 9/2008 | Halperin et al. |

(Continued)

FOREIGN PATENT DOCUMENTS

| | | |
|---|---|---|
| CN | 102058473 A | 5/2011 |
| DE | 10 2011 012 458 A1 | 8/2012 |

(Continued)

OTHER PUBLICATIONS

International Search Report dated Nov. 1, 2016 of PCT/KR2016/007910 of corresponding application—4 pages.

*Primary Examiner* — Xuan Thai
*Assistant Examiner* — Robert P Bullington
(74) *Attorney, Agent, or Firm* — Knobbe Martens Olson & Bear LLP

(57) ABSTRACT

A training system and training method for cardiopulmonary resuscitation (CPR) is disclosed. The training system includes a manikin, a chest compression module, a breathing module and a data processing module. The chest compression module and the breathing module are installed on the manikin and connected to the data processing module. During a training session, a student performs CPR on the manikin. The data processing module evaluates and provides feedback regarding the chest compressions and the rescue breathings performed by the student. The training method includes positioning the chest compression module and the breathing module on the manikin, initializing the chest compression module and the breathing module to identify compression and breathing characteristics of the manikin, performing CPR on the manikin, and evaluating the CPR based on the compression and breathing characteristics of the manikin.

12 Claims, 39 Drawing Sheets

(56) References Cited

U.S. PATENT DOCUMENTS

| | | |
|---|---|---|
| D609,813 S | 2/2010 | Molden et al. |
| 7,747,319 B2 | 6/2010 | Freeman |
| D628,212 S | 11/2010 | Molden |
| 7,974,689 B2 | 7/2011 | Volpe et al. |
| 7,993,290 B2 | 8/2011 | Lund et al. |
| 8,034,006 B2 | 10/2011 | Celik-Butler et al. |
| 8,192,367 B2 | 6/2012 | Myklebust et al. |
| D669,130 S | 10/2012 | Ianke |
| 8,366,645 B1 | 2/2013 | Belalcazar |
| 8,394,040 B2 | 3/2013 | Strand et al. |
| 8,435,193 B2 | 5/2013 | Belalcazar |
| 8,465,292 B2 | 6/2013 | Nysaether et al. |
| 8,465,293 B2 | 6/2013 | Pastrick et al. |
| 8,532,765 B2 | 9/2013 | Ochs et al. |
| 8,560,065 B2 | 10/2013 | Eerden |
| 8,613,709 B2 | 12/2013 | Bishay et al. |
| 8,652,077 B2 | 2/2014 | Centen |
| 8,795,209 B2 | 8/2014 | Herken et al. |
| 8,939,922 B2 | 1/2015 | Strand et al. |
| 8,942,800 B2 | 1/2015 | Thiagrajan et al. |
| 8,942,803 B1 | 1/2015 | Herken et al. |
| 8,968,224 B2 | 3/2015 | Halperin et al. |
| 9,028,259 B2 | 5/2015 | Centen et al. |
| 9,114,059 B2 | 8/2015 | Bogdanowicz et al. |
| 9,131,873 B2 | 9/2015 | Horst et al. |
| 9,265,691 B2 | 2/2016 | Belalcazar |
| 2006/0015044 A1 | 1/2006 | Stavland et al. |
| 2006/0019229 A1 | 1/2006 | Morallee et al. |
| 2008/0146973 A1 | 6/2008 | Lund et al. |
| 2010/0022904 A1* | 1/2010 | Centen ................ A61H 31/005 600/534 |
| 2010/0056881 A1 | 3/2010 | Libbus et al. |
| 2010/0228166 A1 | 9/2010 | Centen |
| 2011/0117529 A1 | 5/2011 | Barash et al. |
| 2012/0083720 A1 | 4/2012 | Centen et al. |
| 2012/0123224 A1 | 5/2012 | Packer et al. |
| 2012/0184882 A1 | 7/2012 | Totman et al. |
| 2012/0191014 A1 | 7/2012 | Fossan |
| 2012/0220887 A1 | 8/2012 | Fossan |
| 2013/0023781 A1 | 1/2013 | Freeman et al. |
| 2013/0030259 A1 | 1/2013 | Thomsen et al. |
| 2013/0030326 A1 | 1/2013 | Bogdanowicz et al. |
| 2013/0060098 A1 | 3/2013 | Thomsen et al. |
| 2013/0072831 A1 | 3/2013 | Belalcazar |
| 2013/0218055 A1 | 8/2013 | Fossan |
| 2013/0296719 A1 | 11/2013 | Packer et al. |
| 2014/0072940 A1 | 3/2014 | Wood |
| 2014/0131120 A1 | 5/2014 | Horst et al. |
| 2014/0135666 A1 | 5/2014 | Butler et al. |
| 2014/0206976 A1 | 7/2014 | Thompson et al. |
| 2014/0288381 A1 | 9/2014 | Faarbaek et al. |
| 2015/0045697 A1 | 2/2015 | Richard et al. |
| 2015/0091588 A1 | 4/2015 | Wickboldt et al. |
| 2015/0325148 A1 | 11/2015 | Kim et al. |
| 2015/0335522 A1 | 11/2015 | Okada et al. |
| 2015/0351689 A1 | 12/2015 | Adams et al. |
| 2016/0055767 A1* | 2/2016 | Tessier ................ G09B 23/288 434/267 |

FOREIGN PATENT DOCUMENTS

| | | |
|---|---|---|
| EP | 1 073 310 B1 | 1/2001 |
| EP | 2 883 496 A1 | 6/2015 |
| KR | 10-2012-0094373 A | 8/2012 |
| KR | 10-1504633 B1 | 3/2015 |
| KR | 10-2015-0066988 A | 6/2015 |
| KR | 10-1605383 B1 | 3/2016 |
| WO | 2010/105053 A2 | 9/2010 |
| WO | 2010/107913 A2 | 9/2010 |
| WO | 2012-035129 A2 | 3/2012 |
| WO | 2012-055745 A1 | 5/2012 |
| WO | 2012/141586 A1 | 10/2012 |
| WO | 2014/165022 A2 | 10/2014 |
| WO | 2015/003509 A1 | 1/2015 |
| WO | 2015/008935 A1 | 1/2015 |
| WO | 2015/031905 A1 | 3/2015 |
| WO | 2015075696 A1 | 5/2015 |
| WO | 2015189275 A1 | 12/2015 |

\* cited by examiner

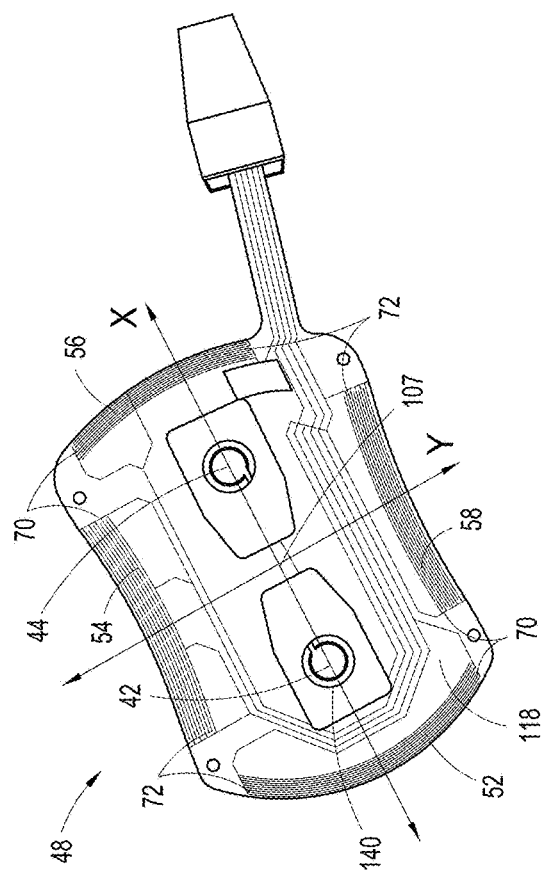
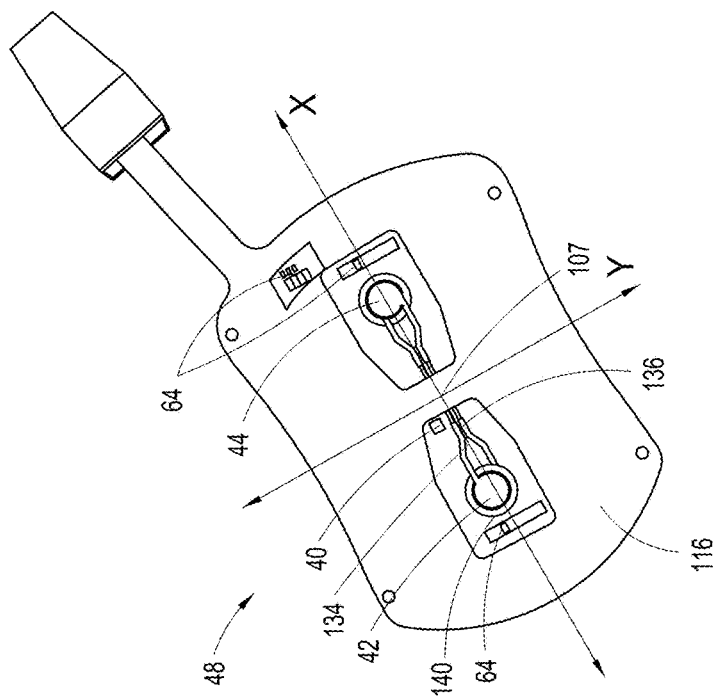
FIG. 6B
FIG. 6A

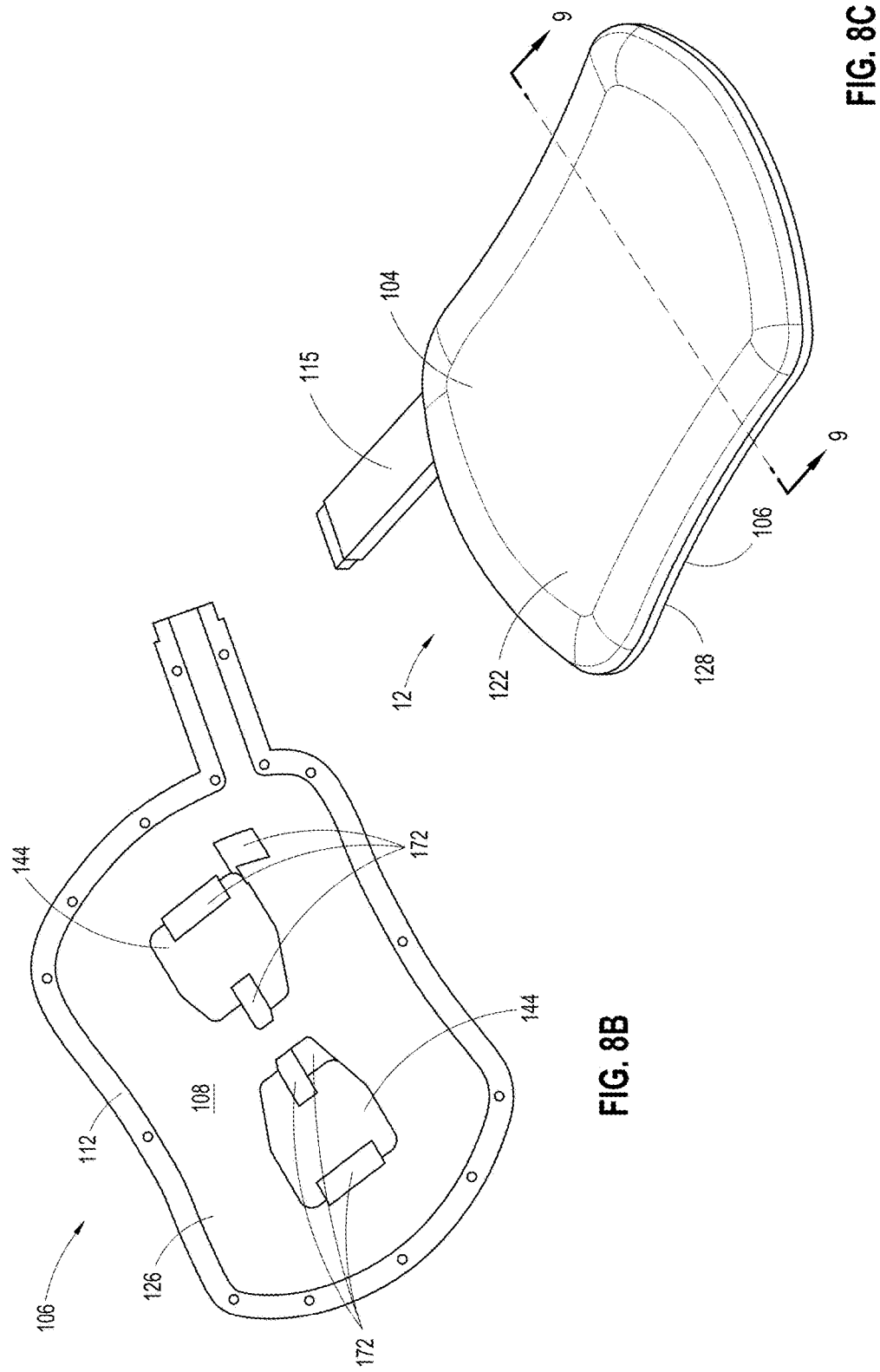

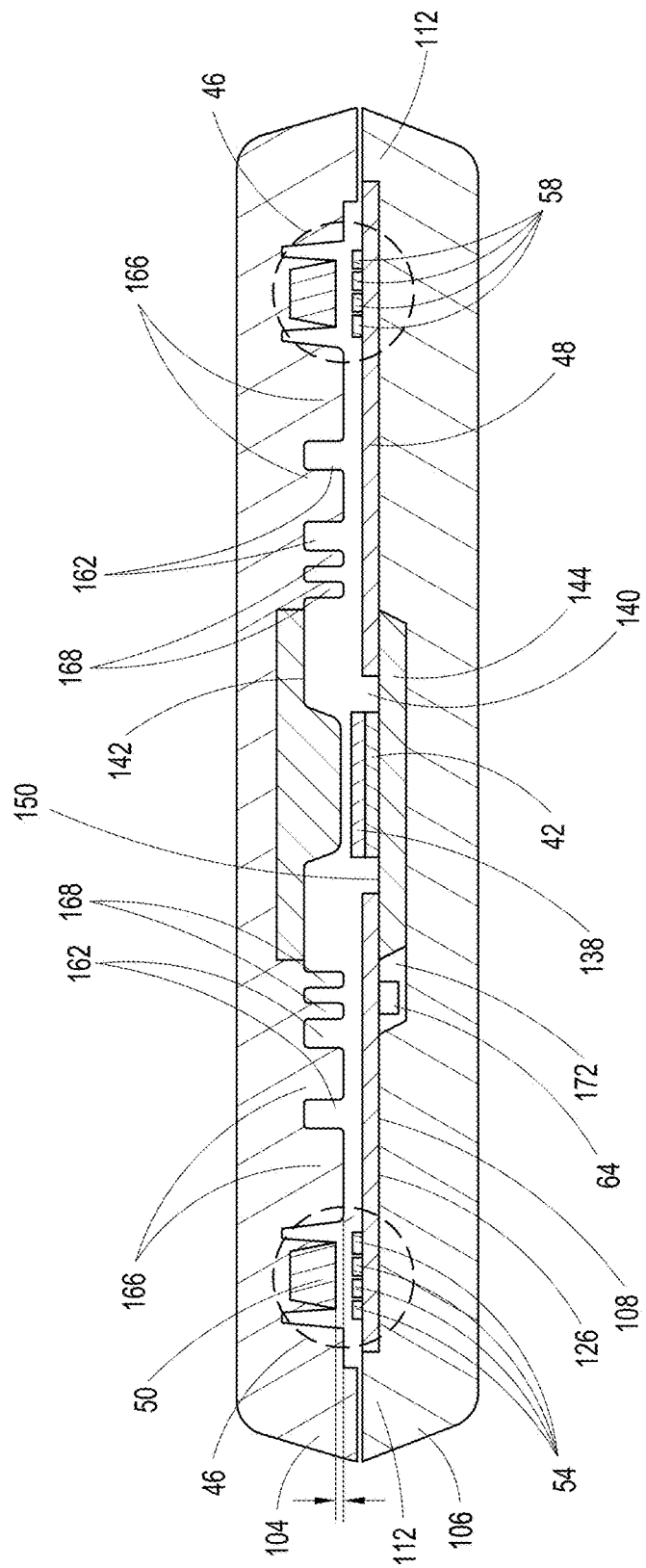

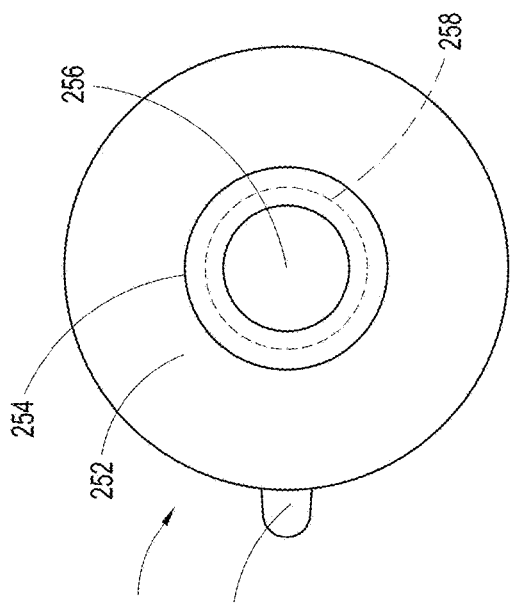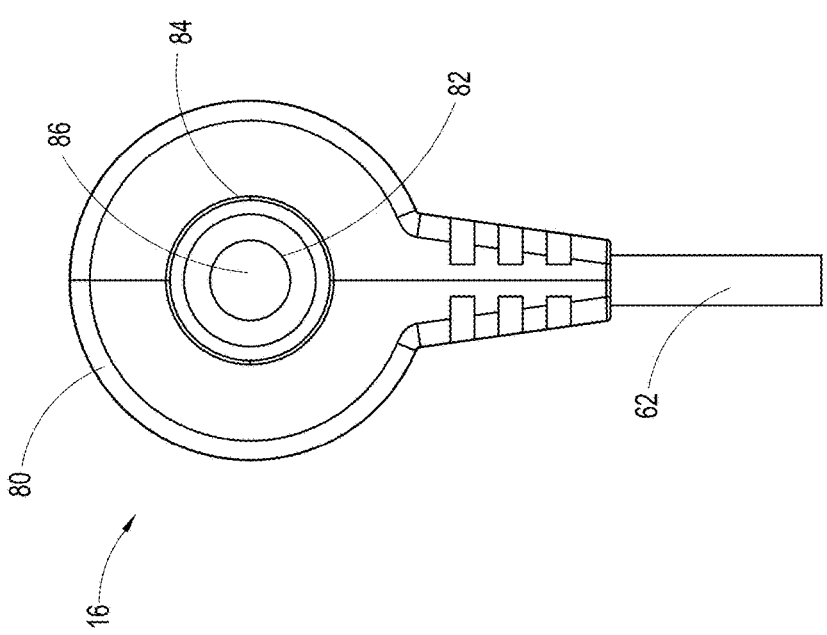

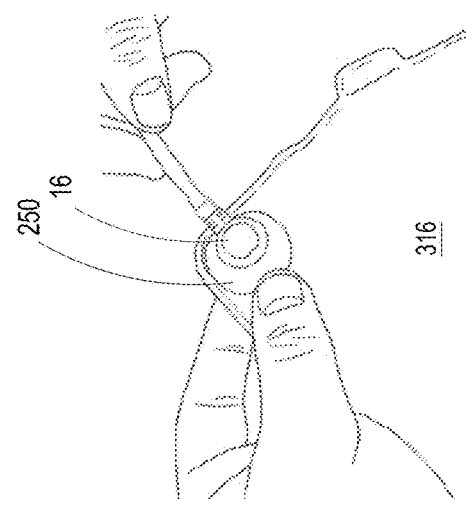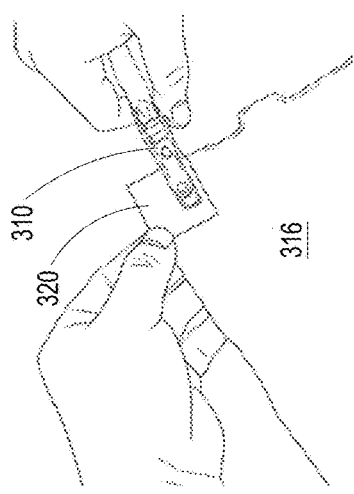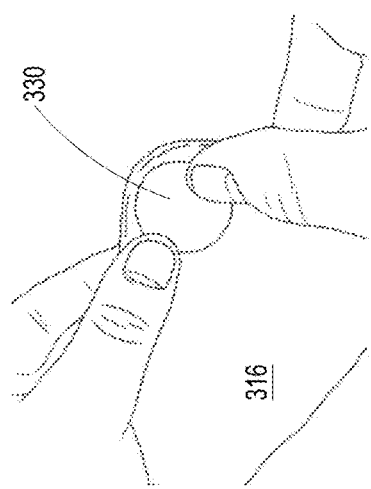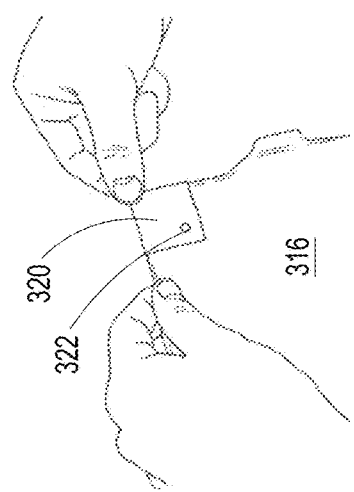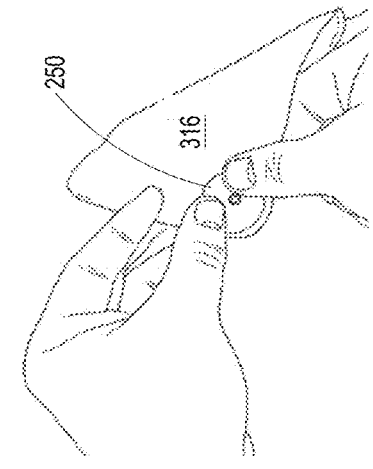

Result
+Number of success / Number of attempts

| Cycle | Compression | Breath |
|---|---|---|
| Cycle 1 | 22/30 | 2/2 |
| Cycle 2 | 14/30 | 2/2 |
| Cycle 3 | 27/30 | 2/2 |
| Cycle 4 | 9/30 | 2/2 |
| Cycle 5 | 18/30 | 2/2 |

Repeat    Complete

FIG. 39

Detail - Mike

Cycle 1

Compression Depth
⌂ Recoil Needed   ⬦ Too weak   ✕ Wrong position

Recoil
Good
Strong
  5   10   15   20   25   30

Compression Rate
Duration: 15,81sec, Average rate: 113/min
Fast
Good
Slow
  5   10   15   20   25   30

Breath Volume
Hands off time: 6.64sec

Strong
Good
Weak
  1   2

Compression Position

CPR TRAINING SYSTEM AND METHOD

BACKGROUND

The present disclosure relates to a training system and method for cardiopulmonary resuscitation (CPR). CPR is a lifesaving technique useful in emergency situations when a person is not breathing and has no pulse. CPR supplies life-sustaining oxygen to the brain and other vital organs until emergency medical responders arrive. CPR training is essential to ensure that the lifesaving technique is safely and effectively performed. CPR training systems and methods use human manikins.

SUMMARY

One aspect of the invention provides a method for a CPR training. The method comprises one or more of the following steps:
  providing a manikin comprising an interior structure and a removable skin fitted over the interior structure, the interior structure comprising a frame corresponding a rib cage of a human body;
  providing a compression pad comprising a housing, at least one force sensor, at least one acceleration sensor housed within the housing, at least one force sensors configured to detect force applied thereto, the at least one acceleration sensor configured to detect acceleration applied thereto;
  lifting or removing the skin to expose at least part of the frame;
  subsequently placing a compression pad over the frame;
  subsequently fitting the skin over the interior structure such that the compression pad is located in the manikin's chest region under the skin;
  performing a sequence of initializing compressions onto the manikin's chest region, which applies force and acceleration that the at least one force sensor and the at least one acceleration sensor can detect respectively;
  providing initializing force signals generated by the at least one force sensor and initializing acceleration signals generated by the at least one acceleration sensor in response to the initializing compressions;
  processing the initializing acceleration signals to generate initializing displacement signals representing displacement of the compression pad caused by the initializing compressions;
  processing the initializing force signals and the initializing displacement signals to provide a correlation between displacement of the compression pad and force applied to the compression pad by the initializing compressions;
  subsequently, performing a CPR training session comprising a sequence of training compressions onto the manikin's chest region, which applies force and acceleration that the at least one force sensor and the at least one acceleration sensor can detect respectively;
  providing training force signals generated by the at least one force sensor in response to the training compressions; and
  computing displacement caused by the training compressions using the training force signals and the correlation between displacement and force by the initializing compressions, wherein computing displacement does not use acceleration caused by the training compressions.

The above-described method further comprises one or more the following features:
  wherein the at least one force sensor comprises a first force sensor and a second force sensor that are apart from each other within the housing,
  wherein the first and second force sensors are configured to generate their one force signals which are processed to provide the force signals of the at least one force sensor,
  wherein the compression pad comprises a first pressing plate and a first support plate between which the first force sensor is sandwiched, and
  wherein the first pressing plate comprises a raised portion raised toward the first force sensor and configured to contact the first force sensor in response to compressions applied to the compression pad.

In the above-described methods, the compression pad further comprises:
  a printed circuit board (PCB) enclosed within the housing;
  a plurality of contact sensors comprising a first element and a second element;
  the first element comprising a plurality of contact patches provided on an inner surface of the housing, wherein the plurality of contact patches are made of an electrically conductive material and are not electrically connected to each other; and
  the second element comprising one or more sets of contact patterns formed on the PCB, wherein the contact patterns in each set comprises two or more electrically separate conductive patterns in close proximity with each other and exposed toward at least part of the plurality of contact patches.

The above-described methods further comprise one or more the following features:
  wherein the plurality of contact patches are arranged on the inner surface of the housing and the contact patterns are arranged on the PCB such that each contact patch faces a corresponding set of contact patterns while the contact patch does not contact its corresponding set of contact patterns when no external force or compression is applied to the housing, and
  wherein the apparatus is configured to generate contact signals when at least one of the contact patches contacts its corresponding set of contact patterns in response to external force or compression applied onto the housing.

The above-described methods further comprise one or more the following features:
  presenting the computed displacement to a user performing the CPR training session real time, and
  wherein providing training force signals and computing displacement are performed real time while the training compressions are conducted such that a displacement value is obtained for each compression before the next compression is performed onto the manikin.

The above-described methods further comprise one or more the following features:
  comparing the computed displacement against a predetermined range of compression depth to determine whether each compression of the CPR training session satisfies a compression depth requirement; and
  presenting a result of determination real time before the user performs the next compression onto the manikin.

The above-described methods further comprise one or more the following features:

providing a breathing module comprising a lung bag and an air pressure sensor connected to the lung bag such that the air pressure sensor can detect air pressure within the lung bag;

connecting the lung bag with a breathing cavity of the manikin such that the breathing cavity of the manikin and the lung bag are in fluid communication therebetween;

placing the lung bag over the compression pad after placing the compression pad over the manikin's frame and before fitting the skin over the interior structure;

performing a sequence of initializing breathings via the breathing cavity of the manikin, which blows air into the lung bag that the air pressure sensor can detect;

providing initializing air pressure signals generated by the air pressure sensor in response to the initializing breathings;

providing volume information of the initializing breathings;

processing the initializing air pressure signals and the volume information to provide a correlation between volume of the initializing breathings and air pressure within the lung bag caused by the initializing breathings;

subsequently, performing the CPR training session further comprising at least one training breathing via the manikin's breathing cavity, which blows air into the lung bag that the air pressure sensor can detect;

providing training air pressure signals generated by the air pressure sensor in response to the at least one training breathing; and computing volume caused by the training breathing using the training air pressure signals and the correlation between volume and air pressure by the initializing breathings, wherein volume is not detected for the at least one training breathing.

The above-described methods further comprise one or more the following features:

wherein the CPR training session comprises the sequence of training compressions and the at least one training breathing that are repeated multiple times, wherein the method further comprises: confirming a compression when the force signal or its corresponding displacement signal is greater than a predetermined compression threshold, and confirming a breathing when the air pressure or its corresponding volume is greater than a predetermined breathing threshold.

In the above-described methods, the CPR training session involves a first instance in which the air pressure sensor generates an air pressure signal greater than the predetermined breathing threshold in response to performing the training compressions even if no breathing is performed at the same time.

In the above-described methods, the CPR training session involves a second instance in which the force sensor generates force signals greater than the predetermined compression threshold in response to performing the at least one training breathing even if no compression is performed at the same time.

In the above-described methods, in the first or second instance, the method determines that the user has performed a compression or a breathing in view of an immediately previous user action of compression or breathing that has been confirmed.

In the above-described methods, in the first or second instance, the method determines that the user has performed a compression regardless of the air pressure signal.

In the above-described methods, in the first or second instance, the method determines that the user has performed a compression if the time taken from the immediately previous confirmed user action of compression or breathing is shorter than a predetermined reference time, wherein the method determines the user has performed a breathing, if the time taken from the immediately previous confirmed user action of compression or breathing is longer than a predetermined reference time.

In the above-described methods, in the first or second instance, the method determines that the user has performed a compression or a breathing in view of the number of immediately previous consecutive compressions of the user and further in view of the required number of consecutive compressions of the CPR training session such that if the number of immediately previous consecutive compressions of the user is smaller than the required number of the CPR training session, it is determined that the user has performed another compression.

The above-described methods further comprise one or more the following features:

connecting the lung bag with a breathing cavity of the manikin such that the breathing cavity of the manikin and the lung bag are in fluid communication therebetween;

performing a sequence of initializing breathings via the breathing cavity of the manikin, which blows air into the lung bag that the air pressure sensor can detect;

providing initializing air pressure signals generated by the air pressure sensor in response to the initializing breathings;

providing volume information of the initializing breathings;

processing the initializing air pressure signals and the volume information to provide a correlation between volume of the initializing breathings and air pressure within the lung bag caused by the initializing breathings;

subsequently, performing the CPR training session further comprising at least one training breathing via the manikin's breathing cavity, which blows air into the lung bag that the air pressure sensor can detect;

providing training air pressure signals generated by the air pressure sensor in response to the training breathing; and computing volume caused by the training breathing using the at least one training air pressure signals and the correlation between volume and air pressure by the initializing breathings, wherein volume is not detected for the at least one training breathing.

Another aspect of the invention provides a compression pad apparatus for CPR training. The apparatus comprises one or more of the following features:

a housing comprising an interior surface;

a printed circuit board (PCB) enclosed within the housing;

at least one force sensor configured to detect force;

a plurality of contact sensors comprising a first element and a second element;

the first element comprising a plurality of contact patches provided on the inner surface, wherein the plurality of contact patches are made of an electrically conductive material and are not electrically connected to each other;

the second element comprising one or more sets of contact patterns formed on the PCB, wherein the contact patterns in each set comprises two or more electrically separate conductive patterns in close proximity with each other and exposed toward at least part of the plurality of contact patches;

wherein the plurality of contact patches are arranged on the inner surface of the housing and the contact patterns are arranged on the PCB such that each contact patch faces a corresponding set of contact patterns while the contact patch does not contact its corresponding set of contact patterns when no external force or compression is applied to the housing; and wherein the apparatus is configured to generate contact signals when at least one of the contact patches contacts its corresponding set of contact patterns in response to external force or compression applied onto the housing.

The above-described apparatus further comprises one or more of the following features:

wherein the housing comprises a plurality of recesses formed into the interior surface for accommodating the plurality of contact patches, and wherein each contact patch is inserted in one of the plurality of recesses such that a top surface of the contact patch inserted into the recess is at a level lower than the interior surface to ensure that the top surface of the contact patch does not contact its corresponding set of contact patterns formed on the PCB when the apparatus is operably assembled.

Another aspect of the invention provides a method for a CPR training. The method comprises one or more of the following features:

providing a manikin comprising an interior structure and a removable skin fitted over the interior structure, the interior structure comprising a frame corresponding a rib cage of a human body;

providing a compression pad comprising a housing and a plurality of contact sensors that are housed within the housing;

lifting or removing the skin to expose at least part of the frame;

subsequently placing a compression pad over the frame;

subsequently fitting the skin over the interior structure such that the compression pad is located in the manikin's chest region under the skin;

detecting at least one location of compression applied onto the compression pad when a CPR training session comprising a chest compression is performed onto the manikin's chest region, wherein the at least one location of compression is detected by the plurality of contact sensors; and determining whether the chest compression of the CPR training session is performed on a desired area based on the at least one location of compression.

In the above-described method, determining comprises comparing the at least one location of compression against a predetermined pattern of compression locations.

The above-described methods comprise one or more of the following features:

wherein the compression pad comprises at least one force sensor housed within the housing, and wherein the plurality of contact sensors is provided within the housing along a perimeter of the housing such that the plurality of contact sensors generally surround the at least one force sensor.

The above-described methods comprise one or more of the following features:

wherein the housing comprises a top cover and a bottom cover, wherein the compression pad comprises a flexible PCB placed between the top cover and the bottom cover, wherein the plurality of contact sensors comprises a plurality of conductive patches and further comprises a plurality of sets of conductive patterns formed on the PCB, and wherein the compression pad is configured such that the at least one location of compression is detected when one or more of the plurality of conductive patches contact at least one set of conductive patterns by the chest compression.

BRIEF DESCRIPTION OF THE DRAWINGS

The drawings are provided to illustrate examples and embodiments described herein and are not intended to limit the scope of the invention.

FIG. 6A is a bottom view of a PCB of the compression pad according to an embodiment.

FIG. 6B is a top view of the PCB of the compression pad according to an embodiment.

FIG. 8B is a top view of a bottom of the compression pad according to an embodiment.

FIG. 8C illustrates a perspective view of the compression pad according to an embodiment.

FIG. 9 illustrates a cross-section of the compression pad taken along line 9-9 of FIG. 8C.

FIG. 12C illustrates a bottom view of the air pressure sensor of FIG. 12B

FIG. 12D illustrates a top side view of the lung bag connector of FIG. 12B.

FIGS. 14A-14E illustrate installing the breathing module according to an embodiment.

FIG. 39 illustrates a summary of a single user's performance of CPR training session.

FIG. 42 illustrates a report for a CPR training session for a single user.

DETAILED DESCRIPTION OF EMBODIMENTS

Embodiments of the invention will now be described with reference to the accompanying drawings. The terminology used in the description presented herein is not intended to be interpreted in any limited or restrictive manner, simply because it is being utilized in conjunction with a detailed description of certain specific embodiments of the invention.

CPR Guidelines

To perform CPR effectively, it is important to follow suggested CPR guidelines, such as those provided by the American Heart Association (AHA). AHA guidelines specify various criteria regarding the sequence of chest compressions and rescue breathing (i.e., respiration or providing rescue breaths), the depth of the chest compressions, the rate of chest compressions, etc. According to the AHA guidelines, each compression should be at least 2 inches deep and delivered at a rate of 100-120 compressions per minute. After 30 compressions, a rescuer should provide two rescue breathings. Each breath should be a normal breath for the rescuer and delivered over 1 second while looking for the victims chest to rise and return to providing chest compressions. A total of two breaths should be given to the patient and then the rescuer should immediately start chest compressions again. The cycle of 30 compressions and two rescue breathings should be continued until the professional rescuers arrive.

CPR Training

Figure 1:
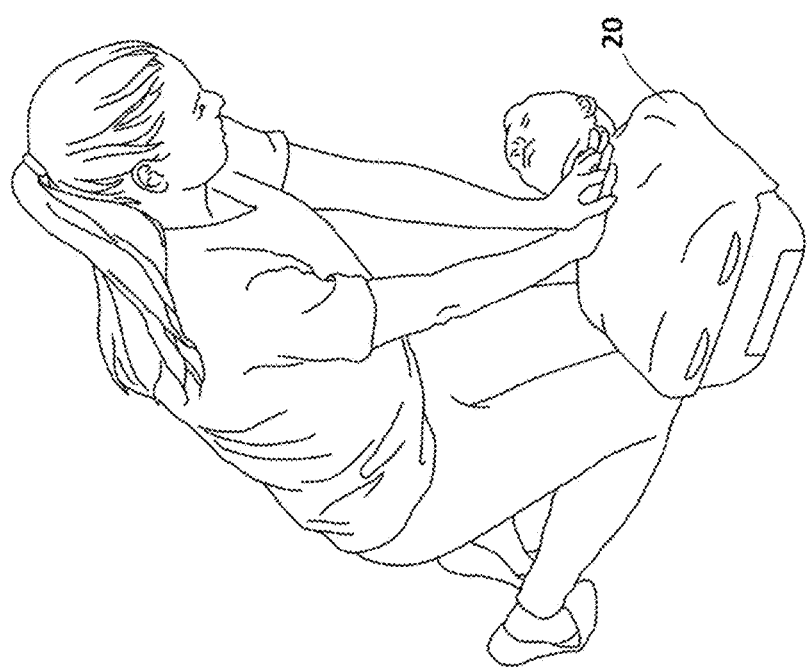
FIG. 1 illustrates a CPR training using a manikin.

CPR training is useful to teach students how to safely and effectively perform CPR. During CPR training, students may practice chest compressions and rescue breathing on manikins, as shown in FIG. 1. Typically, a CPR training manikin has a torso assembly and a head assembly with oral and/or nasal cavities (not shown). The oral and/or nasal cavities may be connected to a lung bag which corresponds to a human lung. Students perform chest compressions on the torso assembly and rescue breathings into the oral and/or nasal cavities. Accordingly, the students may practice CPR on the manikins according to the AHA guidelines.

Manikins with Integrated Sensors

Some manikins included sensors integrated with their body that monitor chest compressions and rescue breathings. These sensor-equipped manikins detect depths of chest compressions, breathing volumes and other aspects of CPR training performance and provide feedback to students and instructors. For example, some manikins use photoelectric sensors for monitoring displacement of the manikin chest during chest compressions and flow sensors for monitoring the volume of air input into the lung bag during rescue breathings. Other manikins may not be equipped with such sensors. These no-sensor manikins are unable to provide feedback regarding CPR performance.

CPR Training System

Figure 2:
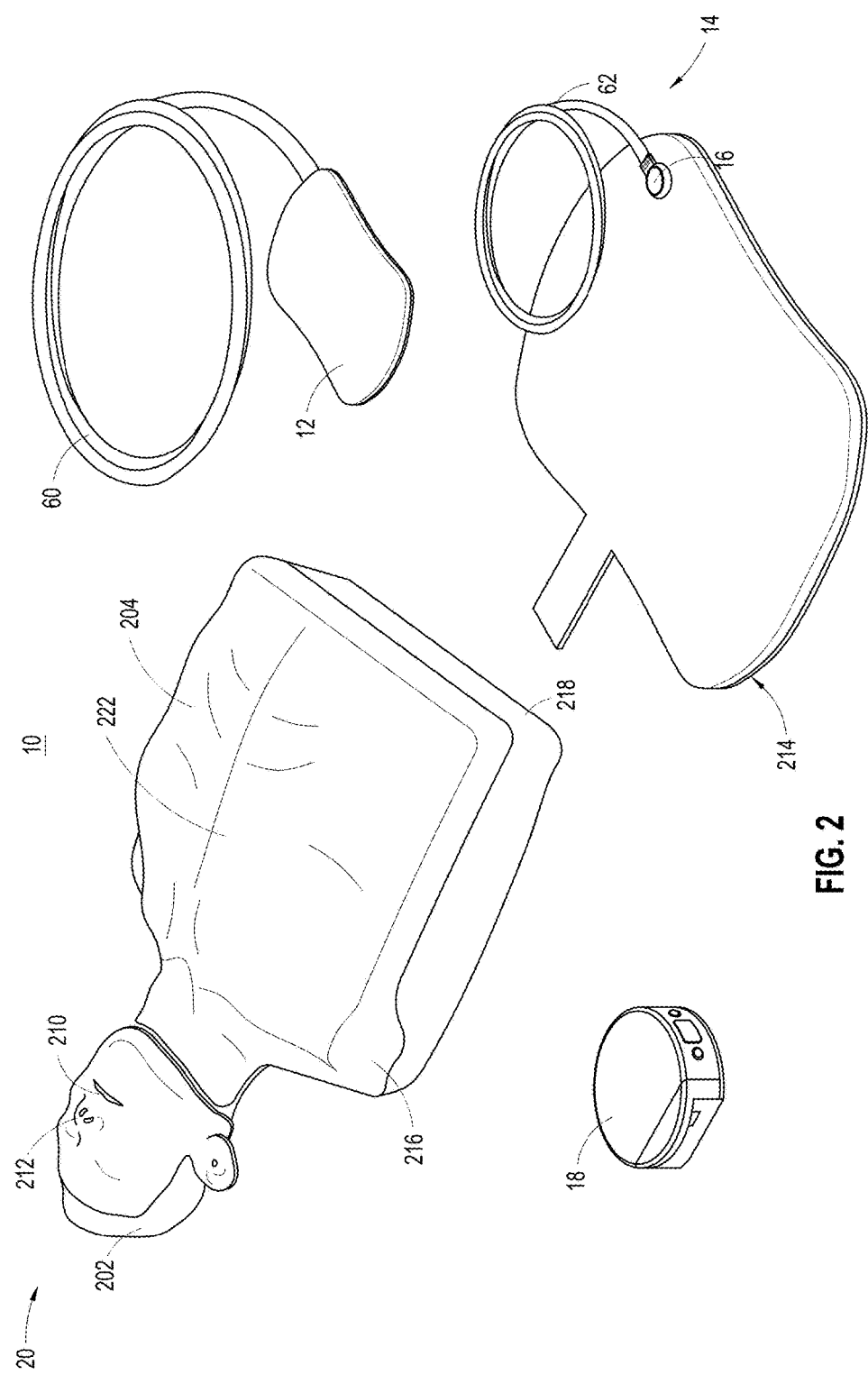
FIG. 2 illustrates components of a CPR training system according to an embodiment.

FIG. 2 illustrates components of a CPR training system according to embodiments of the invention. The CPR training system 10 includes a manikin 20, sensor modules and a data processing module 18. In embodiments, the sensor modules include a compression pad 12 and a breathing module 14. The manikin 20 anatomically represents a human upper body upon which CPR chest compressions and rescue breathings are to be performed. The compression pad 12 is for placing on the chest of the manikin 20 and sensing chest compressions performed on the manikin 20. The breathing module 14 is for sensing rescue breathings performed on the manikin 20. The data processing module 18 collects and processes the data collected from the sensor modules. Optionally, the CPR training system 10 includes an external computing device 30 that communicates with the data processing module 18.

Manikin

In embodiments, the manikin 20 provides a torso assembly 204 including a rib cage frame 220, although not limited thereto. The manikin 20 may include an anatomical representation of the sternum region 222 having a long, narrow and flat shape. In some embodiments, the manikin 20 may have markings indicating where the user's hands should be positioned to correctly perform chest compressions. In some embodiments, a spring or compression damper may support an underside of the sternum region 222 to provide compression and rebounding properties to the torso assembly 204. In embodiments, the manikin 20 is a no-sensor manikin although not limited thereto. The manikin 20 has a head assembly 202 that includes open oral and nasal airways 210, 212 which can be fluidly connected to a lung bag 214. In the illustrated embodiment of FIG. 3, the torso assembly 204 includes a manikin skin 216 that is overlaid onto the rib cage frame 220 and removable to expose the rib cage frame 220 and rib cage frame supports 221. In embodiments, the manikin skin 216 is flexible, elastic, and pliable similar to human skin. In some embodiments, the manikin skin 216 is not removable from the torso assembly 204.

Chest Compression Module

In embodiments, the chest compression module 12 is also referred to as a compression pad and is to be placed over the chest region of the manikin 20 where a user's hands are to be positioned to correctly perform chest compressions. The compression pad 12 detects chest compression characteristics to determine whether the user is correctly performing chest compressions. The chest compression characteristics include one or more of compression position, compression depth, compression force, compression rate and compression acceleration although not limited thereto.

Breathing Module

In embodiments, the breathing module 14 includes an air pressure sensor 16 and a lung bag 214. The air pressure sensor 16 is fluidly and air-tightly connected to the lung bag 214. The air pressure sensor 16 measures the air pressure within the lung bag 214. The air pressure is used to compute the volume of air blown into the lung bag 214 ultimately to determine whether the user is correctly performing rescue breathings on the manikin 20. In embodiments, the lung bag 214 is a one-time use or disposable bag although not limited thereto.

Data Processing Module

In embodiments, the data processing module is a special purpose computing device 18 connected to the compression pad 12 and the breathing module 14. The data processing module 18 includes at least one processor, a memory, and circuitry for communication and other functions. The data processing module 18 processes data provided by the compression pad 12 and the breathing module 14. In some embodiments, the data processing module is implemented with software installed in a general purpose computer or computing device, as opposed to the special purpose computing device 18.

External Computing Device

In embodiments, the data processing module 18 transmits certain processed data to the external computing device 30 for the purpose of further processing the data and presenting performance of CPR practices. In embodiments, the external computing device 30 includes a display upon which the user may be provided with immediate and real-time feedback regarding the user's CPR performance.

Software

In embodiments, one or more software modules are stored and run on the data processing module 18 for processing data collected from the sensor modules. In embodiments, additional software is stored and run on the external computing device 30 which allows the user to review feedback regarding the user's CPR performance.

CPR Training Procedure

In embodiments, the CPR training includes the steps of installing components, initializing sensor modules and CPR training sessions. The CPR training according to embodiments of the invention may skip one or more of these steps and may include some additional steps.

Installation of Components

To perform CPR training sessions, components of the CPR training system 10 are assembled and installed. In embodiments, the compression pad 12 and breathing module 14 are placed at desired locations of the manikin 20 and connected to the data processing module 18.

Compression Pad Under the Skin

Figure 3:
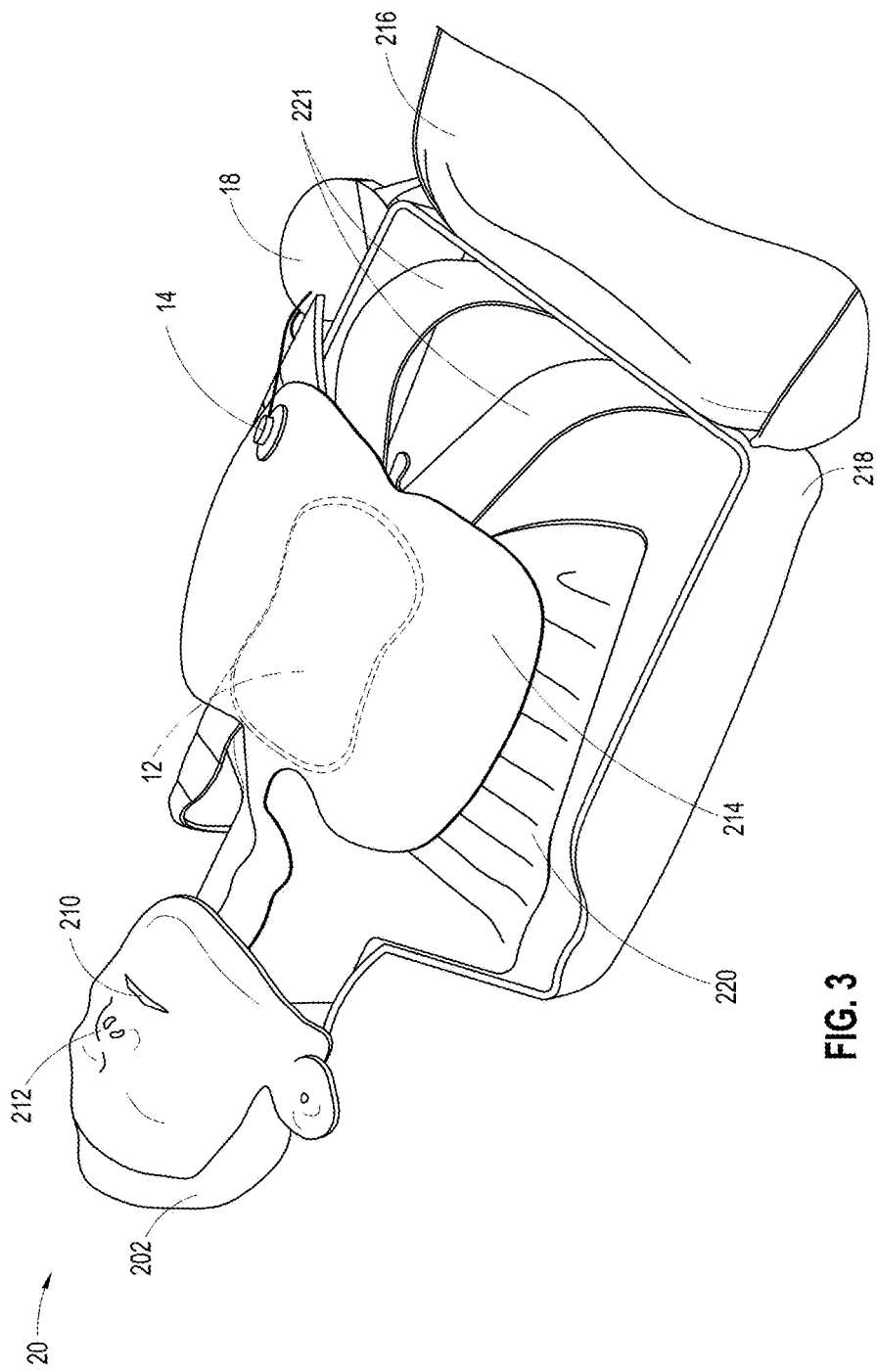
FIG. 3 illustrates a compression pad and a breathing module under the skin of a manikin.

Referring to FIG. 3, the skin 216 is lifted or removed from the torso assembly 204 of the manikin 20, and the compression pad 12 is placed over the chest or sternum region 222. Thereafter, the skin 216 is placed over the compression pad 12 such that the compression pad 12 is positioned under the skin 216 of the manikin 20. For manikins where the torso assembly does not include a removable skin, the compression pad 12 may be positioned on the outer surface of the torso assembly at a position over the sternum region.

Aligning Compression Pad

In embodiments, the center of the compression pad 12 is aligned with the center of the chest or sternum region 222 in view of markings provided on the manikin 20. Further, in embodiments, the compression pad 12 is placed over the sternum region 222 such that the lengthwise direction of the compression pad 12 is aligned with the lengthwise direction of the sternum region 222.

Attaching Compression Pad

In embodiments, the compression pad 12 is attached to the sternum region 222 using a film adhesive, Velcro or other appropriate means such that the compression pad 12 does not move relative to the torso assembly 204 when chest compressions are performed.

Breathing Module Sandwiched Between Skin and Compression Pad

In embodiments, the breathing module 14 is installed such that the air pressure sensor 16 is connected to the lung bag 214 which is also connected to the manikin's airways. In embodiments, the lung bag 21 is placed over the compression pad 12 before the lifted or removed skin 216 is placed down such that at least a portion of the lung bag 21 is interposed between the compression pad 12 and the skin 216. FIG. 3 illustrates an embodiment in which the lung bag 214 of the breathing module is positioned over the compression pad 12. The removable skin 216 is then fastened to the manikin 20 such that the lung bag 214 and the compression pad 12 are sandwiched between the removable skin 216 and the rib cage frame 220. In other embodiments, the lung bag 214 may be positioned outside the torso assembly 204 such that no portion of the lung bag 214 is sandwiched between the compression pad 12 and the skin 216.

Initializing Sensor Modules

In embodiments, the compression module 12 and breathing module 14 are calibrated and initialized prior to CPR training sessions. The compression module 12 is initialized according to chest compression response characteristics of the particular manikin 20 upon which the compression module 12 is fitted. Similarly, the breathing module 14 is initialized according to volume-pressure relationship of the particular lung bag 214 to which the air pressure sensor 16 is connected.

Conducting CPR Training Session

Figure 4:
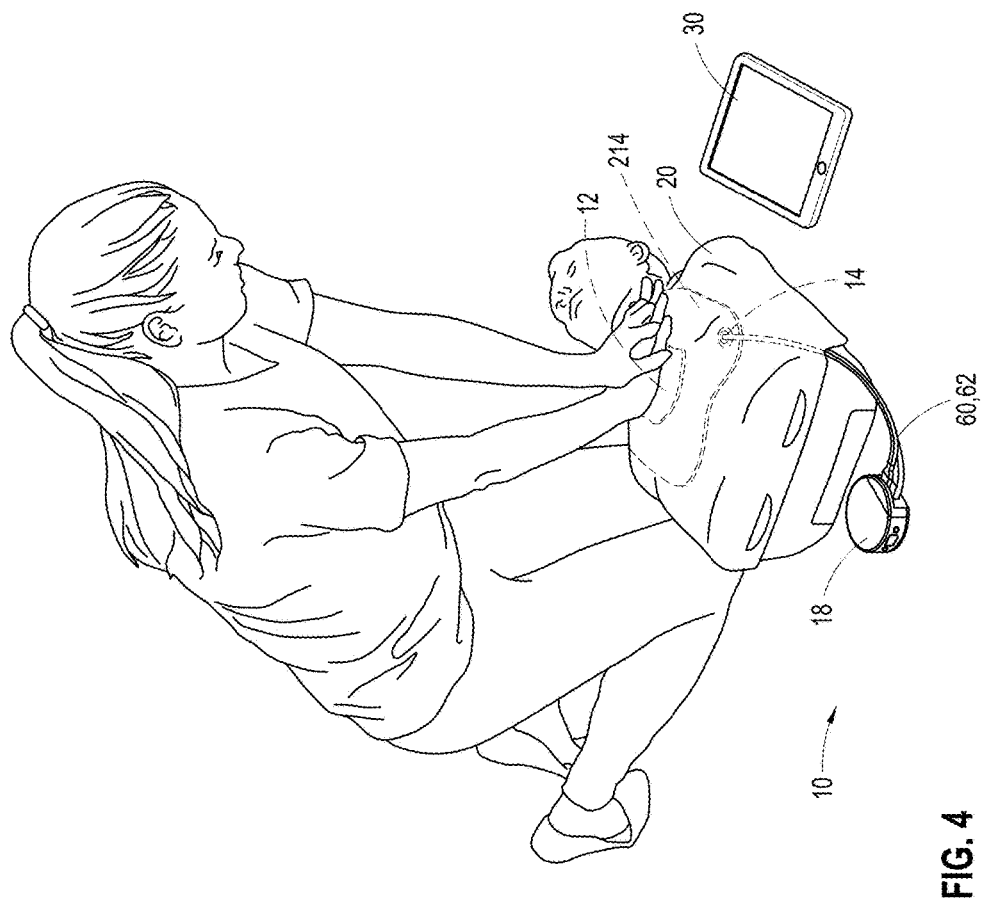
FIG. 4 illustrates CPR training using a CPR training system according to an embodiment.

In embodiments as shown in FIG. 4, after the compression pad 12 and breathing module 14 are calibrated and initialized, a user can start a CPR training session to receive feedback regarding the user's CPR. During the training session, the CPR training system 10 monitors and analyzes the signals from the compression pad 12 and the breathing module 14 to evaluate the user's performing of chest compressions and rescue breathing.

Evaluating Chest Compressions

In embodiments, the CPR training system 10 determines and evaluates the compression depth of chest compressions being performed during the CPR training session based on the relationship between the compression depth and the compression force for the manikin's unique compression response characteristic that was determined during the initialization process. The CPR training system also evaluates a compression rate during the CPR training session.

Evaluating Breathings

In embodiments, the CPR training system 10 evaluates the rescue breathings performed during the CPR training session based on the formula or correlation representing the manikin's unique breathing characteristic determined in the initializing of the breathing module.

CPR Training Session Feedback

In embodiments, the CPR training system 10 determines whether an identified compression is too strong, good, or too weak by comparing its (maximum) compression depth with a range of desirable compression depths. In embodiments, the CPR training system 10 also determines whether the user performs compressions too fast, too slow, or at a desirable rate in view of a desirable compression rate. In embodiments, the CPR training system 10 also determines whether a rescue breathing is too strong, good, or too weak by comparing the breathing volume with a range of desirable breathing volumes. In embodiments, the CPR training system provides feedback of CPR training performance in real time.

Feedback to Student or User

In embodiments, the feedback from the CPR training system 10 may be displayed on a user interface of the external computing device 30. The external computing device 30 may have a user interface that displays feedback regarding the user's performance during and after the CPR training session.

Monitoring Multiple Training Sessions Performed Concomitantly

In embodiments, the external computing device 30 may be used to monitor the performance of multiple users simultaneously. That is, an instructor may utilize the external computing device 30 to monitor one or more CPR training sessions. Further, data from CPR training sessions may be saved and reviewed at a later time.

Layers of Compression Pad

Figure 5:
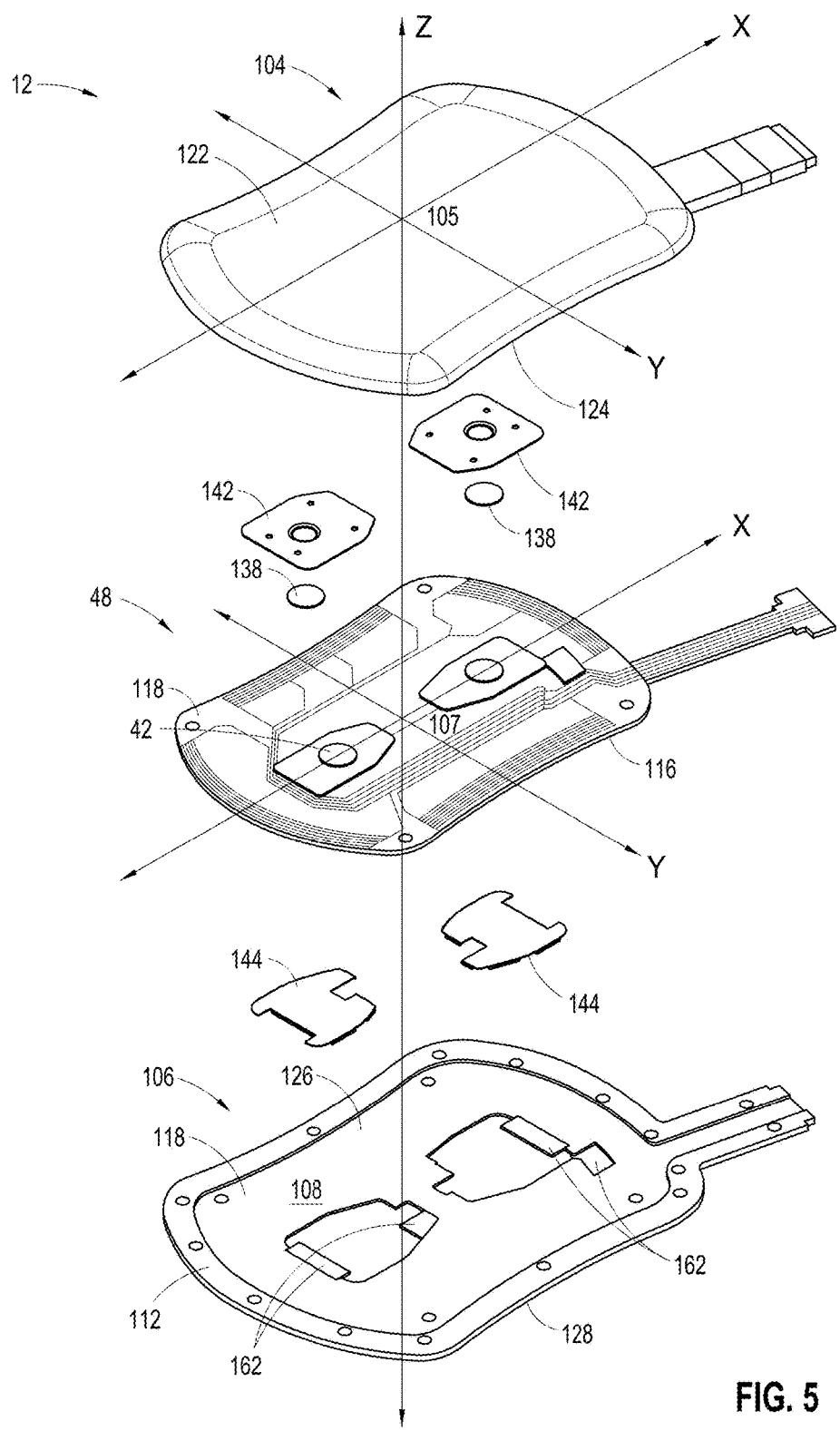
FIG. 5 illustrates an exploded view of a compression pad according to an embodiment.

FIG. 5 illustrates the compression pad 12 according to embodiments of the invention. The compression pad 12 includes layers that are stacked upon each other. The compression pad 12 includes a top cover 104, a bottom cover 106 and a printed circuit board (PCB) 48. The top cover 104 has an outer surface 122 and an inner surface 124 (i.e., the surface facing the bottom cover 106). The bottom cover 106 has an inner surface 126 (i.e., the surface facing the top cover 104) and an outer surface 128. The PCB 48 is positioned between the top cover 104 and the bottom cover 106. The PCB 48 is enclosed by the top and bottom covers 104, 106.

Flexible and Deformable Covers

In embodiments, each of the top and bottom covers 104, 106 of the compression pad 12 have a thin flexible and deformable construction formed of elastomeric material such as latex or silicone rubber. The flexible and deformable construction of the covers enable that overall the compression pad 12 is configured to flex and deform when a pressure or force is applied thereto during chest compressions. Accordingly, the compression pad 12 can conform to the shape of the chest region of the manikin 20 when the compression pad 12 placed there and skin 216 is fastened to the manikin 20. The flexibility and thickness of the compression pad 12 does not block, obstruct or impede the fitting and fastening of the skin 216 to the manikin 20.

Shape of Compression Pad

Referring to FIG. 5, the top and bottom covers 104, 106 are substantially flat and planar. In embodiments, the top and bottom covers 104, 106 also have a generally rounded rectangular hourglass shape with the length in the X axis that is greater that the width in the Y axis. The narrower middle region provided by the hourglass shape provides increased flexibility at the narrower middle region relative to wider regions. The compression pad 12 is not limited to a rounded rectangular hourglass shape and may have a variety of shapes. In embodiments, the length is from about 13 to about 20 cm, and the width is from 8-14 cm. In some embodiments, the length is about 15-17 cm, and the width is about 10-12 cm.

Size of Compression Pad

Proper hand placement for performing CPR chest compressions requires the heel of the user's hand to be positioned over the sternum region 222. Accordingly, the compression pad 12 is configured in a size and shape that aligns with and covers the sternum region 222. In some embodiments, the compression pad 12 may have a universal size that allows the CPR training system 10 to be fitted to a variety of manikin sizes (infant, baby, junior, adult, etc.).

Interior Cavity of Bottom Cover

The bottom cover 106 has an interior cavity 108 that is recessed into the inner surface 126 of the bottom cover 106. The interior cavity 108 has a shape that corresponds to the PCB 48. The interior cavity 108 may be defined by an outer sidewall 112 of the bottom cover 106. In some embodiments, the PCB 48 is attached to the inner surface 126 of the bottom cover 106 by an adhesive.

Top and Bottom Covers Attached to Each Other

The top cover 104 is attached to the bottom cover 106 along the outer sidewall 112. The top and bottom covers 104, 106 are attached to each other by adhesive, bonding or other fastening techniques such that the flexible PCB 48 is enclosed between the top and bottom covers 104, 106. In embodiments, the top and bottom covers 104, 106 may have a connection arrangement, such as but not limited to, snap-fit connectors, alignment holes and pins, bosses, etc. which may be used to align and attach the top and bottom covers 104, 106 together.

Flexible PCB

As illustrated in FIG. 5, in embodiments, the PCB 48 includes a thin film substrate, circuitry printed on the film, chips, sensors and other components of the compression pad 12. The sensors include an accelerometer 40, two force sensors (or pressure sensors) 42, 44 and multiple contact sensors 46. In embodiments, the thin film substrate is formed from layers of thin film material that is flexible or semi-flexible so as to be able to bend without short circuiting or degradation of the connections with the sensors or mounted components. FIG. 6A is a view of an underside 116 of the flexible PCB 48. FIG. 6B is a view of a top side 118 of the PCB 48.

Accelerometer

In embodiments, the accelerometer 40 is positioned on the underside 116 of the PCB 48 facing the bottom cover 106. The accelerometer 40 is positioned near the center 107 of the PCB 48 but offset a distance from the center 107 of the PCB 48. The accelerometer 40 is in the form of a chip based on MEMS technology and may include capacitive, piezoelectric, Hall-effect and semiconductor type accelerometers. Once assembled in the compression pad, the accelerometer chip 40 protrudes from the underside of the PCB 48 and received in a recess formed into the bottom cover 106, which avoids or reduces direct impact of compression force onto the chip.

Measurements by Accelerometer

During chest compressions, the accelerometer 40 measures the acceleration of the compression pad 12 or the acceleration applied to the compression pad 12 in the Z axis (i.e., depth direction or compression/rebound direction of the rib cage frame 220 of the manikin 20). The acceleration in the Z direction can be used to compute the depth of compression. In some embodiments, the accelerometer 40 also measures the acceleration along the X axis (i.e., the height direction of the manikin 20 and the lengthwise direction of the compression pad 12) and the Y-axis (i.e., the width direction of the manikin 20 and the widthwise direction of the compression pad 12). The acceleration in the X axis and the Y axis may be used to calculate the angle of chest compression force. In some embodiments, the accelerometer 40 may include an assembly of one or more accelerometers such that separate accelerometers measure the acceleration along a single axis.

Force Sensors

As shown in FIGS. 6A and 6B, in embodiments, the compression pad 12 includes two force sensors 42, 44, although not limited to two sensors. The force sensors 42, 44 senses the pressure or force applied to the compression pad 12 when chest compressions are performed. The force sensors 42, 44 generate a force signal representing the force or pressure applied to the compression pad 12. It should be understood to one of ordinary skill in the art that the term pressure or force may be used interchangeably throughout the disclosure to describe a force applied to the compression pad 12.

Configuration of Force Sensors

In embodiments, each force sensor 42, 44 has a top surface facing the top cover 104 and a bottom surface facing the bottom cover 106. In embodiments, the top and bottom surfaces are made of a rigid material to receive force or pressure in a direction passing the two surfaces. In embodiments, the top and bottom surfaces are substantially flat. In embodiments, the force sensors 42, 44 are single-element piezo-electric or piezo-resistive pressure sensors, although not limited thereto.

Force Sensor Locations

Figure 7:
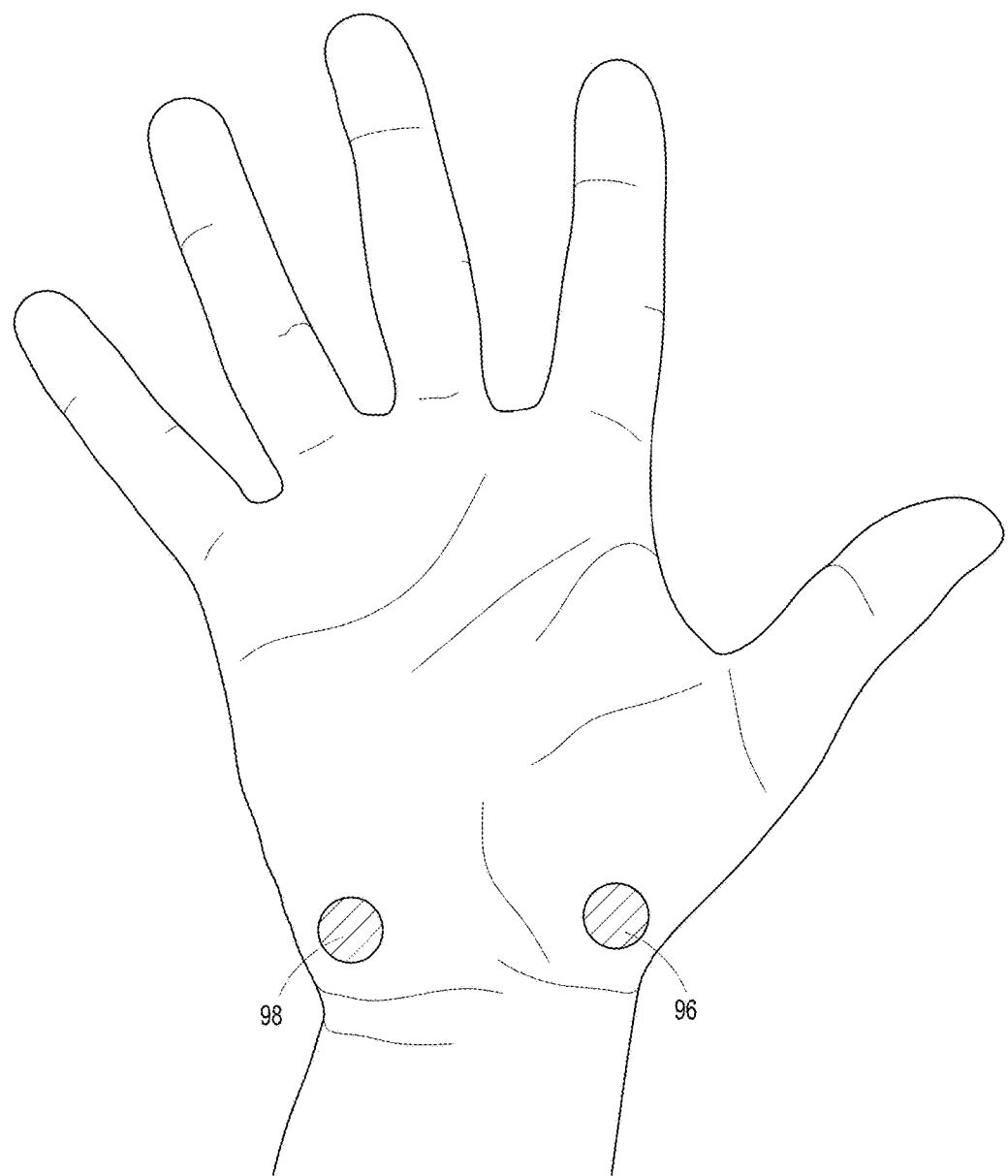
FIG. 7 illustrates thenar and hypothenar regions of a human hand.

As shown in FIGS. 6A and 6B, in embodiments, the two force sensors 42, 44 are positioned along the longitudinal direction or the X axis of the PCB 48 with a distance therebetween. In embodiments, each force sensor 42, 44 is equidistantly offset a distance from the center 107 of the PCB 48 along the X axis. In embodiments, the force sensors 42, 44 may be spaced apart from each other by a distance that is substantially equal to the distance between the thenar region 96 and hypothenar region 98 of an average-sized adult human measured near the base of the hand, as illustrated in FIG. 7. In embodiments, the distance between the centers of the force sensors 42, 44 is about 4.5, 5.0, 5.5, 6.0, 6.5 and 7.5 cm. The distance between the centers of the force sensors 42, 44 is in a range formed by two chosen from the numbers listed in the immediately previous sentence. Accordingly, the force sensors 42, 44 are positioned on the PCB 48 such that the force sensors 42, 44 are aligned with the thenar and hypothenar regions 96, 98 of the user's hand when the user's hand is properly placed over the compression pad.

Through-Holes for Force Sensors

As shown in FIG. 6B, in embodiments, the PCB 48 has two through-holes 140 that correspond to the force sensors 42, 44 such that the force sensors 42, 44 are aligned with the through-holes 140. The force sensors 42, 44 are connected to terminals 136 formed on the underside of the PCB 48 via connecting arms 134, and extend through the through-holes 140 from an underside 116 of the PCB 48 to the topside 118 of the PCB 48. As the force sensors 42, 44 correspond to the through-holes 140, the two through-holes 140 are spaced apart from each other along the X axis by the same distance of the force sensors 42, 44 as discussed in the foregoing paragraph. In some embodiments, no through-holes are formed in the PCB 42, and the force sensors 42, 44 are formed onto the underside or topside of the thin film substrate of the PCB 48. When no through-holes are formed, no circuitry or circuit lines are formed on the thin film substrate where the force sensors 42, 44 are to contact.

Contact Sensors

Figure 8A:
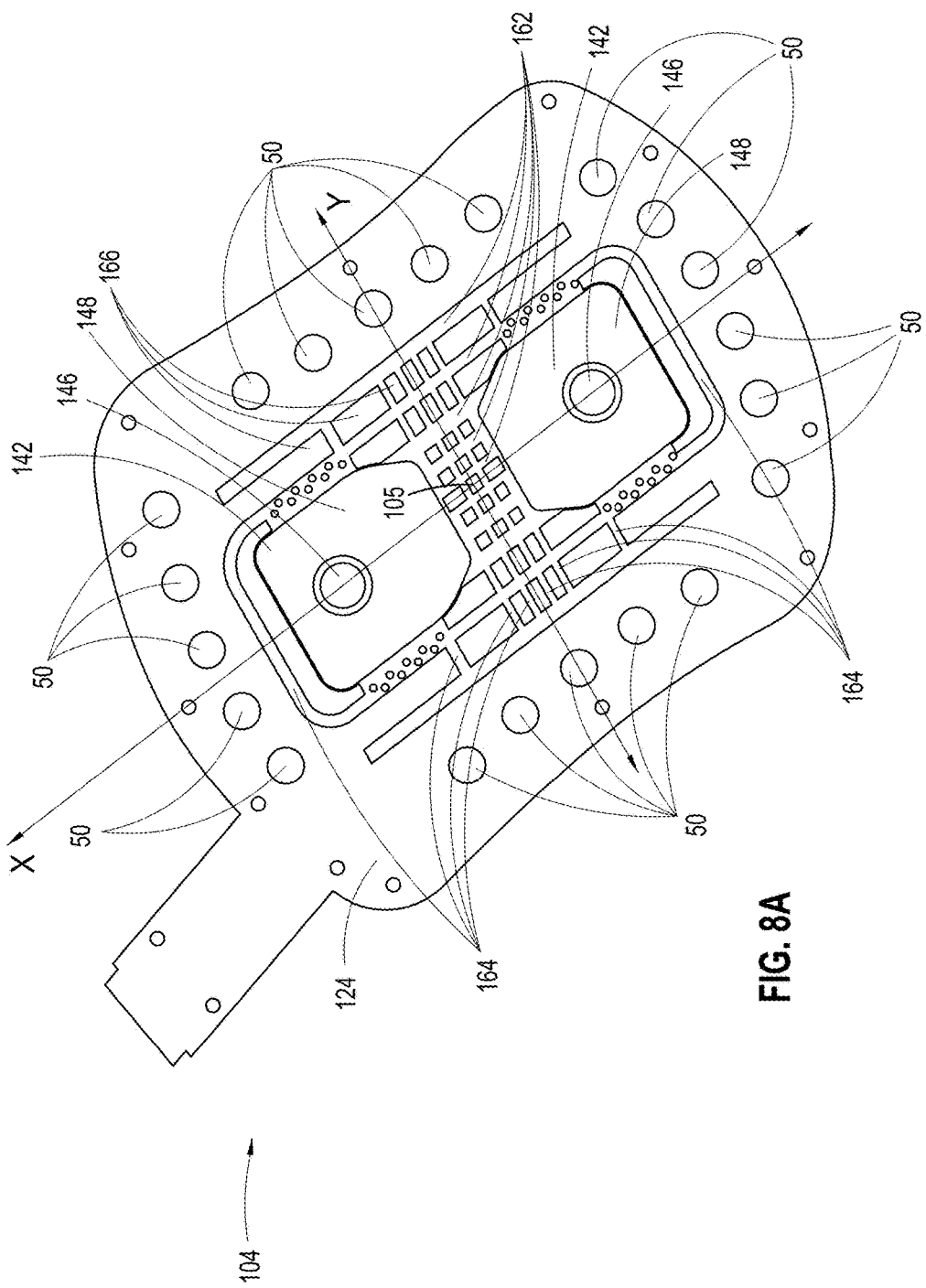
FIG. 8A illustrates a bottom view of a top cover of the compression pad.

In embodiments, as in FIG. 8A, the compression pad 12 has a plurality of contact sensors 46 that detect areas or locations of the compression pad 12 to which the force of chest compressions is applied. The detection is used for determining whether the user's hands are properly positioned on the manikin 20 and the compression pad 12. In embodiments, the contact sensors 46 are comprised of a plurality of flexible and electrically conductive contact patches 50 formed on the top cover 104 and exposed electrical traces 52, 54, 56, 58 formed on the PCB 48. In embodiments, the contact sensors 46 (patches and electrical traces) generally surround the force sensors 42, 44 when viewed in the Z axis and are arranged along the perimeter or outer edges of the compression pad 12. In embodiments, the contact sensors 46 (patches and electrical traces) are arranged along both lengthwise edges (i.e., generally along the X axis) and both widthwise edges (i.e., generally along the Y axis) of the compression pad 12.

Contact Patches and Exposed Electrical Traces Correspond

In embodiments, as shown in FIG. 8A, the contact patches 50 are positioned on the inner surface 124 of the top cover 104. As shown in FIG. 6B, the four sets of exposed electrical traces 52, 54, 56, 58 are formed on the top side of the PCB 48 and face the contact patches. In the illustrated embodiment, each set of the exposed electrical traces 52, 54, 56, 58 extends along an edge of the PCB 48. In embodiments, the contact patches 50 are positioned over and aligned with the exposed electrical traces 52, 54, 56, 58. As shown in FIG. 9 (a cross-section taken along the line 9-9 in FIG. 8C), each contact patch 50 is positioned immediately over part of one set of the exposed electrical traces 52, 54, 56, 58. Although not illustrated, multiple contact patches 50 along one edge of the top cover 104 correspond to the extension of one set of the exposed electrical traces 52, 54, 56, 58 along one edge of the PCB 48.

Contact Patches

As illustrated in FIG. 9, in embodiments, each contact patch 50 is a conductive material piece inserted into a recess formed on the perimeter of the top cover 104. Each contact patch 50 is not electrically connected to any circuit or to any of the other contact patches 50. The top surface of the contact patch 50 is at a level slightly lower than the perimeter surface of the top cover 104 (slightly higher than the perimeter surface in FIG. 9) such that the contact patch 50 would not contact its corresponding set of the exposed electrical traces of the PCB 48 without applying force onto the top cover 104 of the compression pad 12. The contact patches 50 may be formed from a conductive elastomeric material such as conductive carbon or silicone rubber. In other embodiments, a conductive film can be formed on an outer contact surface of the contact patches 50 that are not made of a conductive material.

Detecting Force or Pressure by Contact Sensors

Each set of the exposed electrical traces 52, 54, 56, 58 includes multiple conductive lines (contact patterns) 70, 72 that are printed on the upper side of the PCB 48 such that they run generally parallel to each other with a gap and not electrically connected with each other (open circuit). When external force is applied to the compression pad 12 over contact patches 50, at least one contact patch 50 contacts at least two of the multiple conductive lines 70, 72 of its corresponding set. As a result, the at least two conductive lines become electrically connected with each other via the at least one contact patch 50 and form a closed circuit, which is detected as an indication of the contact between contact patch and exposed electrical traces.

Determining Hand Position

Accordingly, when the user's hand applies force onto the top cover 104 of the compression pad 12, one or more of the contact patches 50 contact their corresponding set(s) of the exposed electrical traces 52, 54, 56, 58 and form closed circuit(s). Depending upon which sets of the exposed electrical traces form a closed circuit, the system may determine locations and areas of the compression pad 12 where compression force is applied. In embodiments, the system includes software and/or hardware that interprets the pattern of contacts to determine whether the user's hand is properly positioned on the compression pad 12 and/or the manikin's chest region. For example, if less than all four electrical traces 52, 54, 56, 58 are in a closed-circuit state, that may be interpreted as the user's hands not properly positioned over the sternum region 222. In some embodiments, signals from the contact sensors 46 may be cross-referenced and compared with the data from the force sensors 42, 44 and/or accelerometer 40 to further indicate whether the user's hands are properly positioned on the manikin 20 and the compression pad 12.

Pressing Plates and Support Plates

In embodiments, the compression pad 12 includes pressing plates 142 that transfer the force applied to the compression pad 12 to the force sensors 42, 44. Referring to FIGS. 5 and 8A, the pressing plates 142 are provided on the inner surface 124 of the top cover 104. Similarly, in FIGS. 5 and 8B, support plates 144 are provided on the inner surface 126 of the bottom cover 106. The pressing plates 142 and support plates 144 are made of a rigid material such as metal. In one embodiment, the pressing and support plates are made of stainless steel for the rigidity.

Force Sensor Sandwiched Between Corresponding Set of Pressing and Support Plates In embodiments, as shown in FIG. 9, one pressing plate 142 is positioned directly above the force sensor 42 and one support plate 144 is positioned directly below the force sensor 42 such that the force sensor 42 is positioned between the pressing plate 142 and support plate 144. Although not illustrated, the force sensor 44 is similarly positioned between the other set of pressing and support plates 142, 144. Further, since the pressing plates 142 and support plates 144 are positioned directly above and below the force sensors 42, 44, the pressing plates 142 and support plates 144 are also are aligned with the thenar and hypothenar regions 96, 98 of the user's hand when the hand is properly placed on the compression pad 12.

Attachment of Pressing and Support Plates

In embodiments as shown in FIG. 9, the support plates 144 are positioned within the inner surface 126 of the bottom cover 106 such that the top surface of the support plates 144 is flush with the inner surface 126. In other words, the outer surface 150 of the support plates 144 is level with the inner surface 126 of the bottom cover 106. The pressing plates 142 and support plates 144 are attached to the inner surfaces 124, 126 of the top and bottom covers 104, 106 by an adhesive material. In some embodiments, the pressing plates 142 and support plates 144 may be molded into the inner surfaces 124, 126 of the top and bottom covers 104, 106.

Shape of Support Plates

In embodiments, the pressing plates 142 may have a different plan shape (in the X-Y plane) than the support plates 144 of the bottom cover 106. In embodiments, the support plates 144 of the bottom cover may have a shape that accommodates the accelerometer 40, and the chips 64 that are mounted on the underside 116 of the PCB 48. The shape of the support plates 144 also correspond with chip recesses 172 formed within the inner surface 126 of the bottom cover 106 that provide a cavity within which the accelerometer 40 and the chips 64 may reside.

Size of Pressing Plates

In embodiments, as shown in FIGS. 8A to 9, each pressing plate 142 is significantly larger than each force sensor in the X-Y plane such that as forces applied to much wider than the force sensor in the X-Y plane can be transferred to the force sensor. On the other hand, in embodiments, each pressing plate 142 is significantly smaller than the compression pad 12 in the X-Y plane such that the top cover 104 remains flexible even with the hard material of the pressing plates 142.

Projection of Pressing Plate

In embodiments, as shown in FIG. 9, each pressing plate 142 has a raised portion or projection 146 generally in its central area in the X-Y plane that protrudes in the Z axis toward its corresponding force sensor 42 or 44. In embodiments, the projection 146 has a contact surface facing its corresponding force sensor 42, and the projection 146 is sized to match and aligned with the corresponding force sensor 42 such that the contact surface of the projection 146 can contact as much surface of the force sensor 42 or a layer 132 formed over the force sensor when force is applied to the compression pad 12.

Configurations of Support Plate

In embodiments, the support plate as shown in FIGS. 8A to 9, each support plate is significantly larger than each force sensor (in the X-Y plane) and substantially flat piece. Although not illustrated, each support plate may include a raised portion in its central area as in the pressing plates such that the raised portion is aligned with the bottom surface of the force sensor.

Interfaces with Force Sensor

In embodiments, as shown in FIG. 9, the pressing plate 142 does not contact the force sensor 42 or a force sensor pad 138 placed above the force sensor 42 when no force is applied to the compression pad 12. When the force is applied to the compression pad 12, the raised portion 146 of the pressing plate 142 moves downward and presses the sensor pad 138 and transmits force to the force sensor 42. In embodiments, as shown in FIG. 9, the force sensors 42, 44 contact its corresponding support plates 144 even when no force is applied to the compression pad 12. In other embodiments, an air gap may be provided between each force sensor and corresponding support plate. In other embodiments, a material may be inserted between each force sensor and corresponding support plate.

Single Pressing Plate and Single Support Plate

Although not illustrated, in some other embodiments, the compression pad 12 may include a single pressing plate (i.e., instead of two separate pressing plates 142) that transfers the downward force applied to the compression pad 12. Such a single pressing plate may be positioned generally at the central area of the top cover 104 such that downward force applied at the top cover 104 may be detected by both force sensors 42, 44. The compression pad 12 may also have only one support plate supporting two force sensors 42, 44.

Force Sensor Pad

In embodiments, as in FIGS. 5 and 9, the compression pad 12 includes a force sensor pad 138 positioned on each force sensor 42, 44. The force sensor pad 138 may be attached to the top surface of the force sensors 42, 44 such that it faces the projection 146 of the pressing plate 142. The force sensor pad 138 has a size and shape similar to the top surface of the force sensor 42, 44 and to the contact surface of the projection 146.

Semi-Rigid Pad

In embodiments, the force sensor pad 138 is formed of a semi-rigid material such as rubber or plastic. In embodiments, the semi-rigid material is softer or less rigid than the pressing plates and also softer or less rigid than the top surface of the force sensors. The semi-rigid material is not too soft or deformable such that substantially all force applied to the force sensor pad can be transferred to the force sensors. The semi-rigid material allows the force sensor pad 138 to distribute the downward force applied by the projections 146 laterally across the top surface of the force sensors 42, 44, as opposed to just a corner of a projection 146 contacting the force sensors 42, 44 when the pressing plates 142 descends downward at an angle relative to the force sensor pad 138.

Gap Between Pad and Projection

In embodiments, a small gap is provided between the force sensor pad 138 and the projections 146 of the pressing plate 142 when no downward force is applied to the compression pad 12. In other embodiments, the force sensor pad 138 and the projections 146 may be in slight contact when no downward force is applied to the compression pad 12.

Grooves and Ribs

In embodiments, the top cover 104 of the compression pad 12 includes a plurality of grooves and protrusions on its inner surface 124. Referring to FIG. 8A, longitudinal grooves 162 and lateral grooves 164 are formed on the inner surface 124 of the top cover 104. Ribs 166 are defined between these grooves as portions that are raised relative to the grooves. The structure of ribs and grooves increases localized flexibility and bending of the top cover 104 at locations within the top cover 104 where increased flexibility is desired. That is, the location and amount of bending or deformation of the top cover 104 may be varied by positioning the grooves and ribs at specific portions within the top cover 104.

Longitudinal Grooves

Figure 10B:
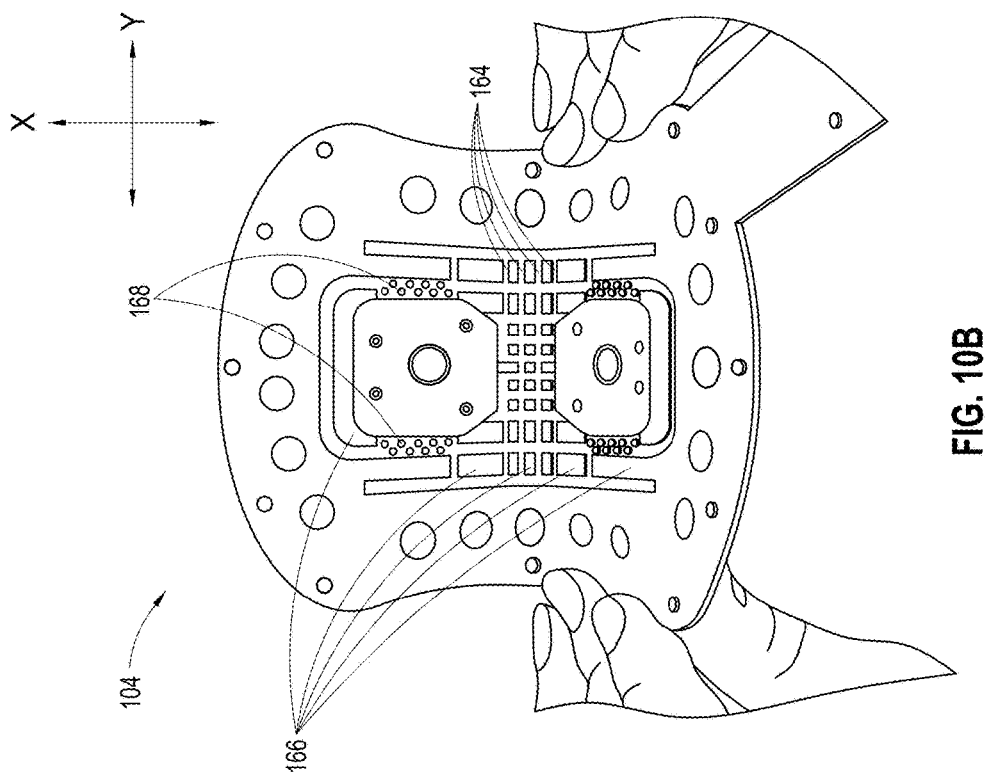
FIG. 10B illustrates the top cover deforming about lateral grooves formed on the top cover.
Figure 10A:
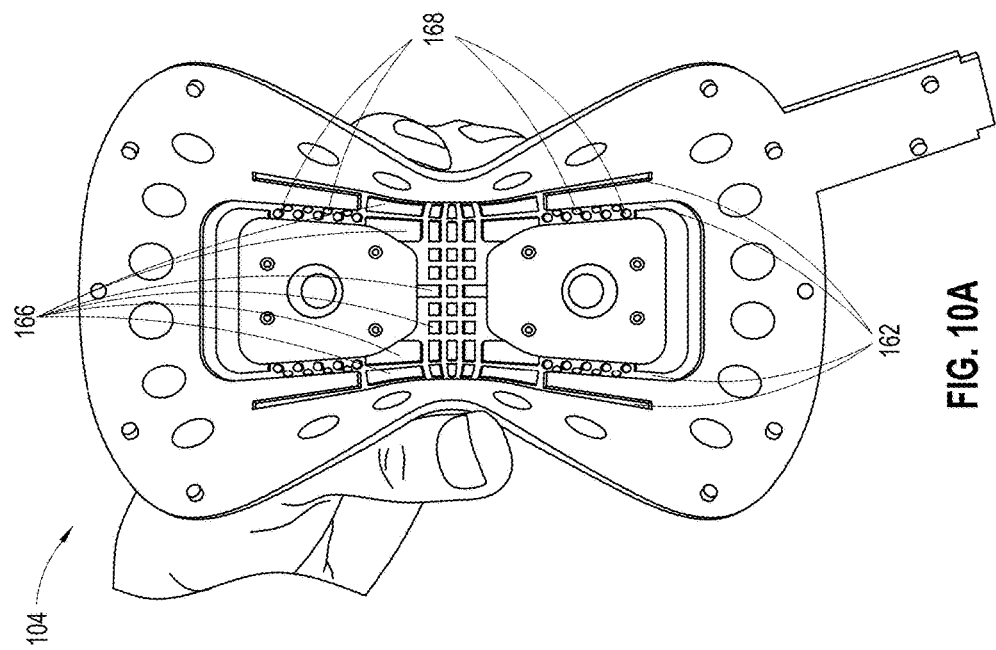
FIG. 10A illustrates deforming about longitudinal grooves formed on the top cover.

In embodiments, as illustrated in FIGS. 8A and 10A, the longitudinal grooves 162 extend generally linearly in the lengthwise direction or in the X axis. The longitudinal grooves 162 are incrementally spaced from the center 105 of the top cover 104 and extend longitudinally between both pressing plates 142. Longitudinal grooves 162 also extend along the longitudinal edges of both pressing plates 142 in the top cover 104.

Lateral Grooves

The lateral grooves 164 extend generally linearly in the widthwise direction or in the Y axis. The lateral grooves 164 are incrementally spaced from the center 105 of the top cover 104 between both pressing plates 142. The lateral grooves 164 extend laterally between the outermost longitudinal grooves 162. Lateral grooves 164 are also positioned between the outermost lateral edges of both pressing plates 142 between each pressing plate 142 and the contact sensors 50.

Making Grooves. Size and Shape

The longitudinal and lateral grooves 162, 164 may be molded into the top cover 104 during the molding process for forming the top cover 104. Alternatively, the longitudinal and lateral grooves 162, 164 may be cut or removed from the top cover 104. The depth, width and length of each respective groove 162, 164 affect the amount of bending of the top cover 104. In the illustrated embodiment, the depths and widths of each longitudinal and lateral groove 162, 164 is substantially equal. In some embodiments, the depths and widths of the longitudinal and lateral grooves may vary to provide increased or decreased bending of the top cover 104 at different locations. In embodiments, the top cover 102 is not limited to grooves in longitudinal and lateral direction. Grooves may extend in any direction. Similarly, the grooves are not limited to any size, shape or geometry and may vary according to the desired bending characteristics of the compression pad 12. In the illustrated embodiments, no grooves and ribs are provided in the bottom cover 106. In some embodiments, however, the bottom cover 106 may have grooves and ribs that are similar to those discussed herein.

More Bending with Grooves

The grooves 162, 164 are recessed into the inner surface 124 of the top cover 104, which results in reduction of the thickness of the top cover 104 within the recessed longitudinal and lateral grooves 162, 164. The reduced thickness in the grooves enables the grooves acting as an axis for localized bending or rotating of the top cover 104. FIG. 10A illustrates the outer edges of the top cover 104 bending about the longitudinal grooves 162. FIG. 10B illustrates the top cover 104 being bent in half about the lateral grooves 164.

More Bending Facilitates Lateral Transfer of Force

Figure 11A:
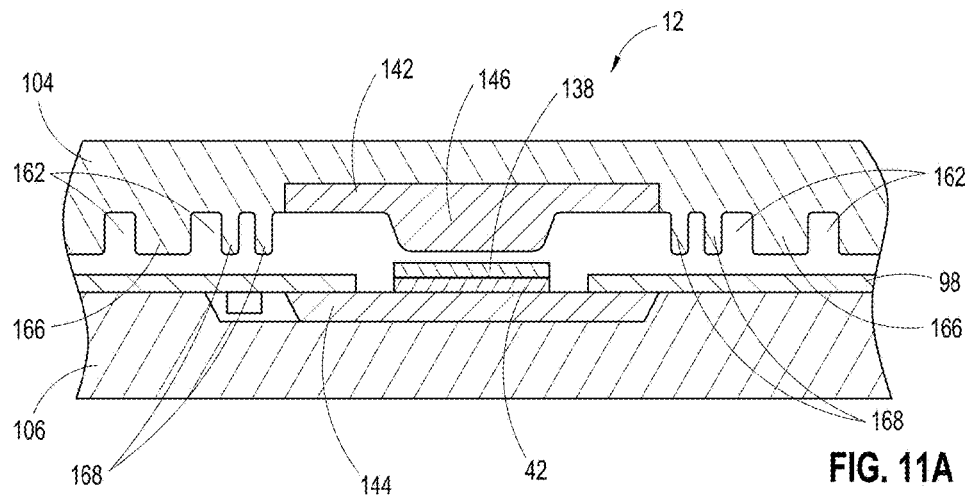
FIG. 11A illustrates a cross-section of the compression pad taken along line 9-9 of FIG. 8C.
Figure 11B:
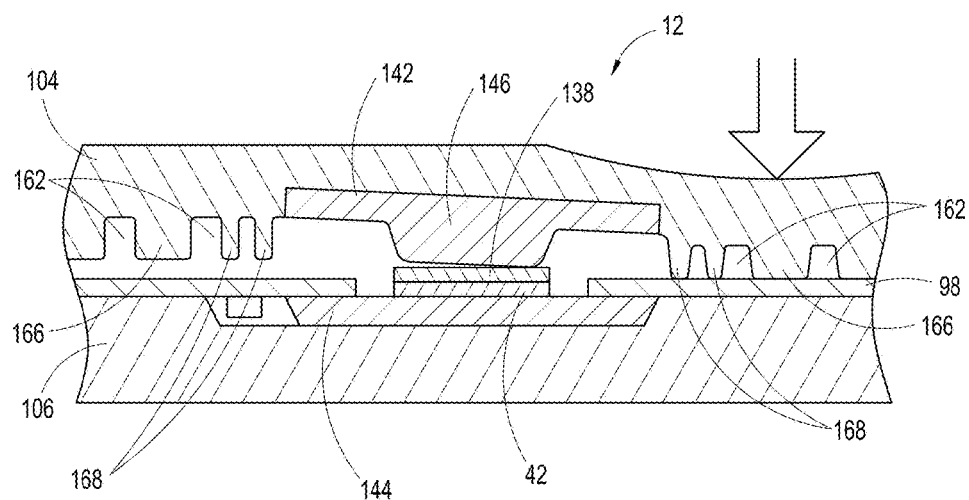
FIG. 11B illustrates a cross-section of the compression pad of FIG. 11A with force.
Figure 11C:
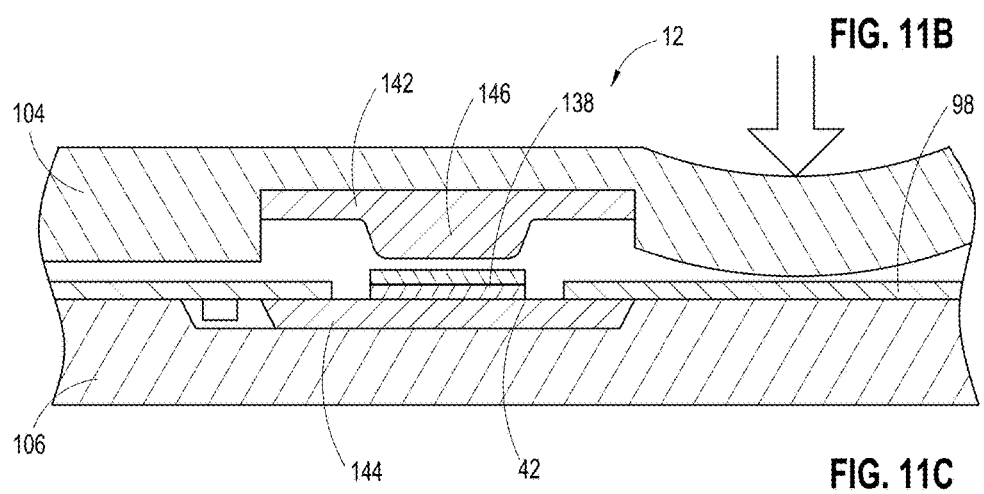
FIG. 11C illustrates a cross-section of a compression pad according to an embodiment.
Figure 12B:
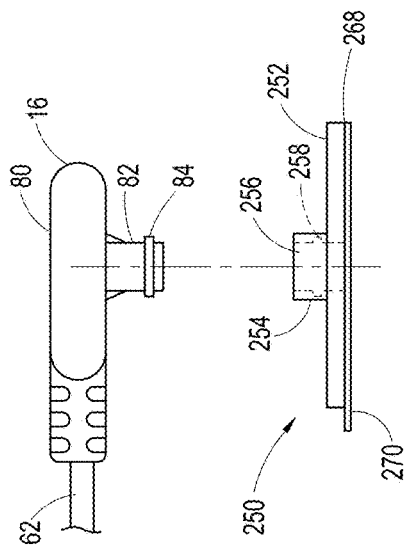
FIG. 12B illustrates a pressure sensor aligned with a lung bag connector.
Figure 12A:
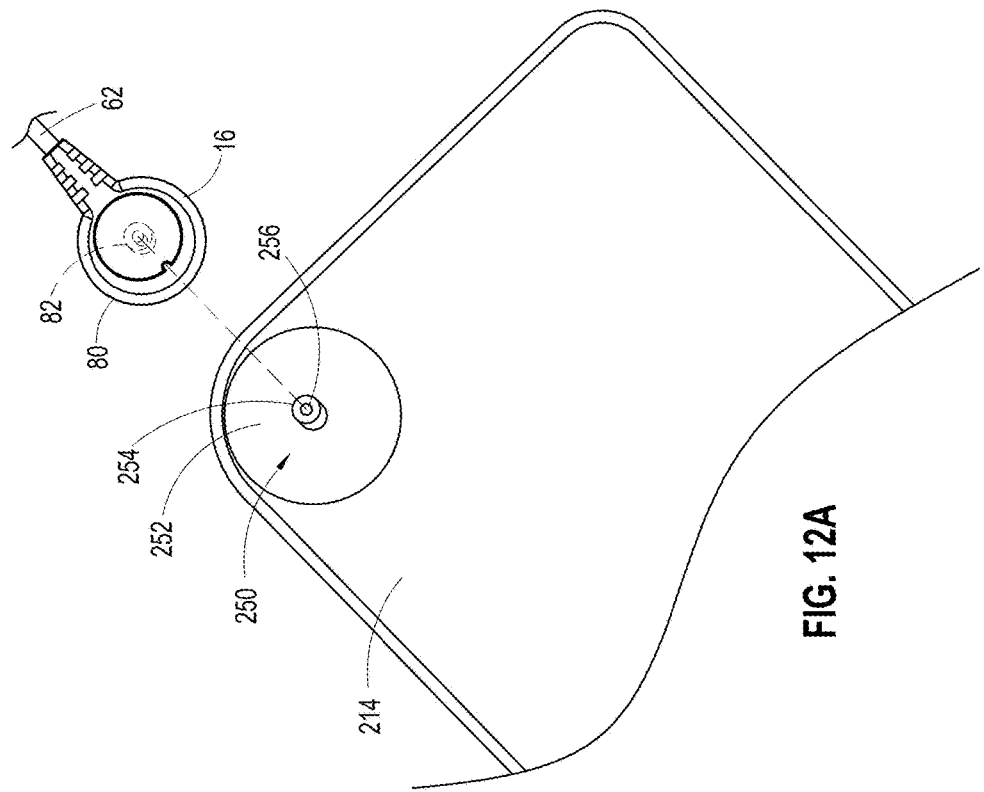
FIG. 12A illustrates a breathing module according to an embodiment.

FIG. 11A illustrates a cross-section of the top cover 104 taken by a plane passing line 9-9 of FIG. 8C when no force is applied to the compression pad 12. FIG. 11B illustrates the same cross-section when downward force is applied in the Z axis. With the grooves 162 between ribs 166, the top cover 104 bend in multiplicity about the extensions of the grooves 162 (into the drawing sheet) as the grooves 162 act as local bending or rotational axes. With the localized bending in multiplicity, the amount of deformation of the top cover 104 is more than it would have when no such grooves and ribs are provided in the top cover 104. FIG. 11C illustrates an embodiment without grooves or ribs in the top cover 104, in which the top cover 104 deforms generally in the immediate region where the downward force is applied. As a result, the pressing plates 142 may not contact the force sensor 42. More deformation of the top cover as in FIG. 11B causes transfer of the downward force in lateral directions (i.e., in X-Y plane) toward the pressing plate 142 such that the pressing plate 142 contact the force sensors 42, 44 despite the force not being applied immediately over the pressing plate 142. In embodiments, the deformation occurs over a wider area of the top cover 104 which includes the region of the top cover 104 surrounding the pressing plates 142.

Smaller Size Force Sensors

The greater and wider deformation provided by the structure of grooves and ribs ensures that the pressing plates 142 transfer the downward force to the force sensors 42, 44 despite not being applied directly over the pressing plates 142 or force sensors 42, 44. Thus, the compression pad 12 can have small size force sensors 42, 44 compared to the size of the compression pad 12. In embodiments, with the structure of grooves and ribs, the ratio of the area of the top cover of the compression pad to the total area of the top surfaces of the all force sensors is 50, 60, 70, 80, 90, 100, 110, 120, 130, 140, 150, 160, 170, 180, 190, 200, 210, 220, 230, 240 or 250. In embodiments, the ratio is in a range formed by two selected from the numbers listed in the immediately preceding sentence. In some embodiments, the ratio of the area of the compression pad to the total area of the top surfaces of the force sensors is from 70 to 140, from 80 to 120.

Grooves Closely Spaced Between Pressing Plates

In embodiments, the width (along the Y axis) of each longitudinal groove 162 located between the two pressing plates 142 is smaller than the width of each longitudinal groove 162 located in other areas of the top cover 102. In embodiments, the width (along the Y axis) of ribs formed between two immediately neighboring longitudinal grooves 162 located between the pressing plates 142 is smaller than the width (along the Y axis) of ribs formed between two immediately neighboring longitudinal groove 162 in other areas of the top cover 102. Similarly, the width of ribs (along the X axis) formed between two immediately neighboring lateral groove 164 located between the pressing plates 142 is smaller than the width of ribs formed between two immediately neighboring lateral groove 164 in other areas of the top cover 102. Accordingly, the flexibility of the top cover 104 between the pressing plates 142 is greater (i.e., where there are more grooves per unit area) than in areas of the top cover 104 outside of the area between the pressing plates 142.

Pressing Plates Surrounded by Grooves

In embodiments, as shown in FIG. 8A, the pressing plates 142 are entirely surrounded by the longitudinal and lateral grooves 162, 164 when viewed along the Z axis. In some embodiments, the grooves surround each pressing plate 142 at least partially when viewed in the same direction. Having the pressing plates 142 at least partially surrounded by the grooves 162, 164 provides the top cover 104 with flexibility that allows the pressing plates 142 to move downward and transfer the downward force laterally to the force sensors 42, 44 during chest compressions.

Chest Compression Module Conforms to Manikin

The increased flexibility and bending of the top cover 104 provided by grooves 162, 164 also allow the compression pad 12 to conform to the shape of the rib cage frame 220 such that the compression pad 12 is less visible and does not protrude from under the skin 216 when the compression pad 12 is placed under the skin. Protrusion through the removable skin 216 would conspicuously indicate the position of the compression pad 12 on the manikin 20 which is undesirable for teaching proper hand position for performing CPR. In embodiments, when the compression pad 12 is positioned over the sternum region 222 of the manikin 20, outer portions of the compression pad 12 may extend beyond the sternum region 222 into the left-side and right-side rib sections 224, 226. In embodiments, the left-side or right-side rib sections 224, 226 may have a curved or contoured shape. As such, when the removable skin 216 is positioned over the compression pad 12, the outermost longitudinal grooves 162 allow the top cover 104 and the compression pad 12 to conform to the contours of the left-side or right-side rib sections 224, 226.

Ribs for Varying Levels of Flexibility

As shown in FIG. 8A, ribs 166 are formed on the inner surface 124 of the top cover 104 between the longitudinal grooves 162 and lateral grooves 164. Some ribs 166 are not defined or surrounded entirely between grooves and are connected to perimeter of the top cover 104. In embodiments, the surface of the ribs 166 facing the PCB 48 is flush with the inner surface 124. While some ribs are entirely surrounded by grooves to increase flexibility of the top cover 104, other ribs connected to the perimeter of the top cover are provided to reduce flexibility and deformation where desired. Also, for varying levels of flexibility, some ribs are wider and longer than others. In the illustrated embodiments, the ribs 166 have a rectangular prism or cylindrical shape. However, in other embodiments, the ribs 166 may have any shape, size, or depth and may extend in any direction.

Chip Recesses

In embodiments, as shown in FIGS. 8B and 9, chip recesses 172 are formed into the inner surface 126 of the bottom cover 106. The chip recesses 172 are positioned in portions of the bottom cover 106 that correspond to the positions of the accelerometer 40 and the chips 64 on the PCB 48.

Protective Cushion

In embodiments, the chips 64 may have a protective cushion (not shown) that surrounds and protects the chips 64 from the sidewalls of the chip recesses 172. The protective cushion may be formed from a foam or sponge material. When the compression pad 12 deforms due to chest compressions, the protective cushion inhibits or prevents contact between the chips 64 and the sidewalls of the chip recesses 172. The protective cushion protects the chips 64 from possible damage.

Air Pressure Sensor

Referring to FIGS. 2 and 12A-12D, the breathing module 14 includes an air pressure sensor 16 and a lung bag 214. The air pressure sensor 16 has a housing 80 that is attached to the lead wire 62. The housing 80 has an male connector 82 protruding from the housing 80. An air pressure inlet opening 86 is positioned within the male connector 82 and extends into the housing 80 through which the air pressure sensor 16 detects air pressure. In embodiments, the male connector 82 has a retaining flange 84 that extends radially outward from the outer surface of the air pressure inlet fitting 82.

Lung Bag Connector

In embodiments, the air pressure sensor 16 is connected to the lung bag 214 by a lung bag connector 250. The lung bag connector 250 provides an air-tight interface such that the air pressure sensor 16 may be connected to one-time use or disposable lung bags. The lung bag connector 250 has a base portion 252, a female connector 254, a recessed flange 258, an adhesive film 268 and a liner 270 covering the adhesive film. The lung bag connector 250 may be formed from a flexible material such as plastic or rubber. The lung bag connector 250 is flexible such that the base portion 252 conforms to the inflated and deflated shapes of the lung bag 214. The female connector 254 extends from the base portion 252 on a first side and the adhesive film 268 is formed to the base portion 252 on a second side that is opposite the first side. The female connection 252 includes a hole 256 that has a size and shape that corresponds to the male connector 82. The recessed flange 258 is positioned within the hole 256 and has a size and shape that corresponds to the retaining flange 84 of the male connector 82 such that the recessed flange 258 receives and engages with the retaining flange 84 when the male connector 82 and female connector 254 mate.

Connecting Air Pressure Sensor to Lung Bag Connector

In embodiments, the air pressure sensor 16 is connected to the lung bag connector 250 by inserting the male connector 82 into the female connector 254. The retaining flange 84 of the male connector 82 engages the recessed flange 258 of the female connector 254 such that the air pressure sensor 16 is securely fastened to the lung bag connector 250. The hole 256 and the male connector 82 form an air-tight seal. In embodiments, the lung bag connector 250 has a male connector, and the air pressure sensor 16 has a corresponding female connector.

Breathing Module Installation Kit

Figure 13:
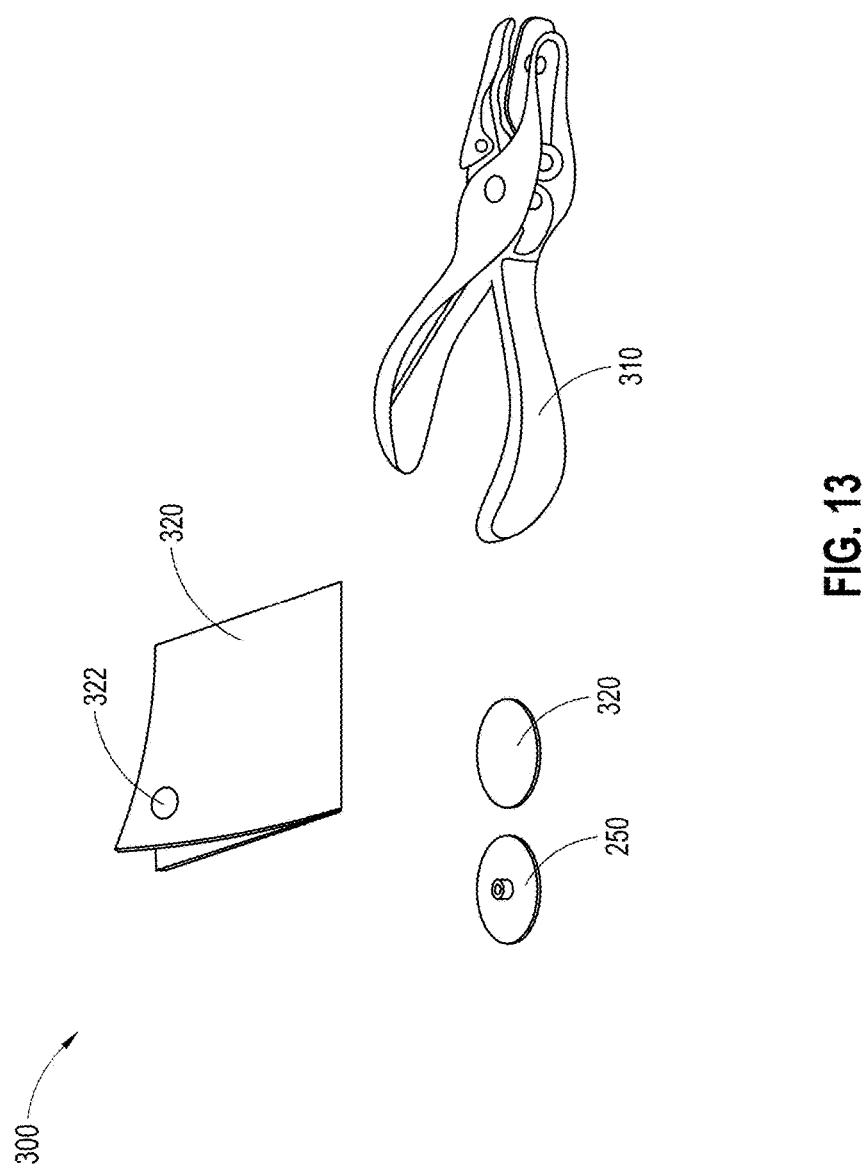
FIG. 13 illustrates a breathing module installation kit according to an embodiment.
Figure 16A:
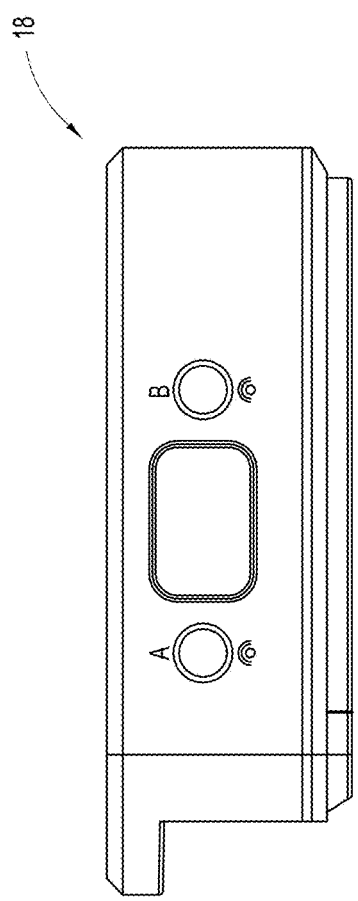
FIGS. 16A-16B illustrate side views of the data processing module of FIG. 15.
Figure 16B:
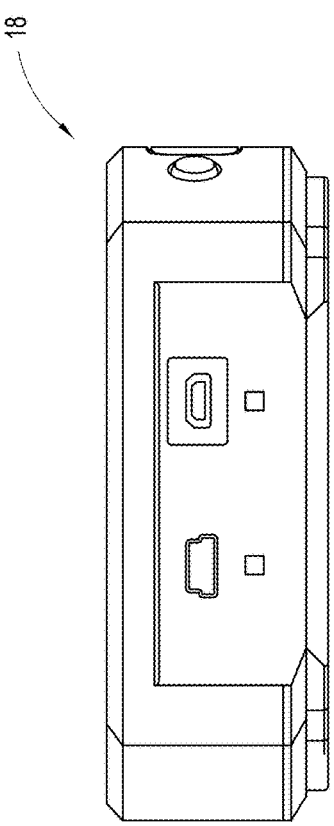
Figure 15:
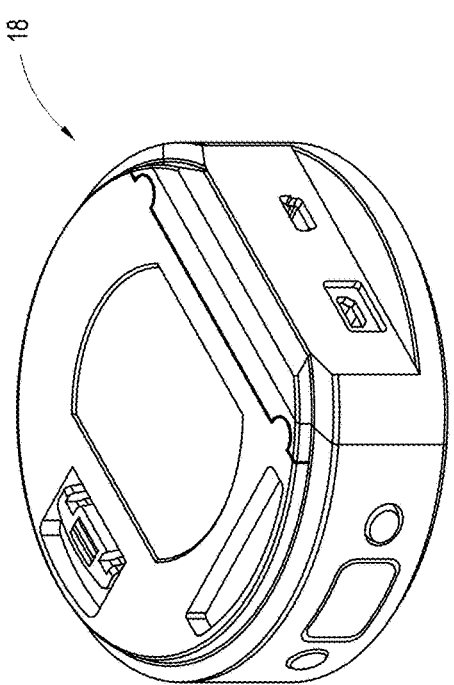
FIG. 15 illustrates a data processing module according to an embodiment.

FIG. 13 illustrates a breathing module installation kit 300 that allows the air pressure sensor 16 to be connected to one-time use or disposable lung bags 316. The breathing module installation kit 300 includes a hole punch 310, a hole punch guide template 320, a seal 330 and a lung bag connector 250. The hole punch 310 is a tool for punching holes into a disposable lung bag 316. The hole punch 310 punches a hole that is similar in size to the hole 256 of the lung bag connector 250.

Hole Punch Guide Template

In embodiments, the hole punch guide template 320 is a paper template having a marking 322 which is used to indicate where the hole punch 310 should be positioned to punch a hole through the disposable lung bag 316. In embodiments, the hole punch guide template 320 is foldable or folded along a folding line such that two sections divided by the folding line can at least in part overlap with each other. The hole punch guide template 320 is used to ensure that the user does not punch a hole too close to the edge of the disposable lung bag 316 such that the lung bag connector 250 cannot be attached and/or an air tight seal cannot be maintained. That is, the marking 322 is positioned on the hole punch guide template 320 such that the hole punched through the disposable lung bag 316 is positioned at least the distance between the hole 256 and the outer edge of the base portion 252 of the lung bag connector 250.

Seal

In embodiments, the seal 330 is used to cover and seal the hole on one side (wall) of the disposable lung bag 316 since a hole will be punched through two opposite sides (walls) of the disposable lung bag 316. The seal 330 may have a self-stick adhesive layer that is covered by a removable cover or wrapper.

Installing Breathing Module

In FIGS. 14A-14E, the steps for installing the air pressure sensor 16 to the disposable lung bags 316 are illustrated.

Aligning Hole Punch Guide Template with Lung Bag

First, referring to FIG. 14A, the hole punch guide template 320 is positioned on a corner of the disposable lung bag 316. In embodiments, the edges of the disposable lung bag 316 are aligned with edges and/or folds on the hole punch guide template 320 although not limited thereto. In embodiments, the template 320 has a first section and a second section folded along a folding line such that the two sections overlap with each other. The template is aligned such that the first section is on one side of the lung bag 316 and the second section is on the other side of the lung bag 316 while the folding line between the two sections are aligned with an edge of the lung bag 316.

Punching Two Holes on Opposite Sides of Lung Bag

Subsequently, referring to FIG. 14B, the hole punch 310 is aligned with the marking 322 of the hole punch guide template 320 and a hole is punched through the disposable lung bag 316 and the hole punch guide template 320. In embodiments, the hole punch 310 punches a hole on each of the opposite sides of the lung bag 316. As a result, two holes are punched on the lung bag 316: one through the side contacting the first section of the template 320 and the other through the side contacting the second section of the template.

Sealing One Hole

As in FIG. 14C, the seal 330 is attached onto the disposable lung bag 316, covering and sealing one hole formed on one side of the disposable lung bag 316. The self-stick adhesive layer fastens the seal to the disposable lung bag 316 and ensures an air tight seal is formed.

Connecting Lung Bag Connector

As in FIG. 14D, the lung bag connector 250 is attached to the disposable lung bag 316 and positioned over the hole on the other side of the disposable lung bag 316 (i.e., opposite the hole covered by the seal 330). The liner 270 of the lung bag connector 250 is removed to expose adhesive film 268, and the lung bag connector 250 is fastened to the disposable lung bag 316 by the adhesive film 268. When attaching the lung bag connector 250 onto the lung bag 316, the hole 256 of the lung bag connector 250 is aligned with the hole formed though the side of the disposable lung bag 316 such that the female connector 254 of the lung bag connector 250 provides a fluid pathway into the disposable lung bag 316.

Connecting Air Pressure Sensor and Lung Bag Connector

Subsequently, as in FIG. 14E, the air pressure sensor 16 is connected to the lung bag connector 250 by inserting the male connector 82 into the hole 256 of the female connector 254 of the lung bag connector 250. The air pressure sensor 16 is securely fastened to the lung bag connector 250 by the retaining flange 84 of the male connector 82 and the recessed flange 258 of the female connector 254. Accordingly, the air pressure sensor 16 is in fluid communication with the interior of the disposable lung bag 316 and may measure the air pressure within the disposable lung bag 316.

Connection to Data Processing Module

In embodiments, the compression pad 12 and breathing module 14 are connected to the data processing module 18 via lead wires 60, 62 or wirelessly such that each of the compression pad 12 and the breathing module 14 can send data obtained from their sensors immediately and real-time to the data processing module. In such embodiments, each of the compression pad 12 and the breathing module 14 has circuitry for wirelessly communication with the data processing module 18 or other devices. In the compression pad 12, wireless circuits may be integrated into the PCB 48 and positioned within a connector portion 115 of the compression pad 12, as shown in FIG. 8C. The wireless module is positioned outside of the force detecting region of the compression pad 12 such that the wireless module is not disturbed or damaged by chest compressions.

Data Processing Module Connected to Other Devices

In embodiments, the data processing module 18 immediately processes the data from the compression pad 12 and the breathing module 14 as soon as they are received. The data processing module 18 stores the data at least temporarily. The data processing module 18 immediately transmits at least part of processing results and other data to the external computing device 30 or other devices to which the data processing module 18 is connected via wire or wireless connections. In embodiments, the data processing module 18 may include a wireless transmitter/receiver to wirelessly communicate with the external computing device 30 via Wi-Fi, Bluetooth, BLE, Infrared Data Association or other wireless communication standards. In some embodiments, the data processing module 18 can be omitted, and the compression pad 12 and breathing module 14 are directly connected to the external computing device 30 or other devices via wired or wireless connection.

External Computing Device

Referring to FIG. 4, the external computing device 30 is in the form of a mobile tablet computer. In embodiments, the external computing device 30 receives data from the data processing module and provides real-time feedback about the user's CPR performance. Further, the external computing device 30 also stores the user's CPR performance such that an instructor may review the user's CPR performance at a later time. In embodiments, the external computing device 30 may be connected to multiple CPR training systems 10, i.e., multiple data processing modules 18 at the same time such that an instructor may simultaneously monitor the CPR training performance of multiple users. In some embodiments, the external computing device 30 may communicate with a database management server (not shown) and upload the CPR performance of users to a cloud-based server such that aggregate information regarding CPR performance may be stored and analyzed. It should be understood to one of ordinary skill in the art that the external computing device 30 is not limited to a mobile tablet computer and may include other computing devices such as medical monitors, computers integrated into the manikin or medical training equipment, etc.

CPR Training Procedure

Figure 17:
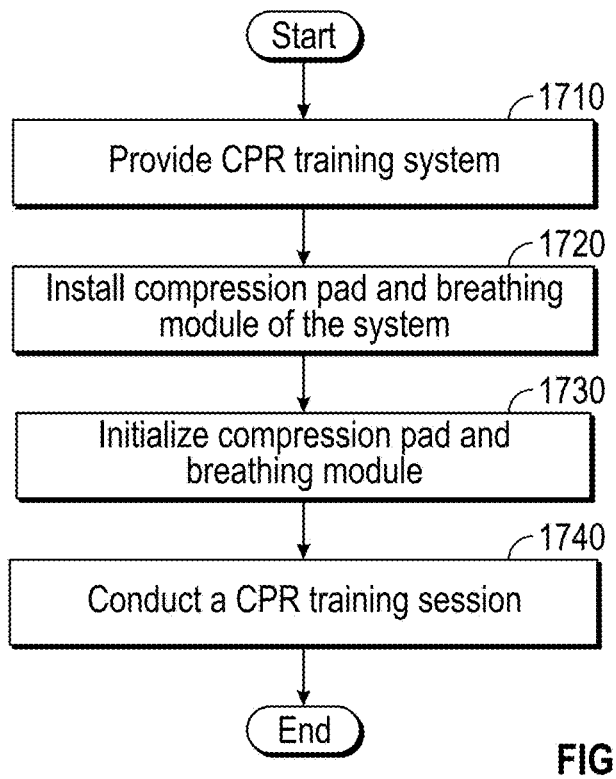
FIG. 17 illustrates a CPR training procedure according to an embodiment.

FIG. 17 illustrates a CPR training procedure according to embodiments of the invention. The CPR training procedure starts with providing a CPR training system at step 1710. In embodiments, the CPR training system 10 includes a manikin 20, a compression module 12, a breathing module 14, and a data processing module 18. Subsequently, the compression module 12 and breathing module 14 are assembled and installed on the manikin at step 1720. FIG. 4 illustrates the CPR training system installed on the manikin. Next, at step 1730, the compression module 12 and breathing module 14 are initialized or calibrated. Afterwards, at step 1740, CPR training sessions are conducted using the CPR training system 10.

Providing and Installing CPR Training System

In embodiments, the CPR training system includes one or more features discussed above with reference to FIGS. 1-16. In embodiments, the compression module 12 in the form of a pad is placed over the manikin's chest region as discussed above. In embodiments, the breathing module 13 is assembled and its lung bag 316 is placed over the compression pad 12. In embodiments where the manikin has a removable skin, the compression module 12 and the lung bag 316 are arranged under the skin. In embodiments, the compression module 12 and breathing module 14 are connected to the data processing module 18 or another device for data processing.

Initializing Compression Module

Figure 18:
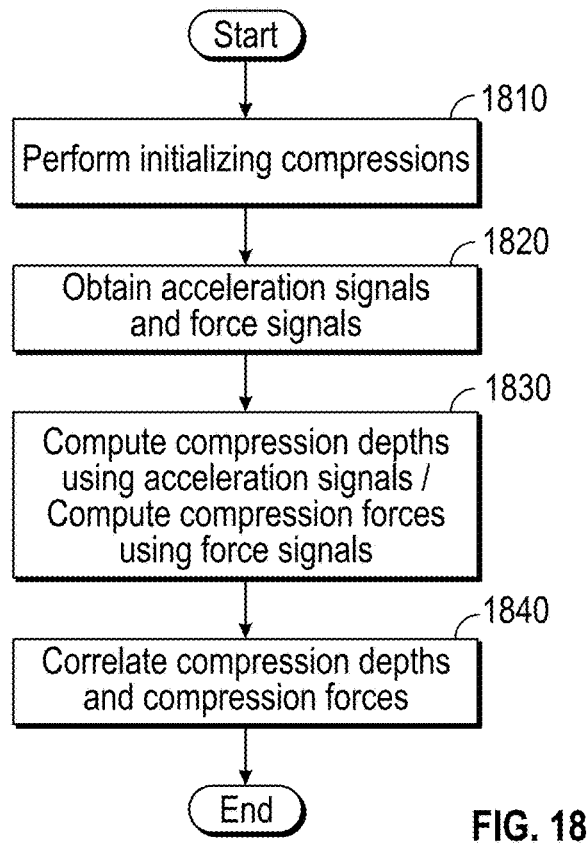
FIG. 18 illustrates a procedure for chest compression module initialization.

Referring to FIG. 18, in embodiments, initialization of the compression module 12 begins with performing a predetermined number of initializing or reference chest compressions at step 1810. During the initializing compressions, the accelerometer 40 of the compression pad 12 detects acceleration at step 1820. Also, the force sensors 42, 44 of the compression pad 12 detect force at step 1820. Using acceleration signals, the compression depths are computed at step 1830. Force signals and compression depths computed from acceleration signals at each given time are processed to provide correlation or a formula between the compression depths and the compression force at step 1840. The formula or correlation represents the manikin's unique compression characteristics. In embodiments, the signal processing is performed by the data processing module 18. In embodiments, the external computing device 30 has an application providing user interfaces to guide the step of initialization process.

Force and Acceleration Signals

Figure 19:
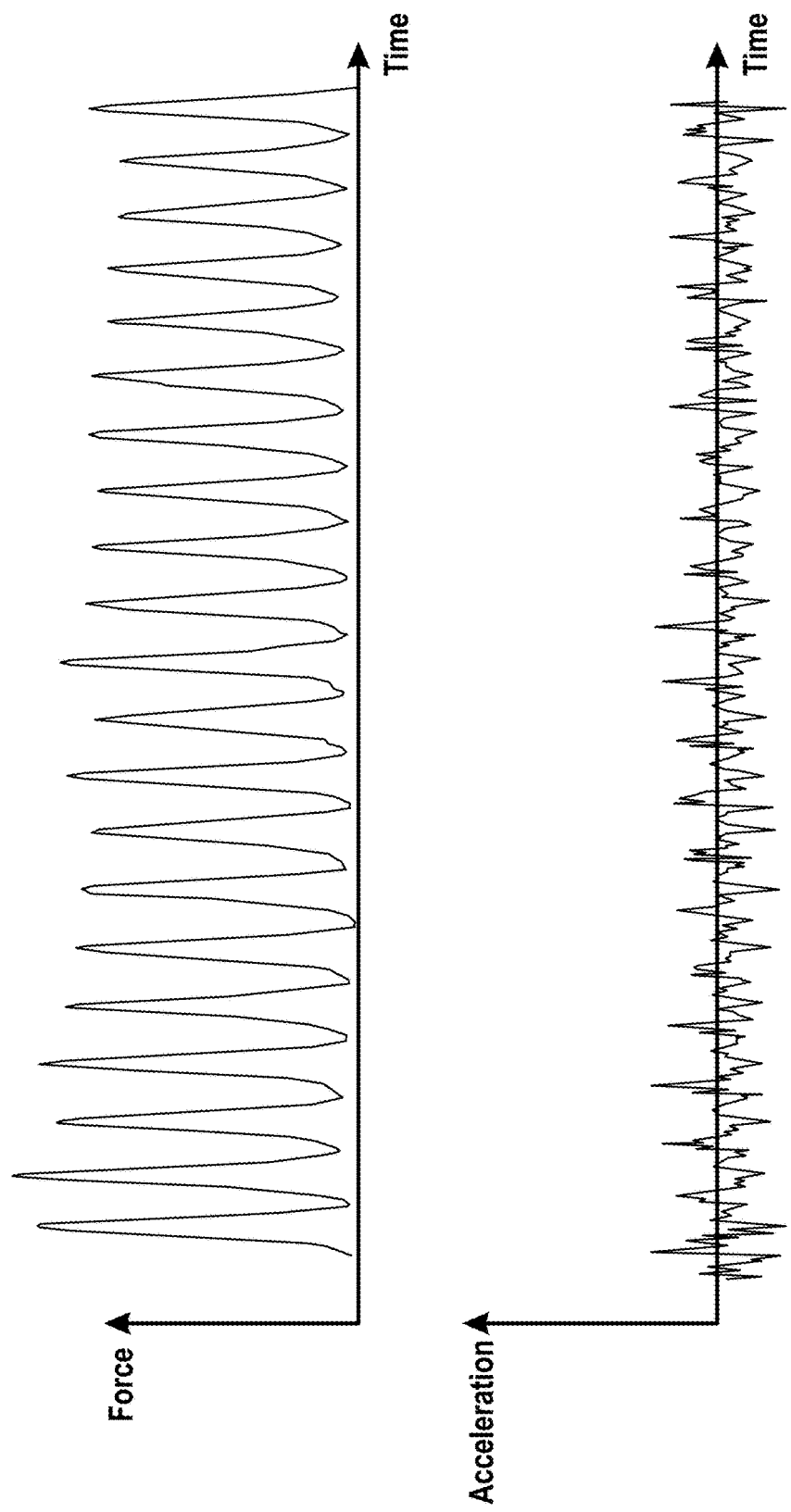
FIG. 19 illustrates signals of consecutive compressions according to an embodiment.

FIG. 19 illustrates force signals and acceleration signals simultaneously obtained during the initializing compressions at step 1820 or any CPR training sessions. In embodiments, the force signals presented in FIG. 19 are combined signals from the two force sensors 42, 44. For example, signals from two piezoelectric sensors can be added or averaged to produce a single force signal. Each peak of the force signals represents a single compression made to the manikin's chest region.

Monitoring Force Sensor Signal

The CPR training system obtains signals from the force sensor of the chest compression module as the user practices CPR to the manikin during the CPR training session. When two or more force sensors are used in the chest compression module, signals from the two or more force sensors can be processed to generate a single force signal. For example, signals from two piezoelectric sensors can be added or averaged to produce a single force signal for identifying and evaluating a compression during a CPR training session.

Processing Acceleration Signals to Provide Displacement Signals

Figure 20:
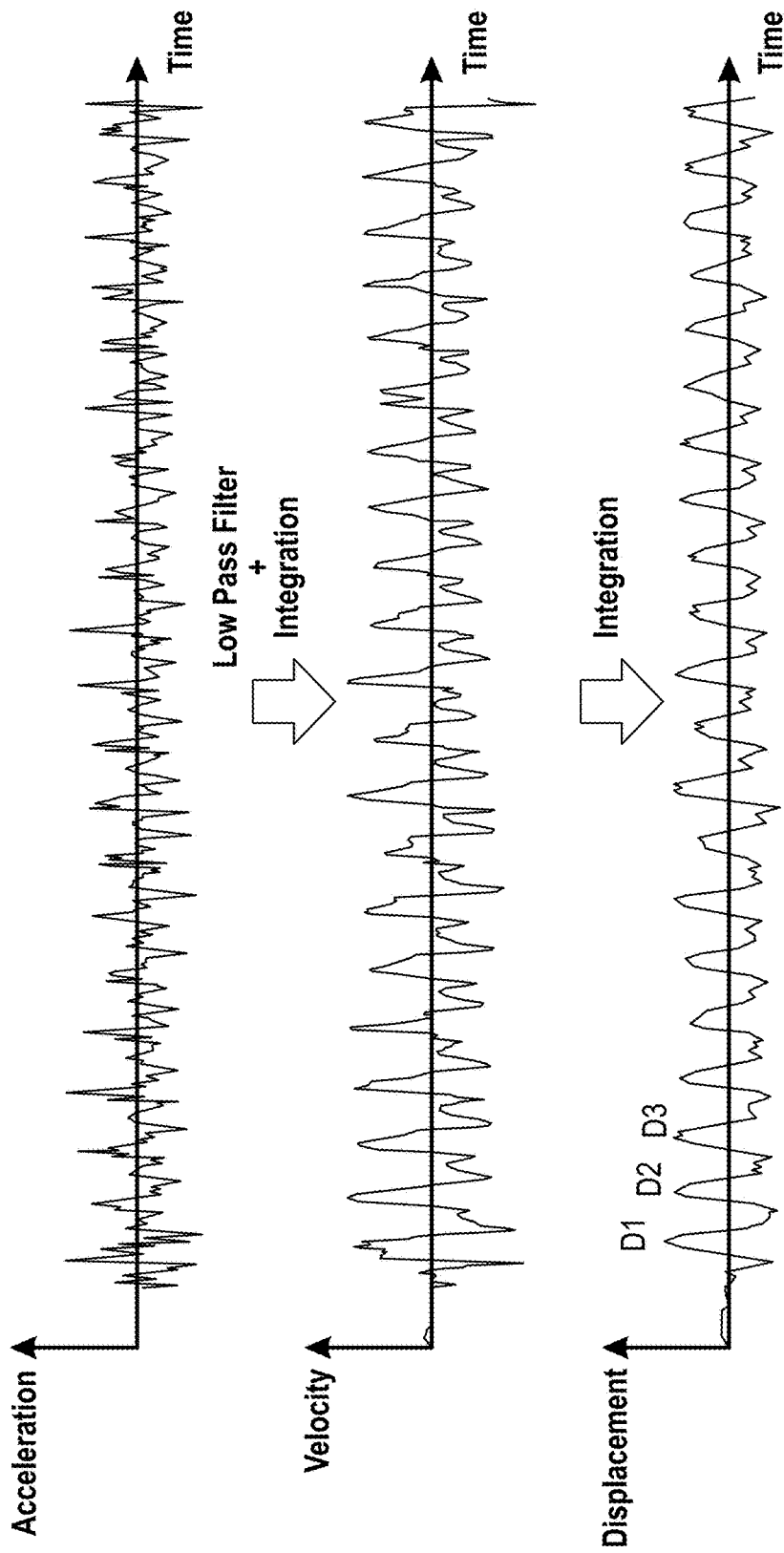
FIG. 20 illustrates processing of signals from consecutive compressions of FIG. 19.

At step 1830 of FIG. 18, the acceleration signals are processed to compute displacement of the compression pad 12, which represents compression depths of the initializing compressions. In embodiments, the acceleration signals are integrated once to provide velocity signals, and integrated twice to provide displacement signals. FIG. 20 illustrates acceleration signals and the corresponding velocity and displacement signals.

Peak Detection from Displacement Signals

In embodiments, the displacement signals are further processed to identify peaks in the displacement signals. Each peak of the displacement signal corresponds to a single compression. The displacement signals of FIG. 20 include peaks D1, D2, D3 identified by the additional processing.

Corresponding Peaks of Force Signals and Displacement Signals

Figure 21:
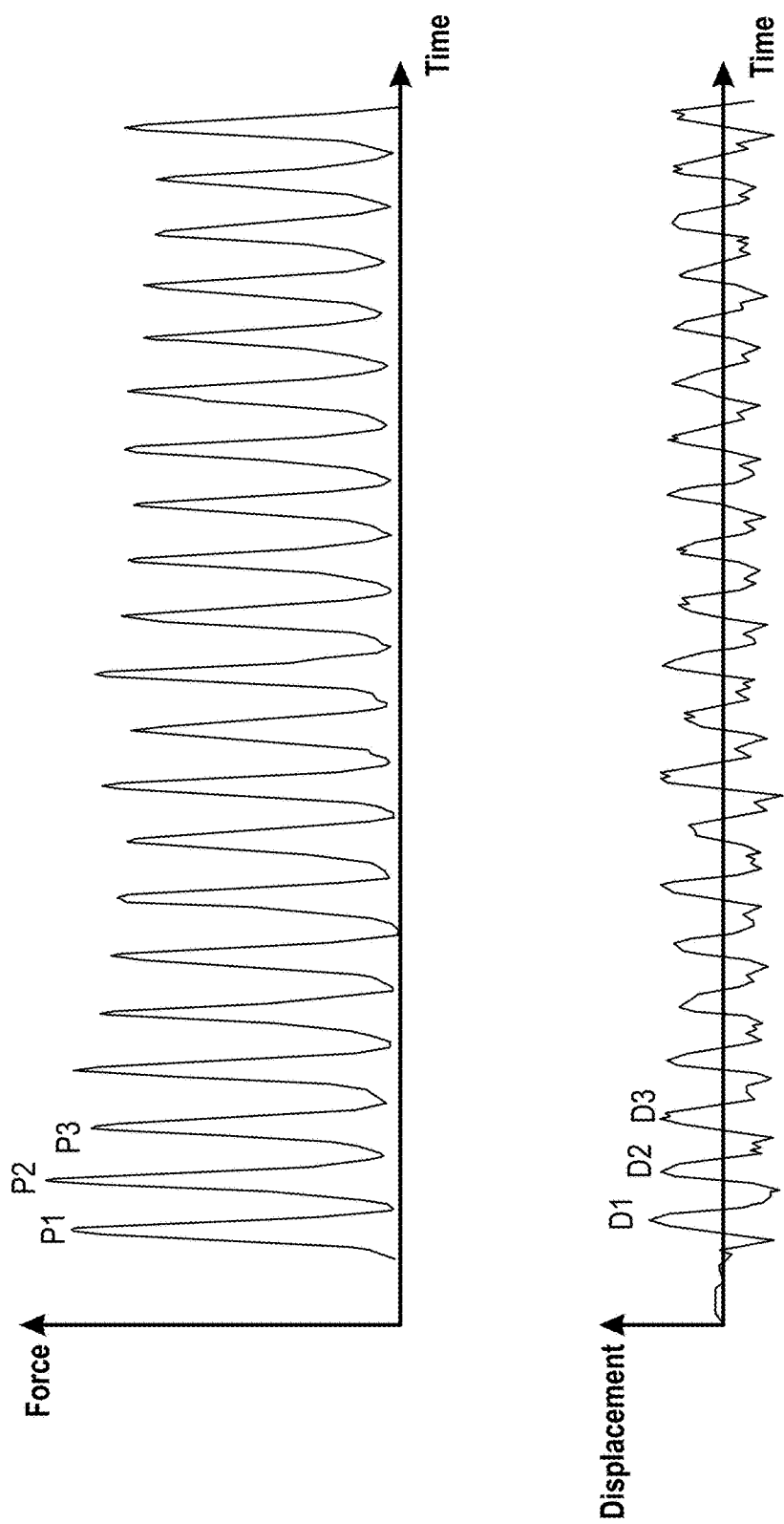
FIG. 21 illustrates force and displacement signals of consecutive compressions of FIG. 19.

In embodiments, the force signals are processed to detect peaks. The peaks of the force signals and the peaks of the displacement signals relate to compressions made during the initializing compressions. Accordingly, in embodiments, each compression corresponds to one peak of the force signals and one peak of the displacement signal. Referring to FIG. 21, the peaks P1, P2 and P3 of the force signals respectively corresponds to the peaks D1, D2, D3 of the displacement signals.

Correlating Compression Depth and Compression Force

Figure 22:
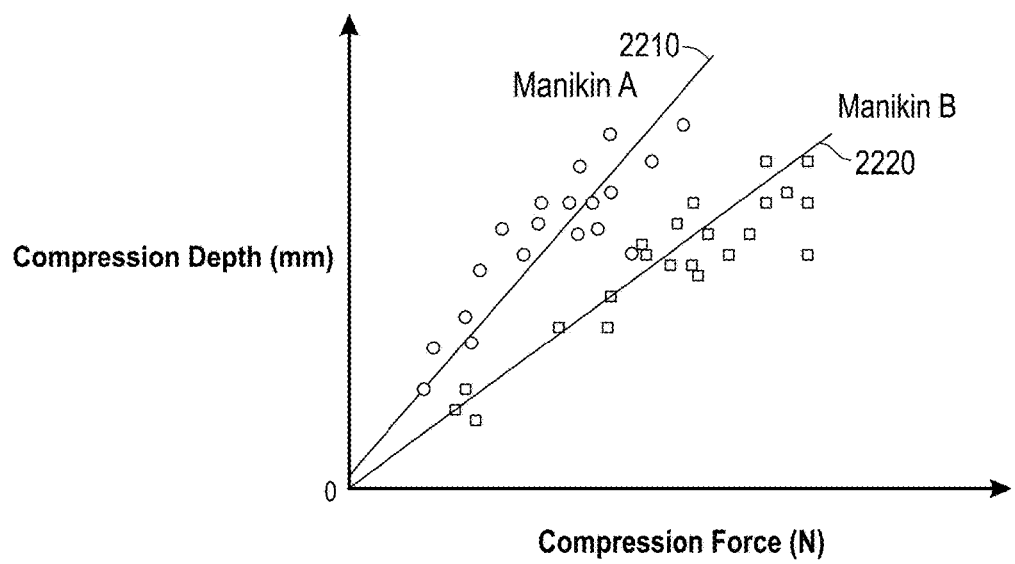
FIG. 22 illustrates correlating compression force and depth according to an embodiment.

In embodiments, peak values of the force signals and displacement signals are obtained and correlated. Each peak value of the force signals is paired with a peak value of the displacement signals that corresponds in time. Thus, the paired peak values of the force and displacement signals are of the same compression. In some embodiments, pairing peak values of the force and displacement signals continue for all compressions made during the initializing compressions. In embodiments, the paired peak values, i.e., compression force and depth are plotted. FIG. 22 plots two of such initializing compressions for Manikin A 2210 and for Manikin B 2220. For each manikin, in embodiments, the CPR training system identifies to a linear graph 2210, 2220 representing the relationship between compression force and compression depth using a linear regression analysis. In other embodiments, the CPR training system utilizes various other approaches to identify a formula or correlation between compression force and compression depth of the initializing compressions.

Initializing Compression Module for Every Manikin

In embodiments, the initialization of the compression module 12 is performed for every manikin. Each manikin is constructed differently, primarily due to differences in the materials and construction of the torso assembly and springs therein. Thus, chest compression characteristics may differ from manikin to manikin. Manikins made by the same manufacturer and even same model of manikins are not exceptions unless their chest compression characteristics are tested and quality-controlled. As illustrated in FIG. 22, Manikin A 2210 and for Manikin B 2220 have different compression characteristics, i.e., different correlation between the compression force and compression depth.

Initializing Compression Module for Every Training Floor

In embodiments, the initialization of the compression module 12 is performed for every change of training locations or floors. The sensing of the compression module 12 may depend on the rigidity of floor upon which the manikin is placed.

Initializing Breathing Module

Figure 23:
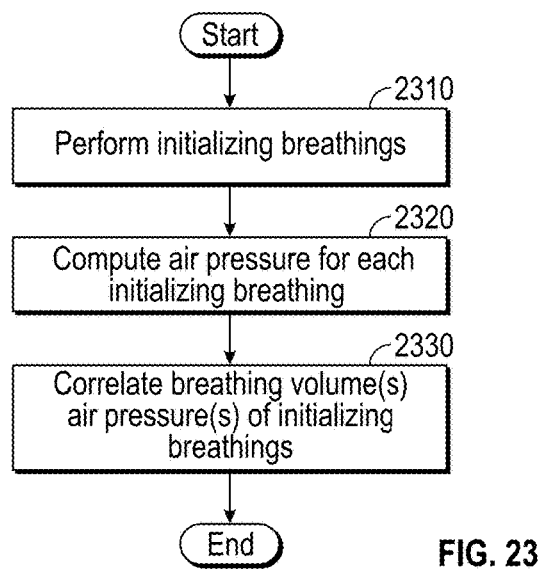
FIG. 23 illustrates a procedure for initializing breathing module according to an embodiment.

FIG. 23 illustrates a procedure for initializing the breathing module 14. In embodiments, initialization of the breathing module 14 begins with performing a predetermined number of initializing or reference breathings at step 2310. The air pressure sensor 16 detects air pressure in the lung bag 214 during these initializing breathings. The air pressure signals from the air pressure sensor 16 are processed to obtain air pressure values corresponding to each breathing made during the initializing breathings at step 2320. Then, the air pressure values are correlated to breathing volumes of the initializing breathings at step 2330.

Initializing Breathings

The initializing breathings include blowing a known volume of air into the oral and/or nasal cavities of the manikin for sending the known volume of air to the lung bag 214. In some embodiments, the same known volume of air is blown multiple times. In some embodiments, varying volumes of air are blown into the lung bag 214 connected to the manikin 20. In other embodiments, a generally the same volume of air is blown into the lung bag 214 multiple times even if the exact volume is not known.

Detecting Peaks of Air Pressure Signals for Initializing Breathings

In embodiments, air pressure signals are processed to identify peaks representing individual breathings of the initializing breathings. The CPR training system obtains the peak values, each of which corresponds to the maximum volume of air blown into the lung bag 214 in each breathing made during the initializing breathings.

Correlating Breathing Volume and Air Pressure of Initializing Breathings

Figure 24:
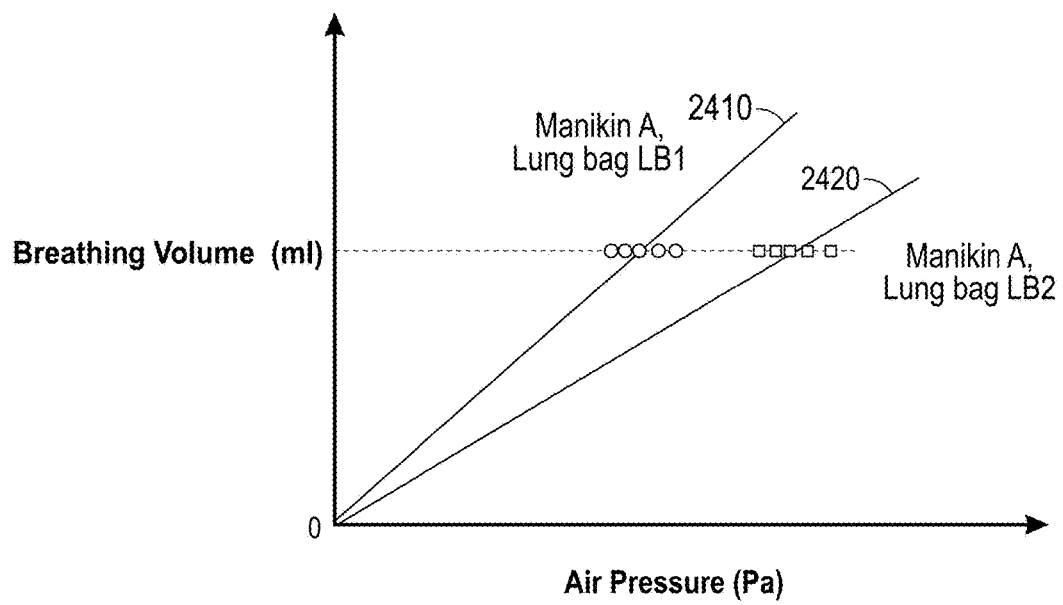
FIG. 24 illustrates correlating air pressure and volume according to an embodiment.

At step 2330, the CPR training system correlates breathing volume and air pressure values from the initializing breathings. In embodiments where the same or generally the same volume of air is blown multiple times, the air pressure values and the known volume of air are plotted. FIG. 24 plots two of such initializing breathings into Manikin A for Lung bag LB1 and Lung bag LB2. For each lung bag, in embodiments, the CPR training system identifies to a linear graph 2410, 2420 representing the relationship between the breathing volume and air pressure using a linear regression analysis. As illustrated, the linear graphs 2410, 2420 passes the origin point in the plot as data for the linear regression analysis are limited to the same breathing volume. In other embodiments, the CPR training system may utilizes various other approaches to identify a formula or correlation between the breathing volume and air pressure from the initializing breathings.

Initializing Breathing Module for Every Lung Bag

In embodiments, the initialization of the breathing module 14 is performed for every lung bag 214. Lung bags may have different volume-pressure characteristics which may also vary between lung bag manufacturers, variances between identical manikins, variances in sensor installations, etc.

Batch or Real-Time Data Processing for Initializing

In embodiments, processing of signals and correlating values can be performed after the completion of the initializing compressions or initializing breathings. In the alternative, processing of signals and correlating values can be performed real time while the initializing compressions or initializing breathings are being performed.

Conducting a CPR Training Session

After the completion of the initialization of the compression module 12 and breathing module 14, CPR training sessions are conducted using the CPR training system. In embodiments, the CPR training system monitors sensor signals from the compression module 12 and the breathing module 14, evaluates each compression and breathing of the CPR training session, and provides real-time feedback to the user.

CPR Sequence

Typically, a CPR training session includes a sequence of five cycles of compressions and breathings, in which each cycle consists of thirty (30) compressions and two (2) breathings. In some embodiments, the CPR training system provides a step-by-step guidance CPR training session prompting the user for the sequence. In other embodiments, no such guidance is provided, and the user is expected to perform the CPR sequence by herself.

Evaluating Compressions

Figure 25:
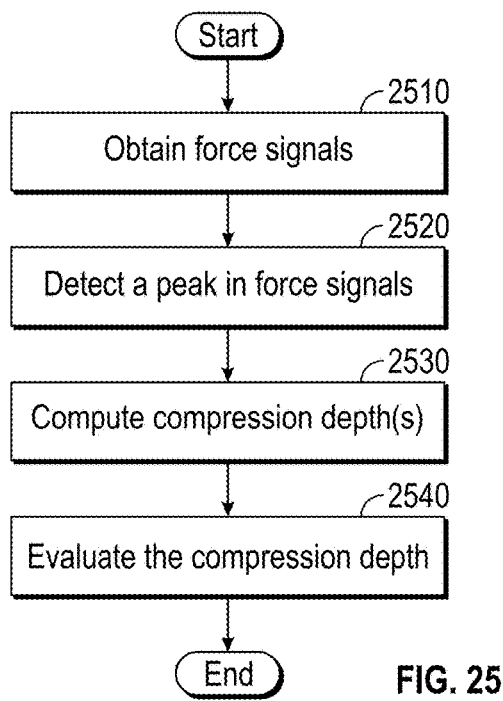
FIG. 25 illustrates a procedure for evaluating compressions during a CPR training session.

FIG. 25 is a procedure for evaluating compressions during CPR training sessions. In embodiments, the force sensors 42, 44 detect force and the compression pad sends force signals to the data processing module 18 at step 2510. The CPR training system detects peaks of the force signals and obtains peak values in the force signals at step 2520. For each peak, the CPR training system computes or determines a compression depth at step 2530, using the formula or correlation previously obtained from the initialization of the compression pad 12.

Acceleration Signals for Evaluating Compressions

In embodiments, while acceleration signals are used during the initialization stage, acceleration signals are not used during CPR training sessions for obtaining the compression depth. In these embodiments, force signals are used for the compression depth generally to avoid delays in integrating acceleration signals twice and also to avoid circuitry for or delays in removing high frequency noises. In other embodiments, acceleration signals may be used for determining the compression depth (displacement) as in the initialization stage. In such embodiments, the initialization of the compression module can be omitted. In embodiments, the CPR training system may utilize acceleration signals to determine directions of chest displacement.

Detecting Peaks in Force Signals

Figure 26:
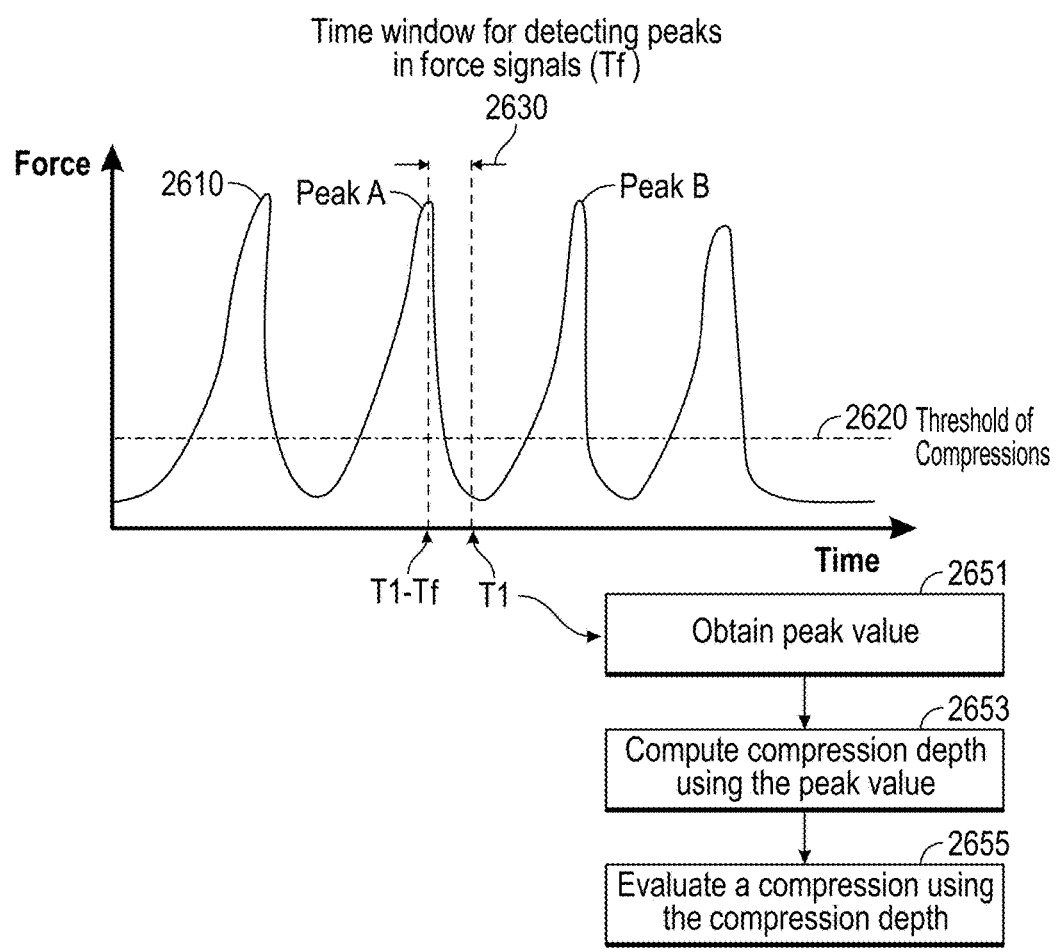
FIG. 26 illustrates compression peaks and evaluation thereof according to an embodiment.

FIG. 26 illustrates a process of detecting peaks in force signals from the force sensors and evaluating the peaks to confirm a compression. In embodiments, the CPR training system may repeatedly monitor the force signals at a frequency (significantly) shorter than a typical chest compression frequency of CPR training sessions. Based on the monitoring, the CPR training system determines whether the force signal is greater or smaller than a predetermined reference value or a compression threshold. In embodiments, the CPR training system utilizes a peak detection technique to detect the maximum point of a peak real time before the signals form the next peak. One of ordinary skill in the art should understand that peak detection techniques are available and can be used in the CPR training system. In embodiments, the CPR training system repeatedly updates the maximum value within a given time window from $T_1$-$T_f$ to $T_1$. At T1, when there is no value higher than the previous maximum value at $T_1$-$T_f$ during the time window, the maximum value of Peak A corresponds to the maximum depth of the particular compression at step 2651.

Determining Compression Depth

Once the peak value is obtained, the compression depth is computed at step 2653. In embodiments, the formula or correlation obtained from the initialization stage for the particular manikin is used to determine or compute the compression depth. In embodiments, even if signals from the accelerometer 40 are available, acceleration signals are not referenced for determining the compression depth. Subsequently, the CPR training system evaluates each compression using the computed compression depth at step 2655. In embodiments, the compression depth is compared against a predetermined range of desirable compression depths to determine whether the particular compression is too strong, good or too weak.

Real-Time Feedback

In embodiments, the CPR training system provides the evaluation result of each compression depth to the user real time, desirably prior to the user's next compression. For example, referring to FIG. 26, the evaluation for Peak A is provided to the user before compression for Peak B is initiated or completed. For adjusting timing of providing an evaluation result of compressions during an on-going CPR training session, the CPR training system may adjust length of the time window $T_f$ for identifying a peak (a compression) in the force signals. In some embodiments, the CPR training system is configured to provide an evaluation of the current compression within ¼ of the desirable time interval between two consecutive compressions. Considering that a desirable compression rate is about 100 to 120 compressions per minute, the CPR training system may be configured to initiate a process of computing compression depth within at least 0.15 sec. since a peak appears in the force signal. In other embodiments of the invention, the CPR training system may be configured to detect a peak with a time window having 0.05 sec.

Evaluating Compression Rate

In embodiments, the CPR training system calculates a rate of compressions using time intervals between two consecutive compressions that are determined based on peak detection. The CPR training system determines whether the user performs compressions too fast, too slow or at a desirable rate by comparing the computed rate against a predetermined desirable compression rate.

Evaluating Compression Position

In embodiments, the CPR training system determines locations and areas of the compression pad onto which the compression force is applied using the contact sensors 46. The CPR training system determined if the locations and areas are proper by comparing the detected locations and areas against a predetermined pattern of contact. Compression position can be determined and evaluated using sensor signals from the contact sensors of the chest compression module.

Various Contact Patterns

In some embodiments, when no contact is detected by the contact sensors but a force signal indicative of a compression is sensed by the force sensor, the CPR training system determines that a contact for compression is made only at a central portion of the compression pad 12. In embodiments, when a contact is detected by the contact sensor but the force signal is too weak to confirm a compression, the CPR training system determines that the user missed a compression. In embodiments, when a contact is detected by the contact sensor and the force signal is strong enough to confirm a compression, the CPR training system determines that a compression is made on a peripheral area of the compression pad 12.

Evaluating Recoil Between Compressions

A desirable CPR procedure requires a full rebound or recoil of the chest between compressions. A full recoil between compressions is important because it will ensure re-filling of the heart chambers between compressions. In embodiments, the CPR training system can determine whether a desirable recoil between two consecutive compressions has occurred. For example, when a chest displacement becomes smaller than a predetermined reference between two consecutive compressions, the CPR training system determines that a desirable recoil has been made.

Evaluating Breathings

Figure 27:
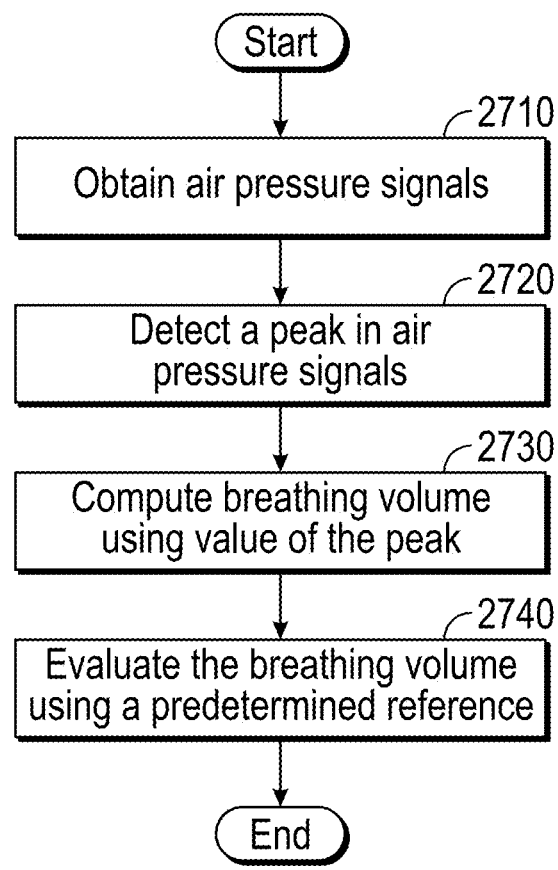
FIG. 27 illustrates a procedure for evaluating breathings during a CPR training session.

FIG. 27 illustrates a procedure for evaluating breathings during CPR training sessions. The procedure for evaluating breathings starts with obtaining air pressure signals during a CPR training session at step 2710. The CPR training system identifies breathings based on patterns (peaks) in the air pressure signals at step 2720. For each of the identified breathings, the CPR training system computes a breathing volume at step 2730. The formula determined in initializing of the breathing module can be used to compute the breathing volume during the CPR training session. The CPR training system evaluates individual breathings using the computed breathing volume at step 2740. The computed breathing volume is compared with one or more predetermined reference volumes for evaluating the identified breathing. The CPR training system presents to the user the evaluation result in real time, desirably prior to the initiation of the next breathing, such that the user can adjust her next breathing based on the real-time feedback.

Detecting Peaks of Air Pressure Signals for Training Breathings

Figure 28:
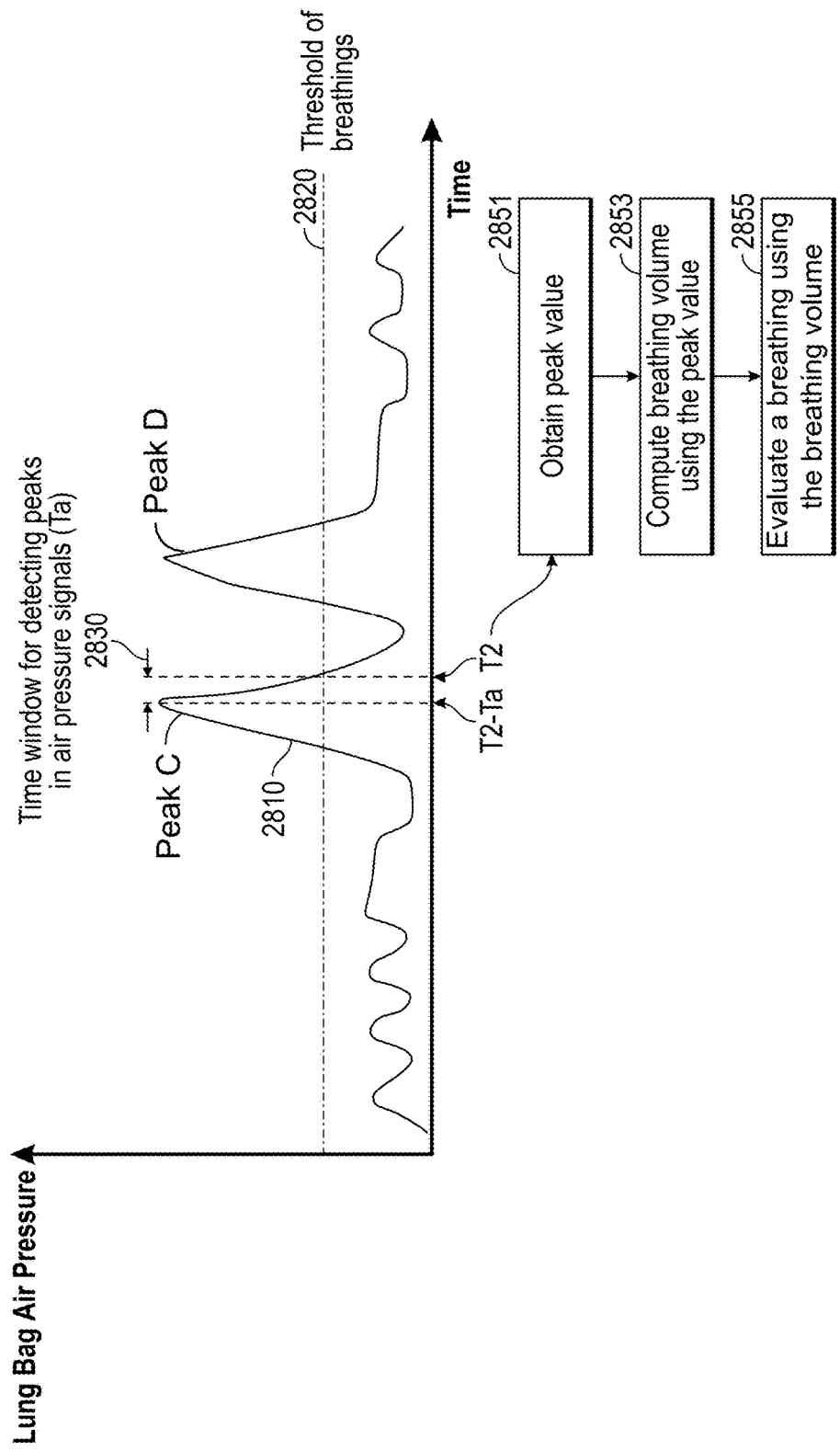
FIG. 28 illustrates breathing peaks and evaluating breathings according to an embodiment.

FIG. 28 illustrates a process for detecting peaks in air pressure signals and evaluating the peaks to confirm a breathing. In embodiments, the CPR training system may repeatedly monitors the air pressure signals at a frequency (significantly) shorter than a typical breathing frequency of CPR training sessions. Based on the monitoring, the CPR training system determines whether the air pressure signal is greater or smaller than a predetermined reference value or a breathing threshold. In embodiments, the CPR training system utilizes a peak detection technique to detect the maximum point of a peak real time before the signals form the next peak. One of ordinary skill in the art should understand that peak detection techniques are available and can be used in the CPR training system. In embodiments, the CPR training system repeatedly updates the maximum value of the air pressure signal 2810 while monitoring the air pressure signal 2810. When there has been no update of a maximum since a peak appears in the air pressure signals for a given time duration $T_a$, the CPR training system uses the peak value as representing the maximum air pressure of a breathing. For example, at $T_2$, when the given time duration of $T_a$ has passed since a peak at $T_2$-$T_a$ in the air pressure signal 2810, the CPR training session determines the peak at $T_2$-$T_a$ indicates a breathing performed on the manikin.

Evaluating Breathing Volume

In embodiments, once a breathing is confirmed during a CPR training session, the CPR training system initiates a process for evaluating the confirmed breathing. First, at step 2851, the maximum value of detected peak C is obtained. Subsequently, at step 2853, the CPR training system computes or determines the volume of the confirmed breathing using the maximum value based on the formula or correlation between the volume and the air pressure obtained in the initialization stage. Subsequently, at step 2855, the CPR training system evaluates if the breathing is too strong, good or too week by comparing the breathing volume with a predetermined range of desirable breathing volume. In other embodiments, the CPR training system may compare the air pressure representing each of the breathing peaks with a reference value representing initializing breathings received for initializing the breathing modules. For example, in a case when the CPR training system requested five moderate breathings assuming the same volume of initializing breathings, the CPR training system may determine that an identified breathing has a desirable breathing volume when the air pressure of the breathing is within a range from an air pressure representing the five moderate breathings.

Providing Evaluation of Breathings

In embodiments, the CPR training system provides the evaluation result of each breathing prior to the user's next breathing. For example, the CPR training system initiates computing breathing volume corresponding to the peak C at $T_2$ to provide evaluation result of the breathing corresponding to the peak C before the user performs the next breathing (peak D). Providing evaluation result of a breathing prior to an upcoming breathing is desirable because the user can receive evaluation on a current (or a most recent) breathing before the user performs another breathing after the current breathing. For adjusting timing of providing evaluation result of breathing during on-going CPR training session, the CPR training system may adjust length of the time window $T_a$ for identifying a peak (breathing) in the air pressure signals. In some embodiments, the CPR training system is configured to provide evaluation of the current breathing within ¼ of the desirable time interval between two consecutive breathings. Considering that it is desirable to perform rescue breathing at a rate of ten to twelve breaths per minute (for adults) the CPR training system may be configured to initiate a process of computing breathing volume within at least about 1.25 second since a peak appears in the air pressure signal.

Cross-Talk Between Force Signals and Air Pressure Signals

In embodiments, compressions are detected and evaluated based on force signals from the force sensors 44, 46 within the compression pad 12. Breathings are detected and evaluated based on air pressure signals from the breathing module 14. Further in embodiments, the compression pad 12 and the lung bag 214 are installed closely inside the manikin 20. In many embodiments, the lung bag 214 is placed over the compression pad 12 under the manikin's skin. Since the force sensors and the air pressure sensor detect generally the same nature of physical properties, force and pressure, compressions may generate air pressure signals and breathings may also generate force signals. Further, a breathing into the lung bag 214 may generate a contact signal from the contact sensors 46.

Determining Between Compressions and Breathings Needed

During CPR training sessions, compressions and breathings are repeated. Sometimes both the air pressure sensor and the force sensors generate signals for a single compression or a single breathing. In embodiments, the CPR training system processes the force signals, contact signals and/or air pressure signals to determine whether the user performs a compression or a breathing.

Determining Based on Force Signals and Air Pressure Signals

Figure 29:
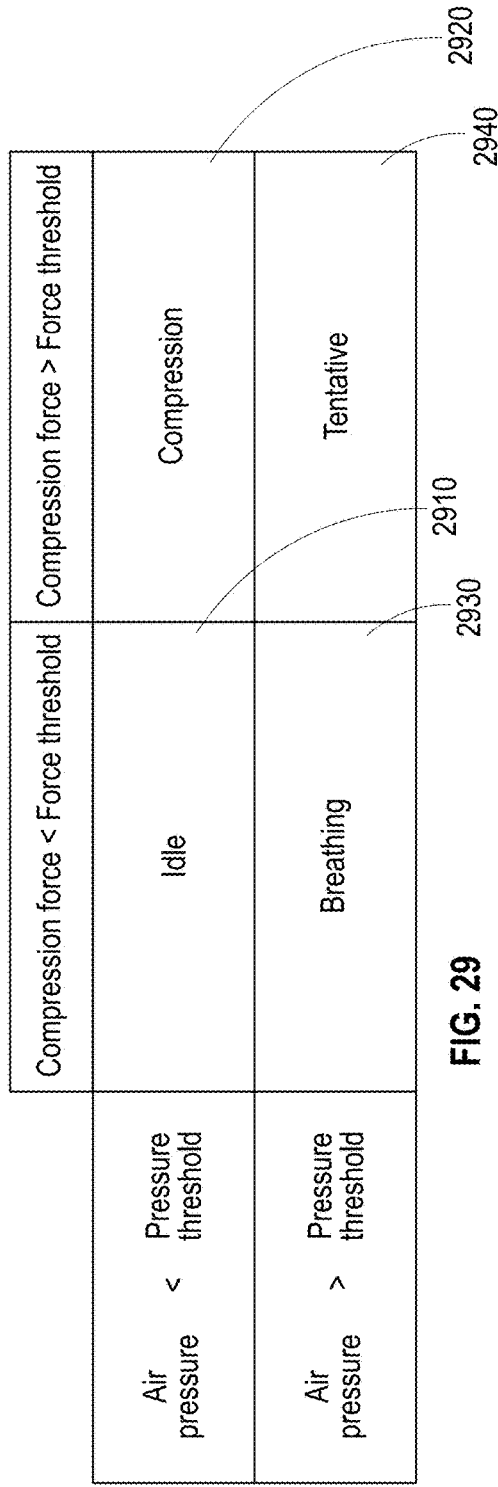
FIGS. 29-31 illustrate tables of condition for CPR evaluating according to embodiments.
Figure 34:
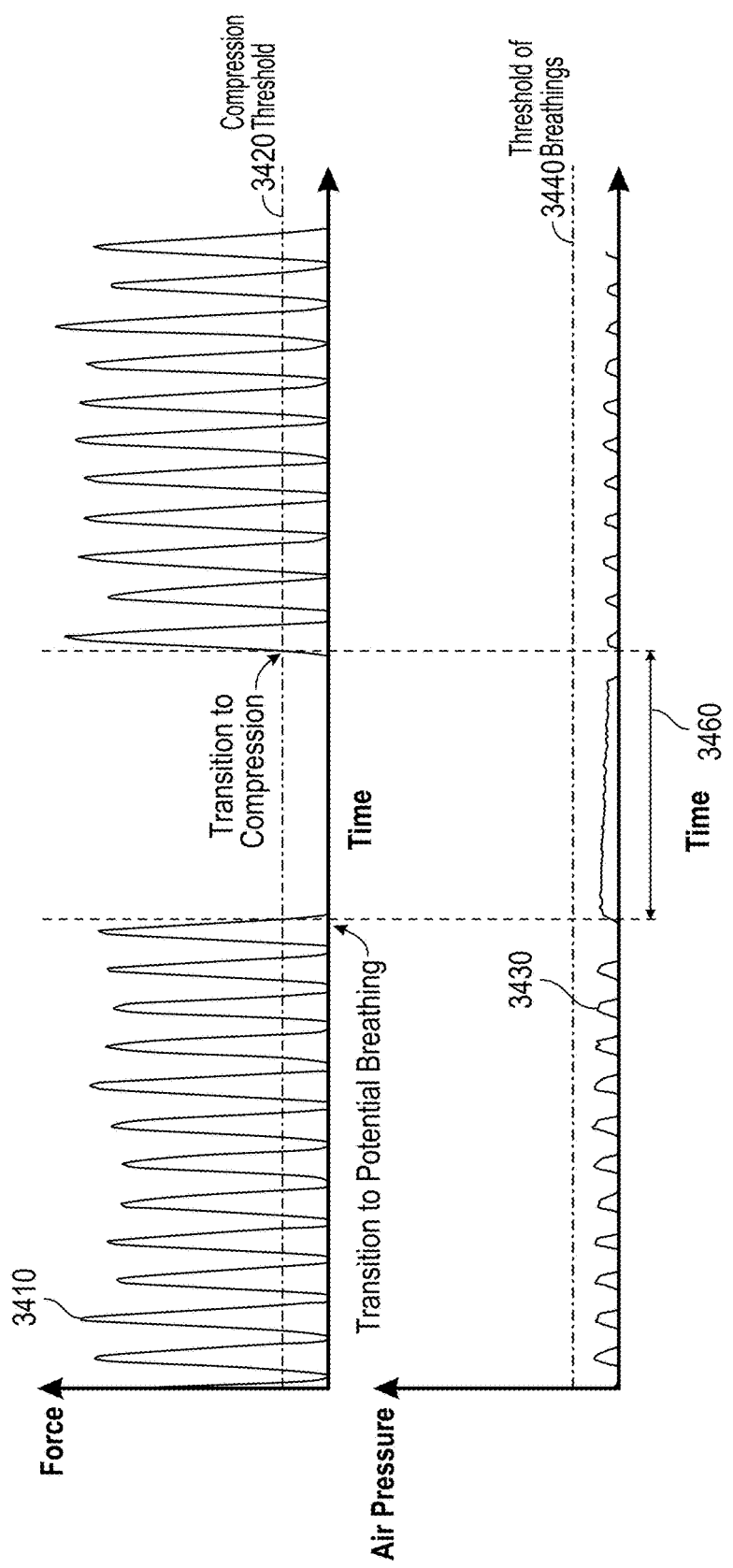

FIG. 29 provides a table of conditions for determining breathing or compression based on force signals and air pressure signals obtained at the same time. In embodiments, when the force signal indicates a force weaker than a reference force and the air pressure signal indicates a breathing volume less than a reference volume (2910), the CPR training system determines that the user has performed neither a compression nor a breathing, i.e., idle. In FIG. 34, the signals of time window 3460 provide an example of determining neither a compression nor a breathing based on low signals. When the force signal indicates a force greater than a predetermined reference and the air pressure signal indicates a breathing volume less a reference volume (2920), the CPR training system determines that the user is performing a compression. In embodiments, when the force signal indicates a force weaker than a reference force and the air pressure signal indicates a breathing volume greater than a reference volume (2930), the CPR training system determines that the user is performing breathing. In determining a compression, no compression, a breathing or no breathing, the CPR training system repeatedly obtains the force signal and air pressure signal at a given frequency and compares the signal values against their threshold values.

When Both Force Signals and Air Pressure Signals are Strong

When the force signal is enough to confirm a compression and air pressure signals are also enough to confirm a breathing (2940), the CPR training system may not determine the user action or may consider additional information for the determination of the current user action. In some embodiments, the CPR training system determines that the user performs a compression given that compressions significantly outnumber breathings in the CPR sequence. In other embodiments, the CPR training system determines the user action further based on the time taken from the peak of the immediately previous action to the current action. If the time is shorter than a predetermined reference time, the system determines that the user has performed a compression, vice versa. In other embodiments, the CPR training system determines the user action further in view of the number of immediately previous consecutive compressions or the number of immediately previous consecutive breathings, assuming that the user follows the predetermined CPR sequence.

Determining Based on Air Pressure Signals and Contact Sensor Signals

Figure 30:
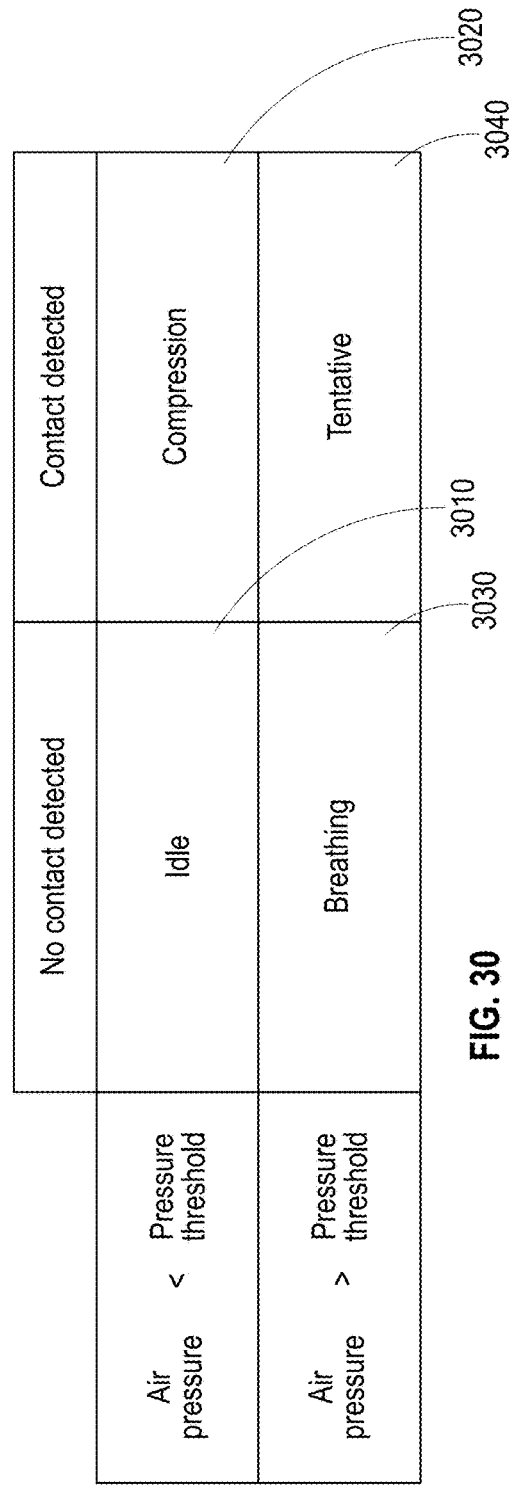

FIG. 30 provides a table of conditions for determining breathing and compression based on air pressure signals and context sensor signals obtained at the same time. In embodiments, when the contact sensor signals are not at a level to confirm a contact and the air pressure signals are not at a level to confirm a breathing (3010), the CPR training system determines that the user has not performed a compression or a breathing. In embodiments, when the contact sensor signals indicate a contact and the air pressure signals indicate a breathing volume less a reference volume (3020), the CPR training system determines that the user is performing a compression. In embodiments, when the contact sensor signals do not indicate and the air pressure signal indicates a breathing volume greater than a reference volume (3030), the CPR training system determines that the user is performing breathing.

When Both Contact Sensor Signals and Air Pressure Signals are Strong

When contact sensor signals are enough to confirm a contact and air pressure signals are also enough to confirm a breathing (3040), the CPR training system may not determine the user action or may consider additional information for the determination. In some embodiments, the CPR training system determines that the user performs a compression given that compressions significantly outnumber breathings in the CPR sequence. In other embodiments, the CPR training system determines the user action further based on the time taken from the peak of the immediately previous action to the current action. If the time is shorter than a predetermined reference time, the system determines that the user has performed a compression, vice versa. In other embodiments, the CPR training system determines the user action further in view of the number of immediately previous consecutive compressions or the number of immediately previous consecutive breathings, assuming that the user follows the predetermined CPR sequence.

Determining in View of Known Last Action

Figure 31:
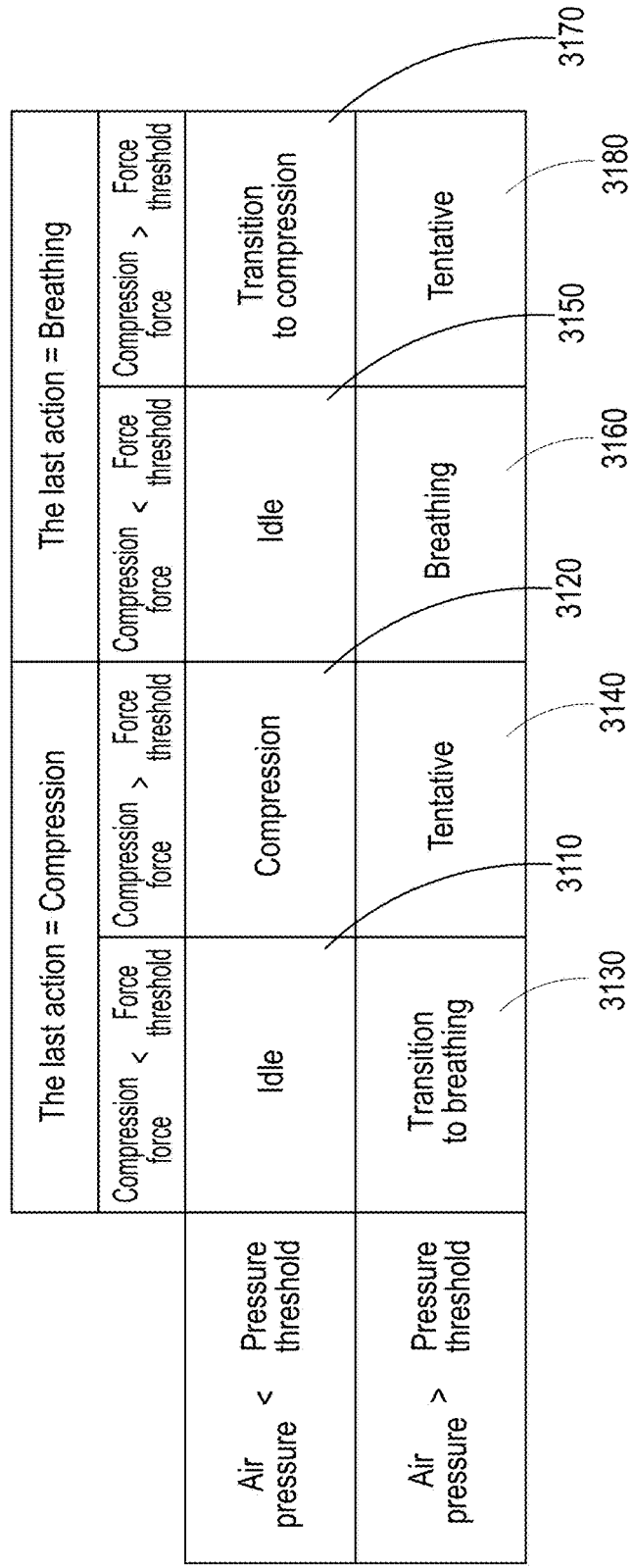

In embodiments, the CPR training system determines whether the user performs a compression or a breathing based on a force signal and an air pressure signal obtained at a given time and further based on the immediately preceding action (last action) of the user that the CPR training system has determined or knows. FIG. 31 provides a table of conditions for determining the user action of breathing or compression in view of the immediately preceding action of the user.

Last Action Being Compression

In case the last action was a compression, the CPR training system determines that the user has performed a compression when the air pressure signal is smaller than a breathing threshold or not at a level to confirm a breathing and further the force signal is greater than a compression threshold or enough to confirm a compression (3120). In case the last action was a compression, the CPR training system determines that the user has performed a breathing, i.e., a transition from compression to breathing when the air pressure signal is greater than the breathing threshold or enough to confirm a breathing, and further the force signal is smaller than the compression threshold or not at a level to confirm a compression (3130).

Last Action Being Breathing

Still referring to FIG. 31, in case the last action was a breathing, the CPR training system determines that the user has performed a breathing at this time when the air pressure signal is enough to confirm a breathing and further force signal is not at a level to confirm a compression (3160). In case the last action was a breathing, when the air pressure signal is not at a level to confirm a breathing and further the force signal is enough to confirm a compression (3170), the CPR training system determines that the user has performed a compression at this time, i.e., a transition from breathing to compression.

Last Action Being Either Compression or Breathing

In embodiments, in case neither the air pressure signal nor force signal reaches their predetermined levels to confirm a compression or a breathing (3110 and 3150), the CPR training system determines that the user is not performing a compression or breathing, i.e., an idle period regardless of the last action of the user. In case the last action was a compression or a breathing, when the air pressure signal is enough to confirm a breathing, and further the force signal is also enough to confirm a compression (3140 and 3180), this time the CPR training system does not determine the current user action or refer to additional information for determination of the user action.

Determining with Reference to Additional Information

Figure 33:
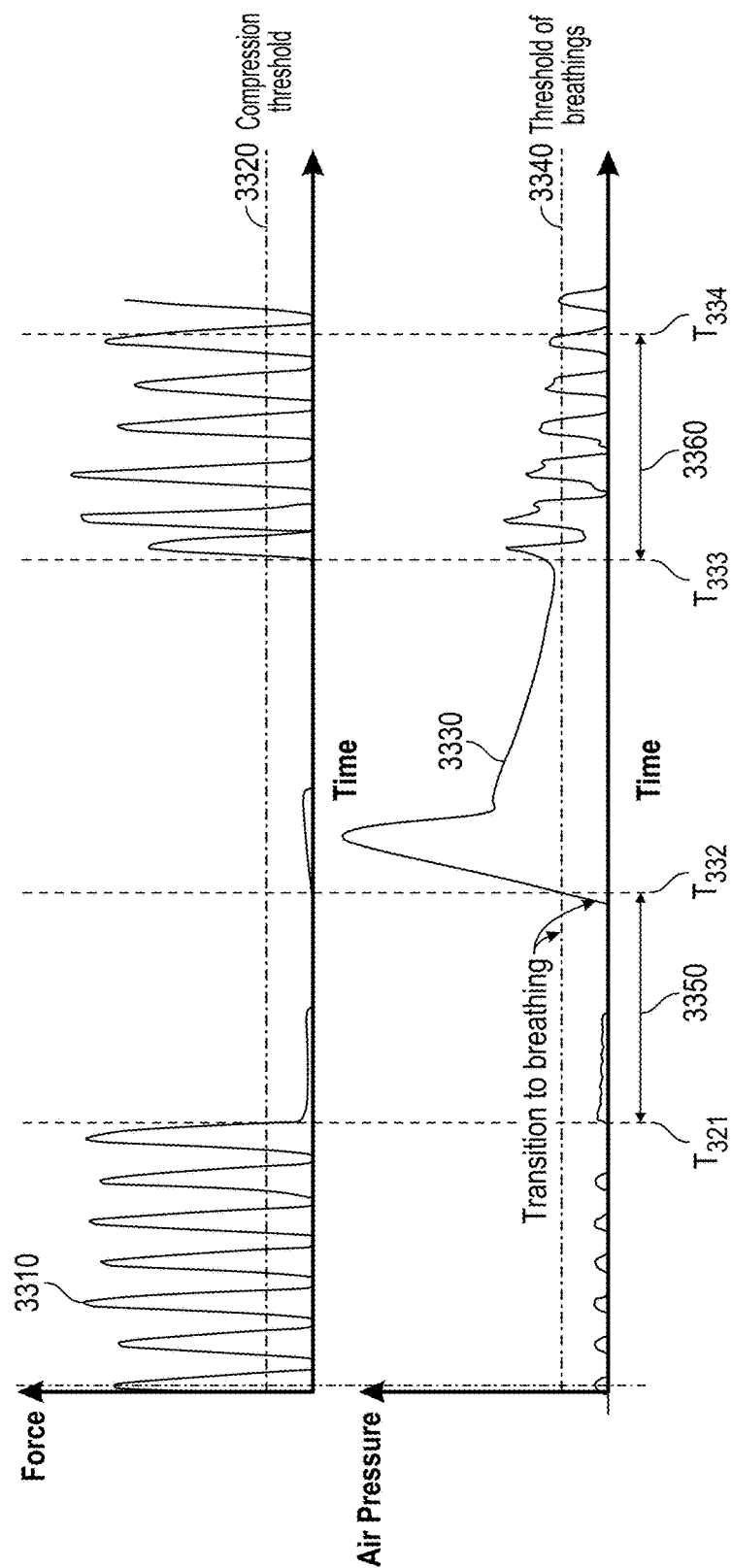

In some embodiments, the CPR training system determines that the user performs a compression, given that compressions significantly outnumber breathings in the CPR sequence. In other embodiments, the CPR training system determines the user action further based on the time taken from the peak of the immediately previous action to the current action. If the time is shorter than a predetermined reference time, the system determines that the user has performed a compression, vice versa. In other embodiments, the CPR training system determines the user action further in view of the number of immediately previous consecutive compressions or the number of immediately previous consecutive breathings, assuming that the user follows the predetermined CPR sequence. In FIG. 33, the signals of time window 3360 provide examples of determining a compression based on immediately previous consecutive compressions or based on the time taken to the current action from the immediately previous peak confirmed for either a compression or breathing.

Figure 32:
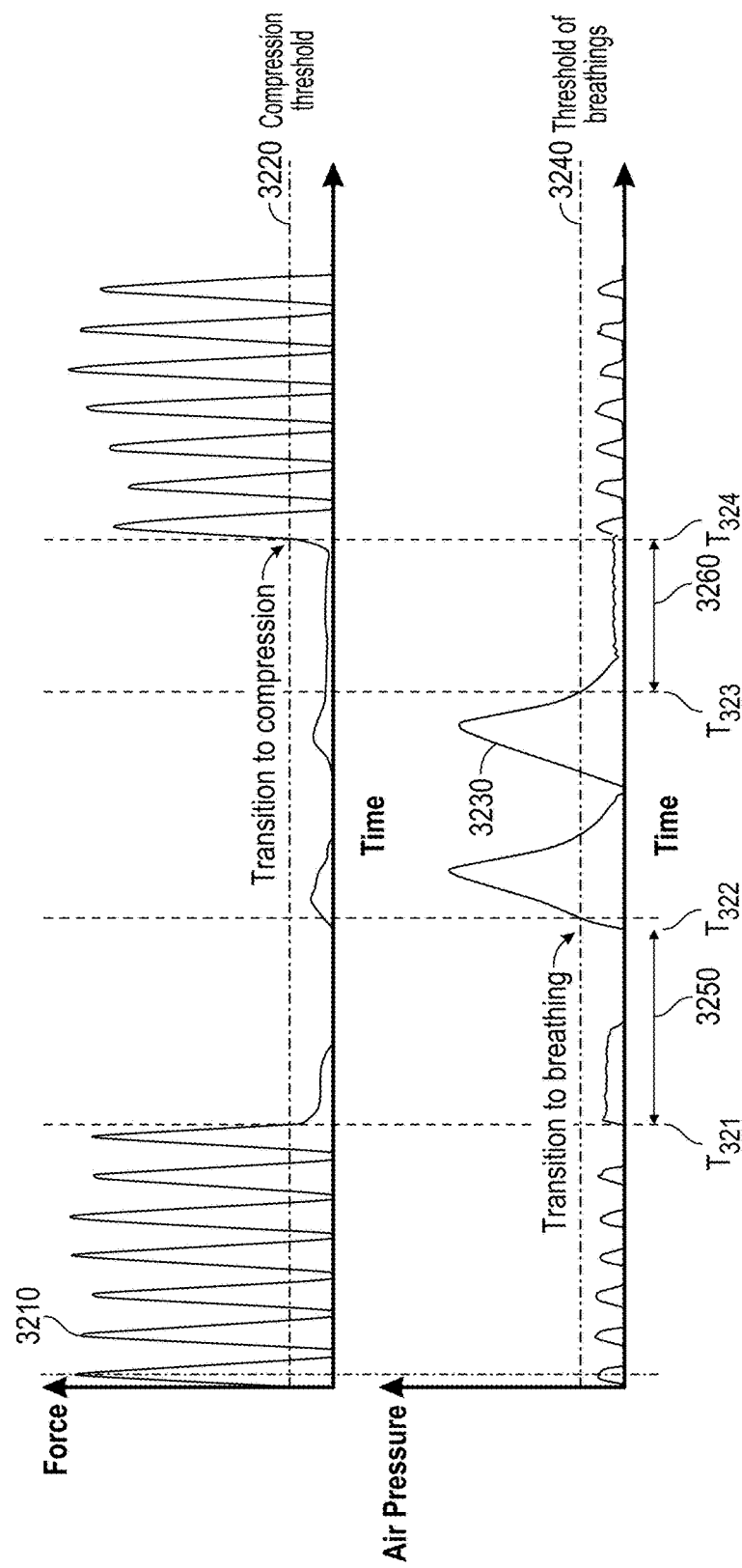
FIGS. 32-34 illustrate force signals and air pressure signals of CPR training sequences.

Interpreting Signal Profiles of FIG. 32

FIG. 32 illustrates force signals 3210 and air pressure signals 3230 obtained during a user's performance of a CPR training session. In embodiments, the CPR training system detects peaks of force signals that are greater than a predetermined compression threshold 3220 for identifying or confirming compressions. The CPR training system also detects air peaks of pressure signals that are greater than a predetermined breathing threshold 3240 for identifying or confirming breathings. Referring to FIG. 32, the CPR training system determines an idle period 3250 (no compression and no breathing) at times between $T_{321}$ to $T_{322}$ when both the force signal and air pressure signal are below their thresholds 3220, 3240 respectively. In embodiments, the CPR training system determines a breathing at $T_{322}$ because the air pressure signal turns from smaller to greater than the breathing threshold 3240 that occurs after the immediately previous determination (or consecutive previous determinations including the last one) of no breathing or air pressure signal being smaller than the breathing threshold 3240 and further because the force signal remains smaller than the compression threshold 3220 since the immediately previous determination of no breathing that occurred at a time prior to $T_{322}$ (or between $T_{321}$ and $T_{322}$). In other embodiments, the CPR training system determines a transition from compression to breathing because the idle period 3250 after the last confirmed compression is longer than a predetermined value, e.g., 2 seconds. This is because typically it takes time for the user to change posture for the transition. The CPR training system determines a breathing at a time after $T_{322}$ when the air pressure signal is greater than the breathing threshold 3240 and the force signal is smaller than the compression threshold 3220. The CPR training system determines an idle state (neither compression nor breathing) at times between $T_{323}$ and $T_{324}$ when neither the force signal nor the air pressure signal goes beyond their respective threshold 3220, 3240. The CPR training system determines a transition from breathing to compression at $T_{323}$ because the air pressure signal is smaller than the breathing threshold 3240 and the force signal turns from smaller to greater than the compression threshold 3220 after the last determination (or after the consecutive determinations including the last one) of no compression or force signal being smaller than the compression threshold 3220.

Compressions Beginning Before Complete Deflation of Lung Bag

FIG. 33 illustrates force signals and air pressure signals during a CPR training session. The air pressure signals in the period between $T_{332}$ and $T_{333}$ includes a sharp peak that represents a single breathing. After the sharp peak, the air pressure signal in this period decreases at a slow rate, which represents that no breathing follows immediately after the single breathing for a while and the lung bag is being deflated slowly as the air is being spontaneously discharged. It is notable that no significant force signals are detected during this period from $T_{332}$ to $T_{333}$. At or after $T_{333}$, the force signals reach or exceed the compression threshold 3320, which can be confirmed as compressions. Also, at or after $T_{333}$ in the period 3360, the air pressure signals fluctuate such that at times the air pressure signal is greater than the breathing threshold, which could potentially represent breathings.

Determining Compression Regardless of Strong Air Pressure Signals

In embodiments, the CPR training system determines a compression even if the air pressure signal at a given time is greater than the breathing threshold 3340 when it interprets fluctuation of the air pressure signals as caused by the user's compressions before complete discharge of air from the air bag or while a significant amount of the air is remaining in the lung bag. This may occur when the spontaneous discharge of air from the lung bag is slow or when the user's transition from the compression to breathing takes place very quickly. In some embodiments, the CPR training system ignores the fluctuating air pressure signals of the period 3360 of FIG. 33 when the last determined action is breathing and further the subsequent fluctuation in the air pressure signal is substantially synchronized. For example, the CPR training system may determine substantial synchronization of the force signals and air pressure signals when the frequency of the air pressure signal fluctuation is substantially similar to the frequency of force signal fluctuation. Alternatively, time for peak value, time for valley value or time for passing threshold value can be used in lieu of the frequency for determining substantial synchronization. In some embodiments, the CPR training system ignores the fluctuating air pressure signals of the period 3360 when the last determined action is breathing and further time or frequency of the air pressure fluctuation is shorter than a predetermined time or frequency for a breathing. In some embodiments, the CPR training system determines a transition from breathing to compression when the idle period after the last confirmed breathing is longer than a predetermined value.

Breathing Skipped

FIG. 34 illustrates force signals and air pressure signals during a CPR training session, in which a user performs two sets of compressions and skips a set of breathing between the two sets of compressions. In embodiments, the CPR training system determines the two sets of compressions from the force signals. Given that force signals or air pressure signals are smaller than their threshold values, in embodiments, the CPR training system determines that no compression or breathing occurred between the two sets of compressions.

Ignoring Signals When Anticipating Particular Action

When it is known to the CPR training system that the user will perform a compression, the CPR training system may not utilize certain air pressure signals or force signals for evaluating the user's action to the manikin. In embodiments, the CPR training system anticipates the immediately next or current user action based on the CPR training guidelines. In embodiments, the CPR training system is programmed to select a CPR training sequence before performing a CPR training session. In such embodiments, during the CPR training session, the CPR training system anticipates the next or current action of the user and ignores air pressure signals and utilizes force signals and other signals for analysis of the next or current user action when a compression is anticipated based on the sequence. When the anticipated action is a breathing, the CPR training system ignores (does not rely on) force signals and utilizes air pressure signals for analysis of the user action.

Ignoring Force Signals When Anticipating Breathings

When it is known to the CPR training system that the user will perform a breathing, the CPR training system may not utilize signals from the accelerator, the force sensor, or the contact sensors to evaluate the user's action. For example, in a situation when the user is guided or expected to perform a breathing, the CPR training system utilizes sensor signals from the air pressure sensor for evaluating expected breathings while not monitoring or utilizing sensor signals from the compression pad. As such, while the CPR training system can obtain signals from all sensors installed inside the manikin during the CPR training session, the CPR training system may not access or utilize signals from all sensors for evaluating compressions/breathings of CPR when the CPR training system has information regarding expected action of the user based on a user selection or a progress of CPR procedure.

Determining and Evaluating User Actions

In embodiments, the CPR training system determines a compression, no compression, a breathing or no breathing based on signal inputs from various sensors and processing of the signal inputs using previously obtained data such as from initialization stage. In embodiments, the data processing module 18 performs these processes and determinations of the CPR training system using at least one processor and software stored in the data processing module 18. In embodiments, the CPR training system evaluates user actions during CPR training sessions. In embodiments, the data processing module 18 performs these evaluations using at least one processor and software stored therein. In other embodiments, the processing, determination and evaluation may be performed at least in part by the compression module 12 and/or the breathing module 14 with at least one processor. In other embodiments, the processing, determination and evaluation may be performed at least in part by the external computing device 30 or other computing devices.

Feedbacks During CPR Training Session

Figure 35:
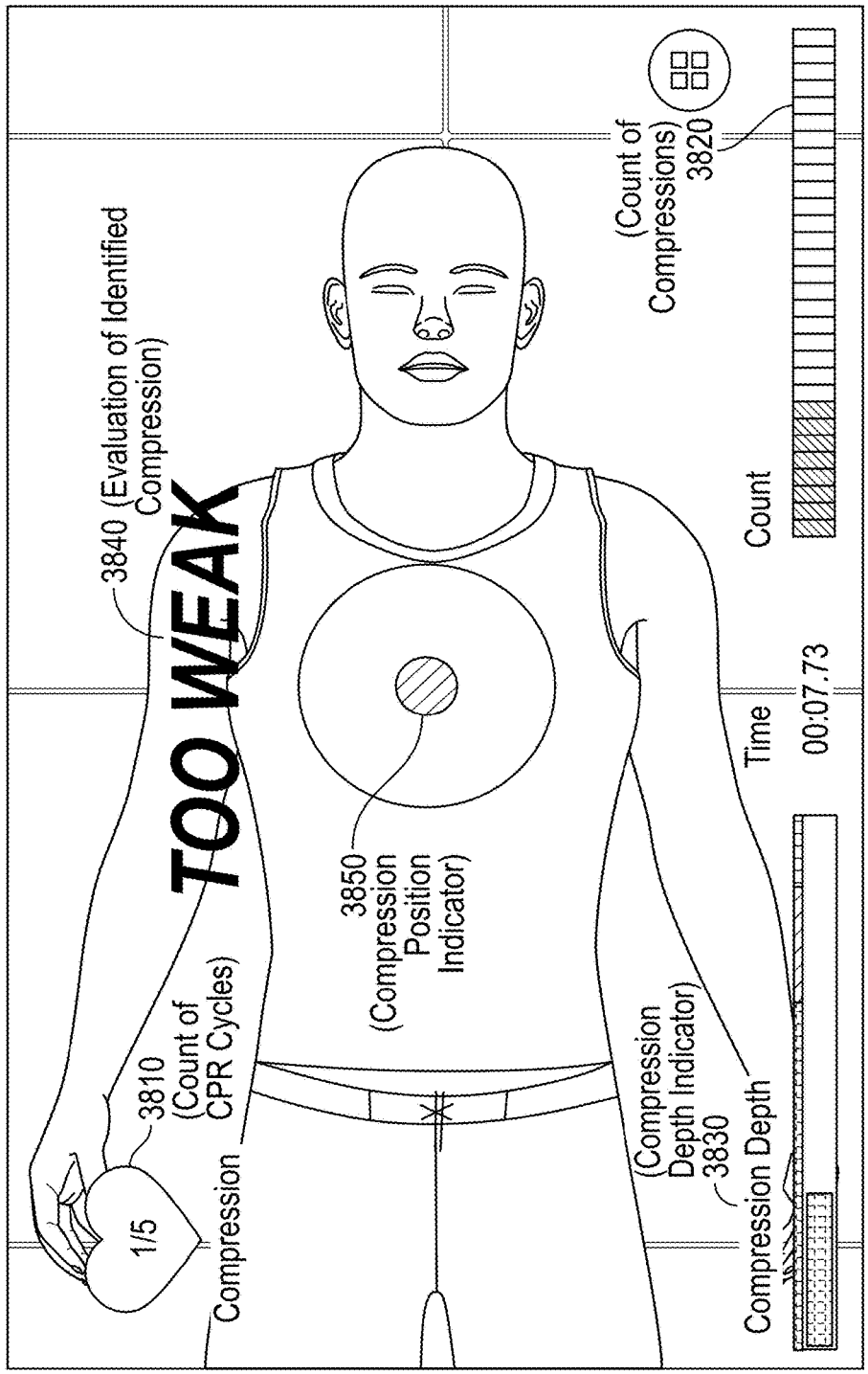
FIGS. 35-38 illustrate a user interface for feedback to a user during a CPR training session.
Figure 36:
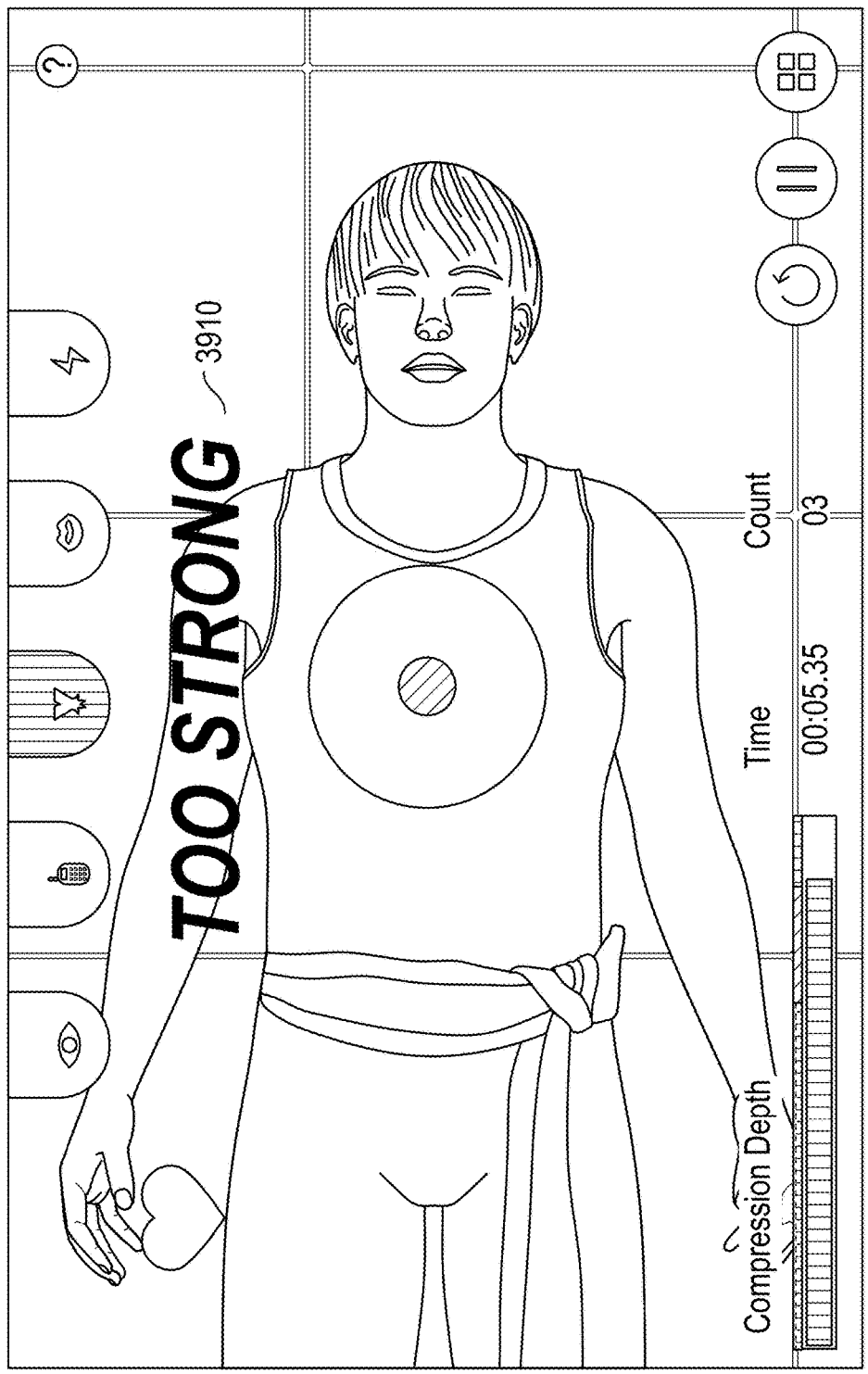
Figure 37:
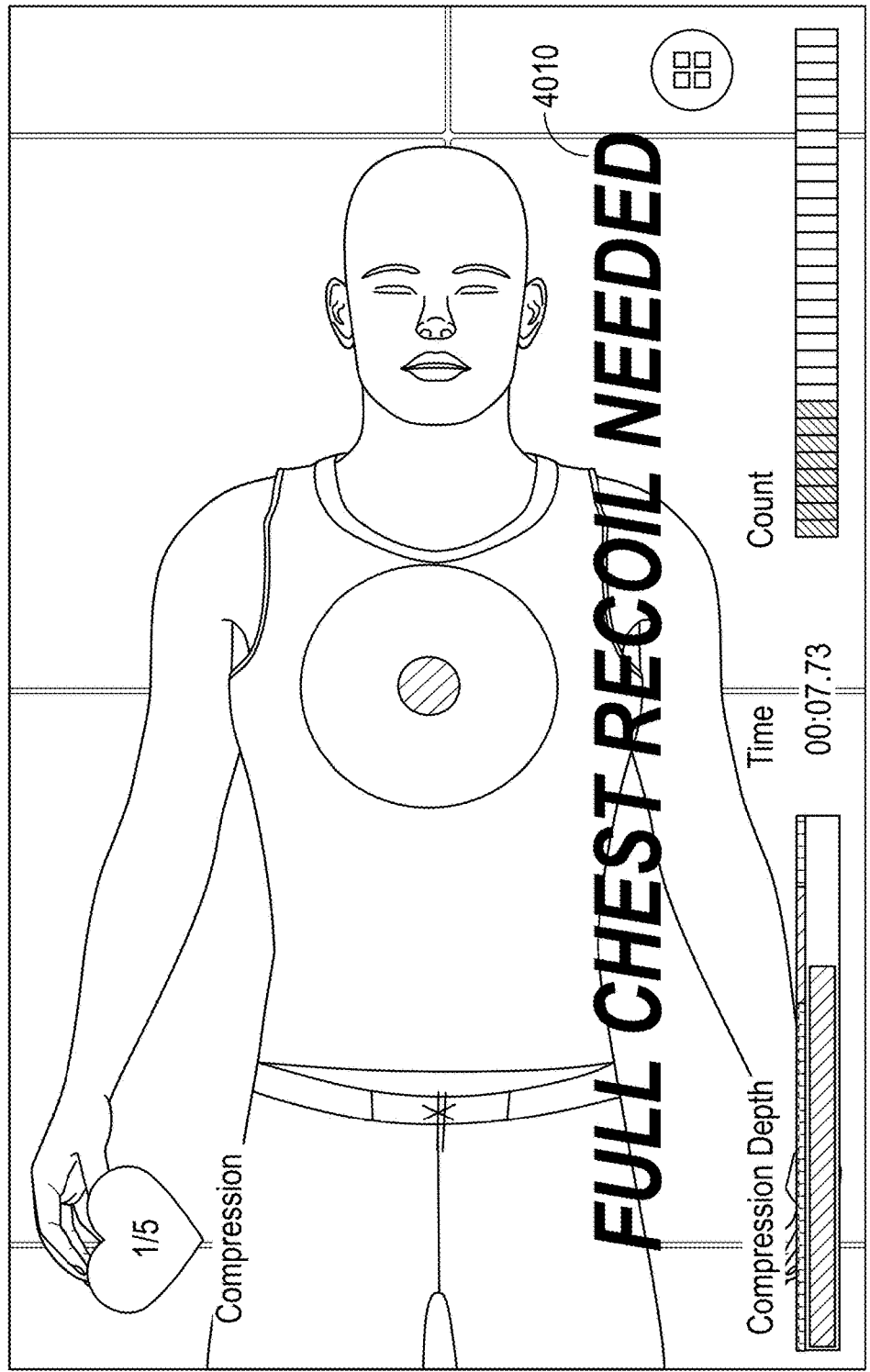
Figure 38:
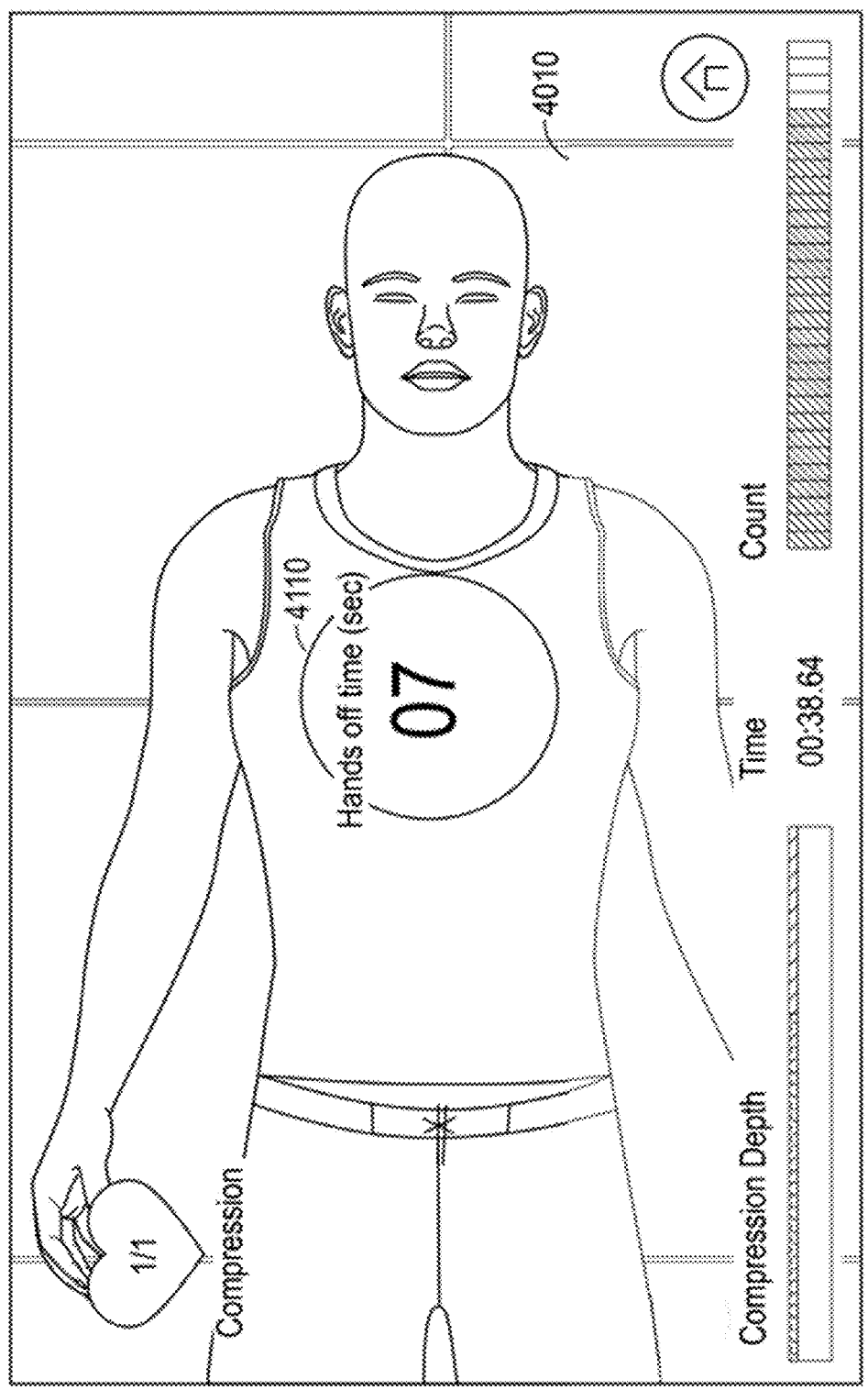

FIG. 35 illustrates a user interface for providing feedback during an ongoing CPR training session. In embodiments, the CPR training system provides one or more indicators representing a progress of CPR training session. As illustrated in FIG. 38, the CPR training system informs that the user is practicing the first one of the five scheduled cycles 3810. The CPR training system provides an indicator of compression count 3820. The CPR training system provides an indicator of real-time compression depth 3830. The CPR training system provides evaluation of a current (most recent) compression 3840. The CPR steering system provides an indicator of compression position 3850. FIG. 36 illustrates another example of feedback provided during CPR training session. In embodiments, the CPR training system provides a warning 3910 that the most recent compression was too strong in view of a specification of desirable CPR procedure. FIG. 37 illustrates another example of feedback provided during CPR training session. In embodiments, the CPR training system can determine whether a full recoil has been made between two consecutive compressions based on chest displacement between the two compressions. When the chest displacement between the two compressions does not indicate a full recoil which is represented by a chest displacement less than a predetermined reference, the CPR training system can provide a warning 4010. FIG. 38 illustrates a feedback from CPR training system when sensor signals indicate an idle time period during CPR training session. In embodiments, the CPR training system measures an idle time period of idle signals in which the sensor signals from the compression pad and the sensor signals from the breathing modules do not indicate a compression, a breathing or a contact. The CPR training system may inform a trainee how long the CPR training system has not received signals indicating a contact 4110.

Presenting CPR Training Session Results

Figure 40:
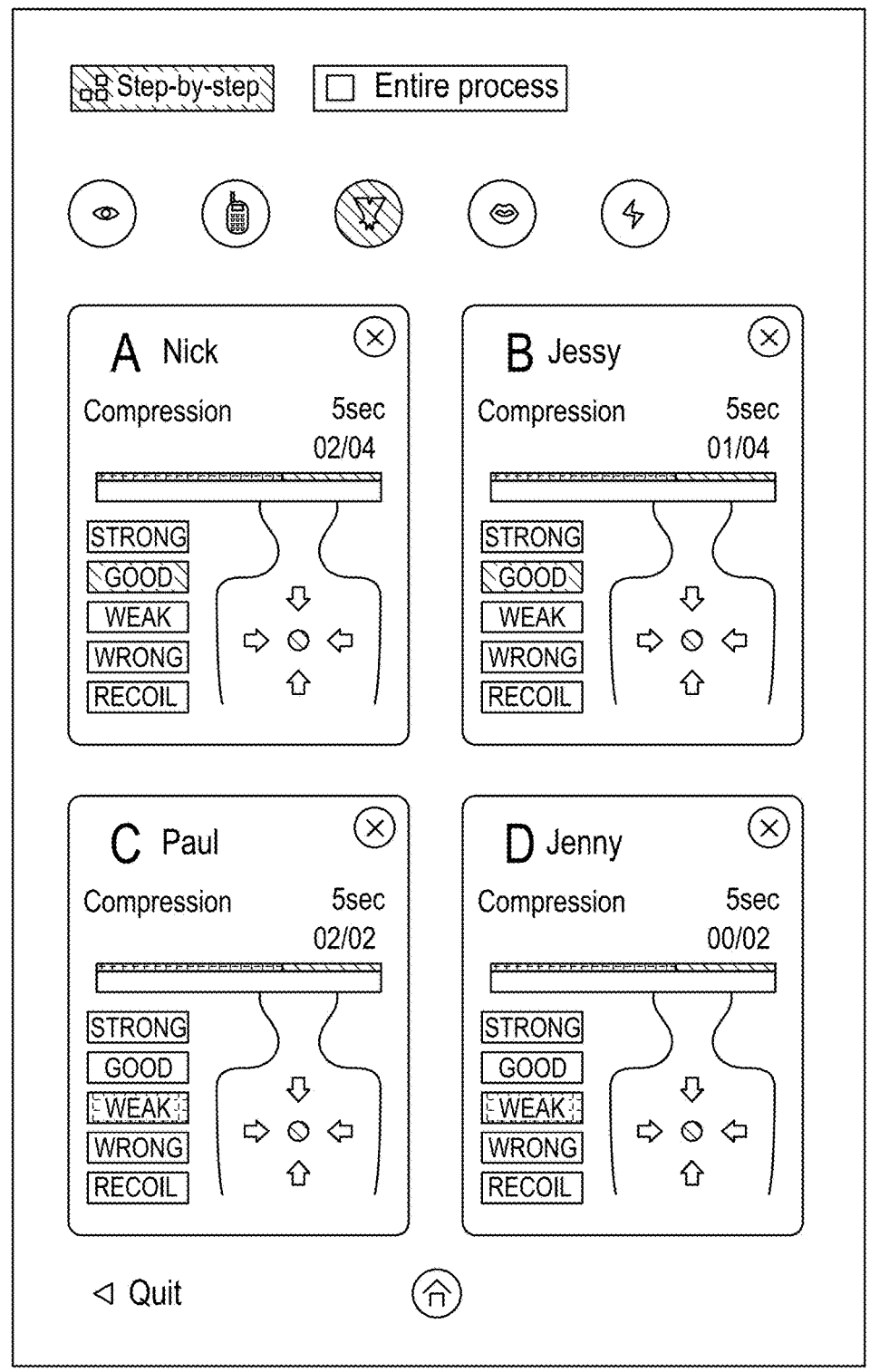
FIG. 40 illustrates a user interface showing progress of multiple users' CPR training sessions.
Figure 41:
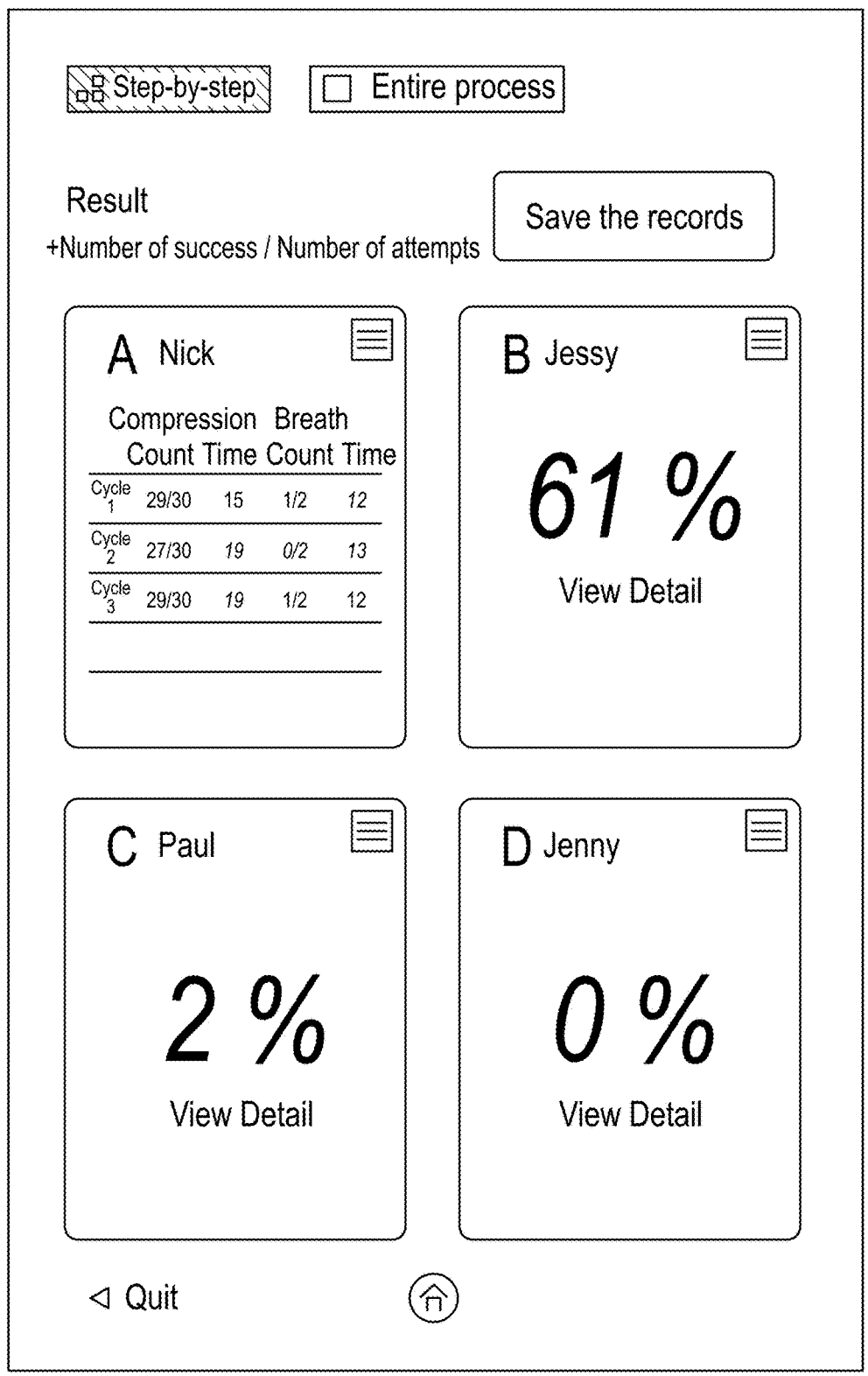
FIG. 41 illustrates a user interface showing a summary of multiple users' CPR performance.

FIG. 39 illustrates a summary of a single user's performance of CPR training session. In embodiments, the CPR system informs a trainee of the number of successful compressions and the number of successful breathings after completing a CPR training session. FIG. 40 illustrates a user interface showing progress of multiple users' CPR training sessions. FIG. 41 illustrates a user interface showing a summary of multiple users' performance of CPR training sessions. In embodiments, the CPR training system can simultaneously conduct multiple CPR training sessions for multiple users, evaluate individual actions of the multiple users, and provide feedback regarding the multiple training sessions to a single device of a trainer who is governing the CPR training for the multiple users. FIG. 42 illustrates a report for a CPR training session for a single user.

Modifications, Combinations and Subcombinations

Although the invention has been disclosed in the context of certain embodiments and examples, it will be understood by those skilled in the art that various features and aspects of the present invention extend beyond the specifically disclosed embodiments to other alternative embodiments. In addition, while a number of variations have been shown and described in detail, other modifications, which are within the scope of the invention, will be readily apparent to those of skill in the art based upon this disclosure. It is also contemplated that various combinations or subcombinations of the specific features and aspects of the embodiments may be made and still fall within the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, and that various changes in form and details may be made without departing from the spirit and scope of the present disclosure as set forth in the following claims.

What is claimed is:

1. A method for a CPR training, the method comprising:
    providing a manikin comprising a frame and a removable skin fitted over the frame corresponding to a rib cage of a human body;
    providing a compression pad comprising a housing, at least one force sensor, at least one acceleration sensor housed within the housing, the at least one force sensor configured to detect force applied thereto, the at least one acceleration sensor configured to detect acceleration applied thereto;
    lifting or removing at least a portion of the removable skin to expose at least part of the frame;
    subsequently placing the compression pad over the frame;
    subsequently fitting the removable skin over the frame such that the compression pad is located in a chest region of the manikin and interposed between the frame and the removable skin;
    performing initializing compressions onto the chest region, wherein each initializing compression applies an initializing force and an initializing acceleration to the compression pad, wherein the at least one force sensor detects initializing forces applied during the initializing compressions and generates initializing force signals in response to the initializing compressions, wherein the at least one acceleration sensor detects initializing accelerations applied during the initializing compressions and generates initializing acceleration signals in response to the initializing compressions;
    processing the initializing acceleration signals to generate initializing displacement signals representing initializing displacements of the compression pad during the initializing compressions;
    processing the initializing force signals and the initializing displacement signals to provide a displacement-force correlation between the initializing displacements and the initializing forces;
    subsequently, performing a CPR training session that comprises training compressions onto the chest region, wherein the at least one force sensor detects a training force applied to the compression pad in response to each training compression and generates a training force signal corresponding to the training force; and
    computing a training displacement using the training force signal and the displacement-force correlation between the initializing displacements and the initializing forces, wherein the training displacement is not computed based on a training acceleration applied to the compression pad during the training compressions.

2. The method of claim 1, wherein the at least one force sensor comprises a first force sensor and a second force sensor that are apart from each other within the housing, wherein the first and second force sensors are configured to generate their own force signals which are processed to provide the initializing force signals of the at least one force sensor and the training force signal of the at least one force sensor, wherein the compression pad comprises a first pressing plate and a first support plate between which the first force sensor is sandwiched, wherein the first pressing plate comprises a raised portion raised toward the first force sensor and configured to contact the first force sensor in response to an external pressure applied to the compression pad.

3. The method of claim 1, wherein the compression pad further comprises:
    a printed circuit board (PCB) enclosed within the housing;
    a plurality of contact patches provided on an inner surface of the housing, wherein the plurality of contact patches are made of an electrically conductive material and are not electrically connected to each other; and
    a contact pattern formed on the PCB, wherein the contact pattern comprises two or more electrically separate conductive lines in close proximity with each other and exposed toward at least part of the plurality of contact patches,
    wherein each contact patch faces two or more conductive lines of the contact pattern,
    wherein the compression pad is configured to generate a contact signal when one of the plurality of contact patches contacts the two or more conductive lines of the contact pattern in response to an external pressure applied onto the housing.

4. The method of claim 1, further comprising:
presenting the computed training displacement to a user who is performing the CPR training session in real time.

5. The method of claim 1, further comprising:
comparing the computed training displacement against a predetermined value to determine whether each compression of the CPR training session satisfies a compression depth requirement;
presenting a result of the comparison in real time.

6. The method of claim 1, further comprising:
providing a lung bag and an air pressure sensor connected to the lung bag and configured to detect air pressure within the lung bag;
connecting the lung bag with a breathing cavity of the manikin such that the breathing cavity of the manikin and the lung bag are in fluid communication therebetween;
placing the lung bag over the compression pad after placing the compression pad over the manikin's frame;
blowing a volume of air into the lung bag via the breathing cavity of the manikin, wherein the air pressure sensor detects air pressure within the lung bag during the blowing and generates an initializing air pressure signal in response to the blowing;
processing the initializing air pressure signal and the volume to provide a volume-pressure correlation between the volume and the air pressure within the lung bag during the blowing;
subsequently, performing the CPR training session that further comprises at least one training breathing via the breathing cavity, which blows air into the lung bag, wherein the air pressure sensor detects a training air pressure within the lung bag during the at least one training breathing and generates at least one training air pressure signal in response to the at least one training breathing; and
computing a volume of air blown into the lung bag during the at least one training breathing using the at least one training air pressure signal and the volume-pressure correlation between volume and air pressure.

7. The method of claim 6, wherein the CPR training session comprises the training compressions and the at least one training breathing, wherein the method further comprises:
when the training force detected by the at least one force sensor is greater than a predetermined compression threshold, confirming performance of a training compression; and
when the training air pressure detected by the air pressure sensor is greater than a predetermined breathing threshold, confirming performance of a training breathing.

8. The method of claim 7, wherein the CPR training session involves a first instance in which the air pressure sensor detects a first air pressure greater than the predetermined breathing threshold in response to performing the training compressions even if no breathing is performed during the training compressions.

9. The method of claim 8, wherein the CPR training session involves a second instance in which the at least one force sensor detects a second force greater than the predetermined compression threshold in response to performing the at least one training breathing even if no compression is performed during the at least one training breathing.

10. The method of claim 9, wherein upon confirming performance of a training compression, if the first instance follows, the method determines that a training compression has been performed regardless of the first air pressure greater than the predetermined breathing threshold.

11. The method of claim 9, wherein upon confirming performance of a training breathing, if the second instance follows, the method determines that a training breathing has been performed regardless the second force greater than the predetermined compression threshold.

12. The method of claim 6, wherein the lung bag is placed over the compression pad after placing the compression pad over the manikin's frame and before fitting the removable skin over the frame, wherein the method does not detect the volume of air blown into the lung bag during the at least one training breathing.

\* \* \* \* \*